(12) United States Patent
Filippone

(10) Patent No.: US 12,217,879 B2
(45) Date of Patent: Feb. 4, 2025

(54) NUCLEAR POWER GENERATOR AND FUEL CARTRIDGES HAVING VARIABLE ELECTRIC LOAD CAPACITY TO POWER A SHIP PROPELLER

(71) Applicant: Claudio Filippone, College Park, MD (US)

(72) Inventor: Claudio Filippone, College Park, MD (US)

(73) Assignee: Carbon Free Holdings LLC, College Park, MD (US)

( * ) Notice: Subject to any disclaimer, the term of this patent is extended or adjusted under 35 U.S.C. 154(b) by 0 days.

(21) Appl. No.: 17/868,599

(22) Filed: Jul. 19, 2022

(65) Prior Publication Data
US 2024/0136077 A1   Apr. 25, 2024
US 2024/0233965 A9   Jul. 11, 2024

Related U.S. Application Data

(63) Continuation of application No. 16/613,792, filed as application No. PCT/US2018/033979 on May 22, 2018, now Pat. No. 11,521,756.
(Continued)

(51) Int. Cl.
*G21C 3/32* (2006.01)
*G21C 3/34* (2006.01)
(Continued)

(52) U.S. Cl.
CPC ............. *G21C 3/32* (2013.01); *G21C 3/3408* (2013.01); *G21C 5/02* (2013.01); *G21C 5/06* (2013.01);
(Continued)

(58) Field of Classification Search
CPC . G21C 3/042; G21C 3/16; G21C 3/17; G21C 3/18; G21C 3/30; G21C 3/32; G21C 3/36; G21C 3/3408; G21C 3/38; G21C 3/322; G21C 15/02; G21C 15/04; G21C 15/06; G21C 15/243; G21C 13/024; G21C 13/028; G21C 13/02; G21C 11/06; G21C 11/08; G21C 5/02; G21C 19/02; G21C 1/10; G21C 1/12; Y02E 30/30
(Continued)

(56) References Cited

U.S. PATENT DOCUMENTS 3,453,178 A   7/1969 Winkler et al.
4,569,820 A   2/1986 Fortescue
(Continued)

FOREIGN PATENT DOCUMENTS

WO   2016164935 A1   10/2016

OTHER PUBLICATIONS

International Preliminary Report on Patentability issued on Nov. 26, 2019, in International Application No. PCT/US2018/033979, filed on May 22, 2018 (6 pages).
(Continued)

*Primary Examiner* — Nitin Patel
*Assistant Examiner* — Cory A Almeida
(74) *Attorney, Agent, or Firm* — MILLBURN IP PLLC

(57) ABSTRACT

A system includes a load-following nuclear power generator including a nuclear reactor configured to generate variable amounts of electricity. The system also includes an electric drive and a propeller controlled by the electric drive.

11 Claims, 27 Drawing Sheets

Related U.S. Application Data

(60) Provisional application No. 62/509,303, filed on May 22, 2017.

(51) Int. Cl.
*G21C 3/38* (2006.01)
*G21C 5/02* (2006.01)
*G21C 5/06* (2006.01)
*G21C 11/06* (2006.01)
*G21C 11/08* (2006.01)
*G21C 13/02* (2006.01)
*G21C 13/024* (2006.01)
*G21C 13/028* (2006.01)
*G21C 15/243* (2006.01)
*G21C 19/02* (2006.01)

(52) U.S. Cl.
CPC .............. *G21C 11/06* (2013.01); *G21C 11/08* (2013.01); *G21C 13/02* (2013.01); *G21C 13/028* (2013.01); *G21C 15/243* (2013.01); *G21C 19/02* (2013.01); *G21C 3/38* (2013.01); *G21C 13/024* (2013.01); *Y02E 30/00* (2013.01); *Y02E 30/30* (2013.01)

(58) Field of Classification Search
USPC ........ 376/260–264, 267, 426, 427, 434, 438
See application file for complete search history.

(56) References Cited

U.S. PATENT DOCUMENTS

| | | | |
|---|---|---|---|
| 4,943,408 A * | 7/1990 | Yamamoto | G21D 3/12 376/241 |
| 5,143,691 A | 9/1992 | Lippert et al. | |
| 5,327,471 A | 7/1994 | Meier et al. | |
| 5,442,668 A | 8/1995 | Todreas et al. | |
| 5,640,434 A | 6/1997 | Rottenberg | |
| 6,212,250 B1 | 4/2001 | Korton et al. | |
| 6,795,801 B1 | 9/2004 | Watkins et al. | |
| 2013/0042594 A1* | 2/2013 | Zauderer | H02K 44/085 60/218 |
| 2013/0121452 A1 | 5/2013 | Bodner et al. | |
| 2014/0270045 A1 | 9/2014 | Lounsbury | |
| 2014/0314194 A1* | 10/2014 | Martin | G21D 3/08 376/215 |
| 2015/0206604 A1 | 7/2015 | Pencer et al. | |
| 2016/0049210 A1* | 2/2016 | Filippone | F22B 37/007 376/406 |
| 2017/0301414 A1 | 10/2017 | Ishibashi et al. | |
| 2017/0316839 A1 | 11/2017 | Bodner et al. | |

OTHER PUBLICATIONS

International Search Report issued on Oct. 17, 2018, in International Application No. PCT/US2018/033979, filed on May 22, 2018 (3 pages).

* cited by examiner

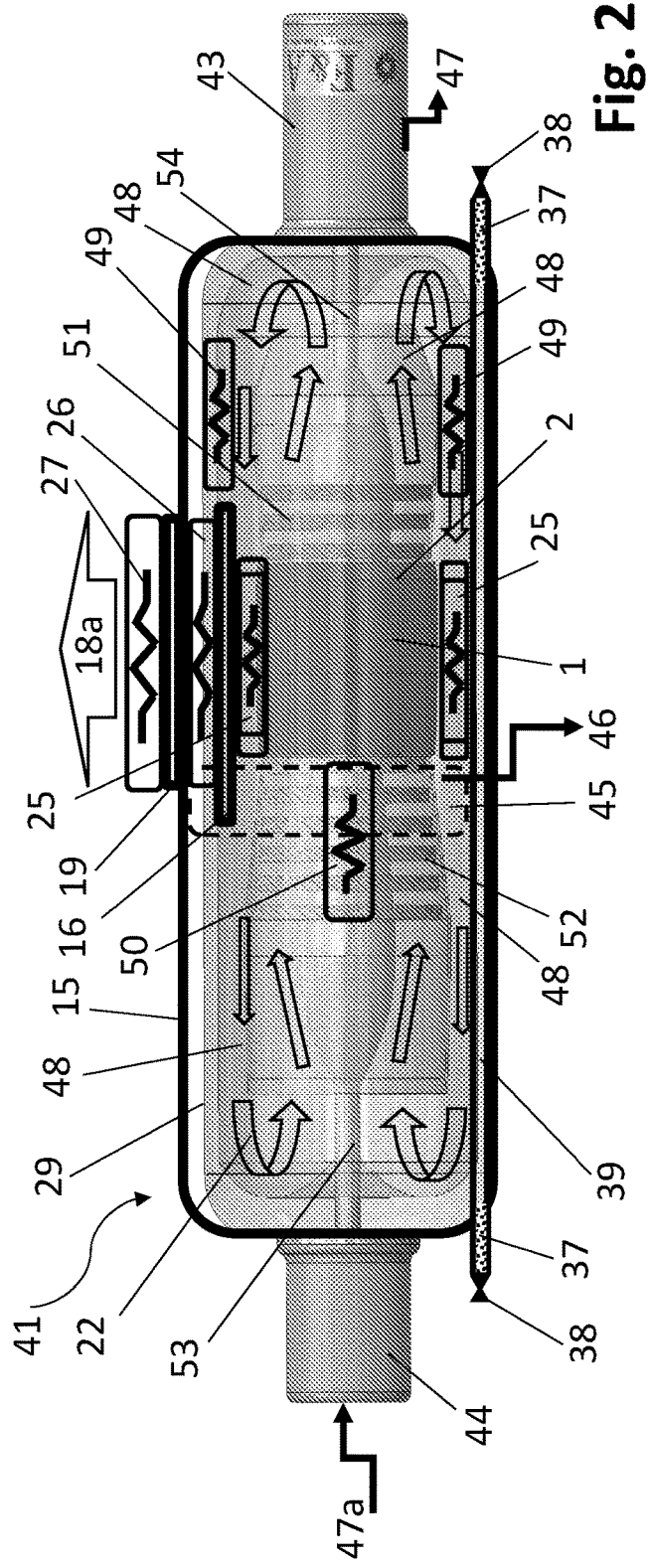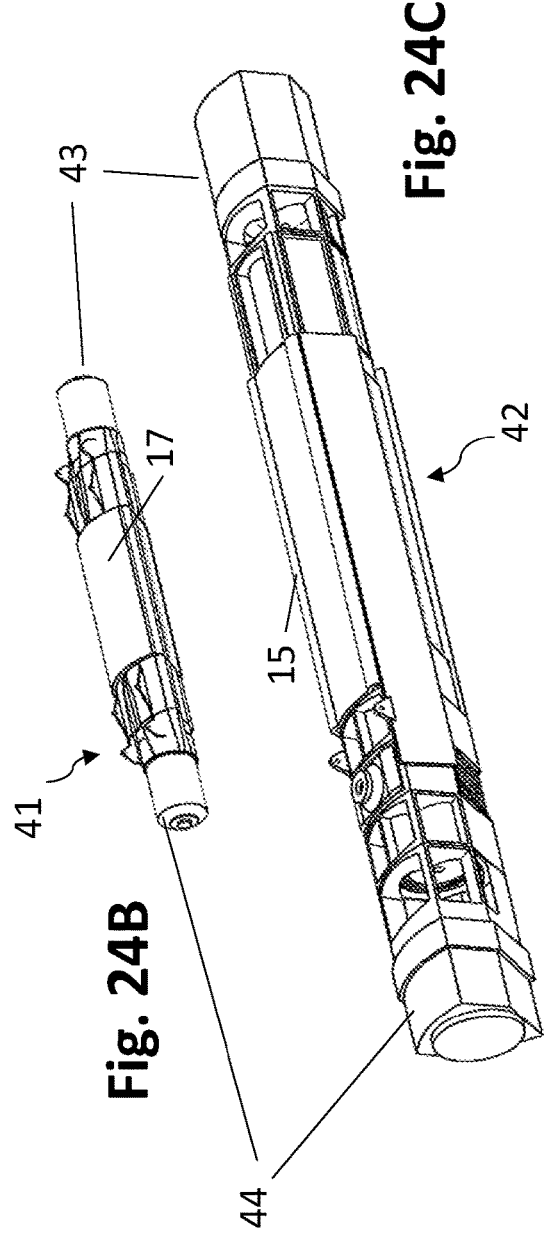

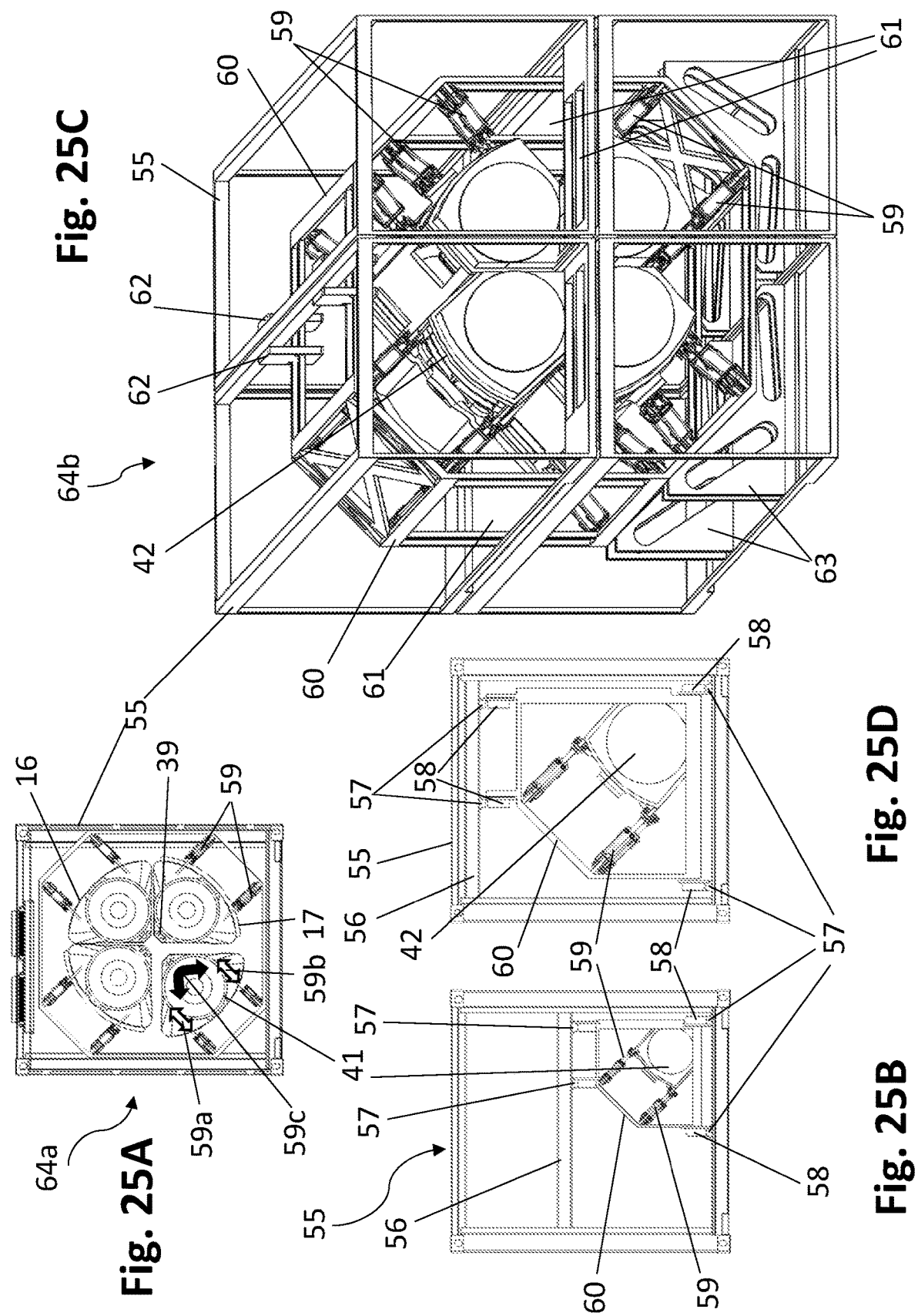

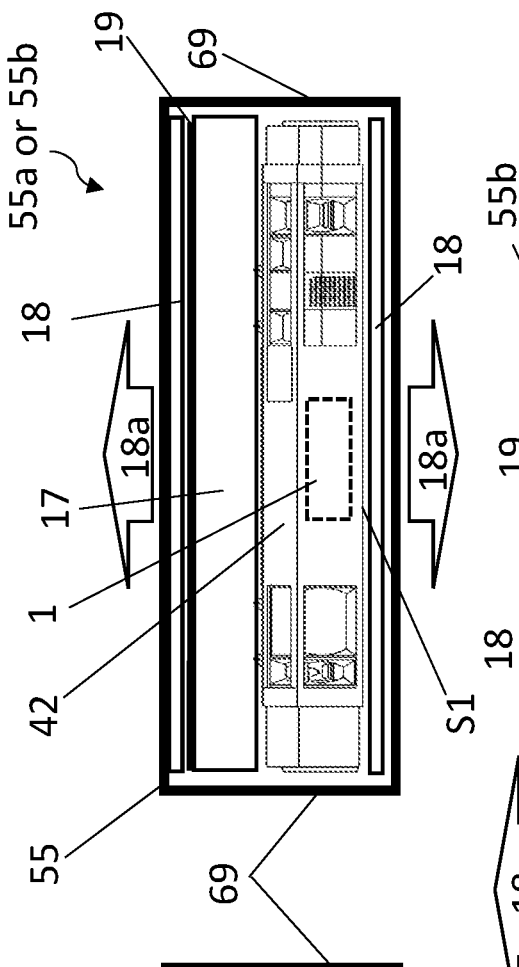
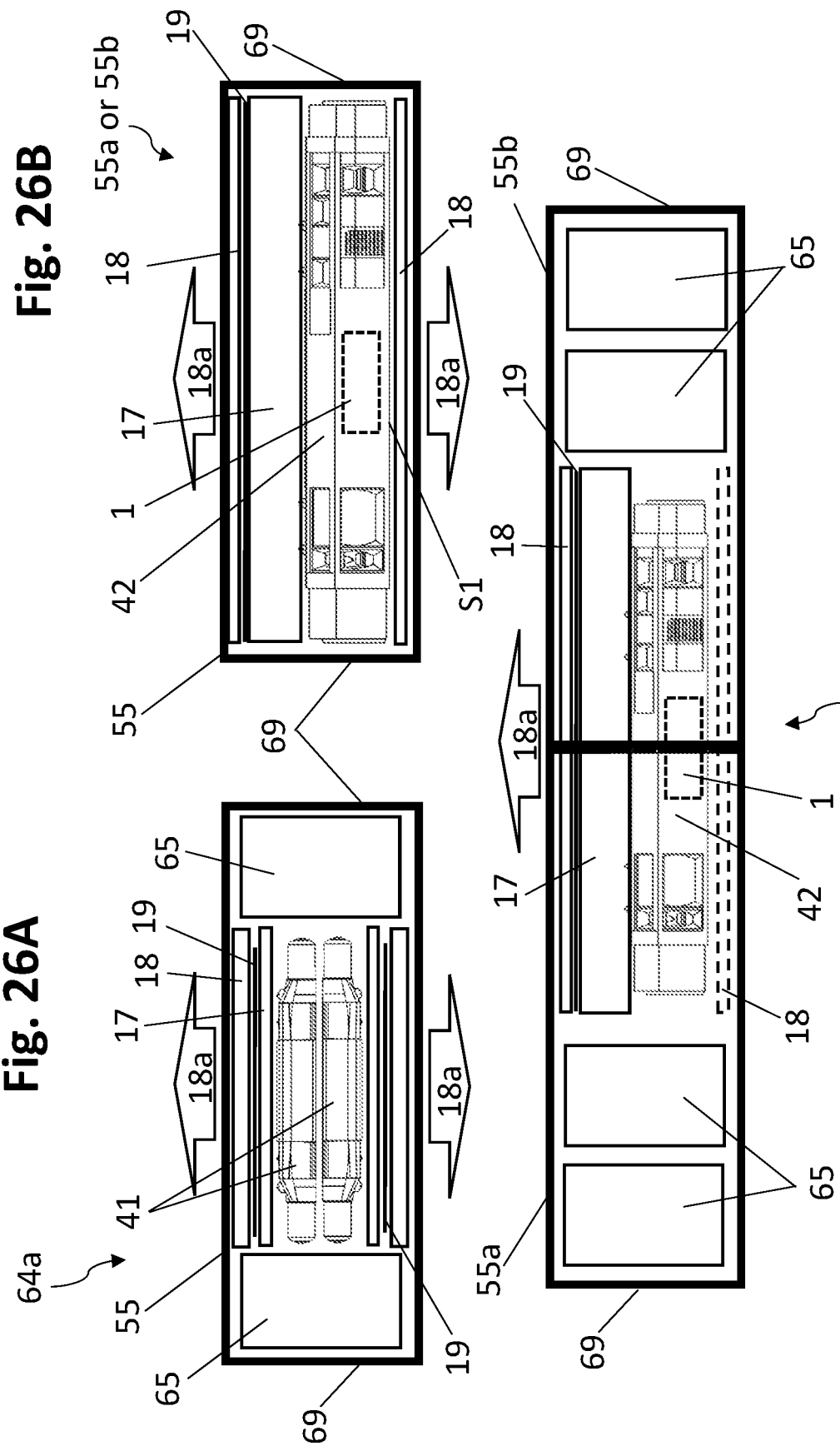
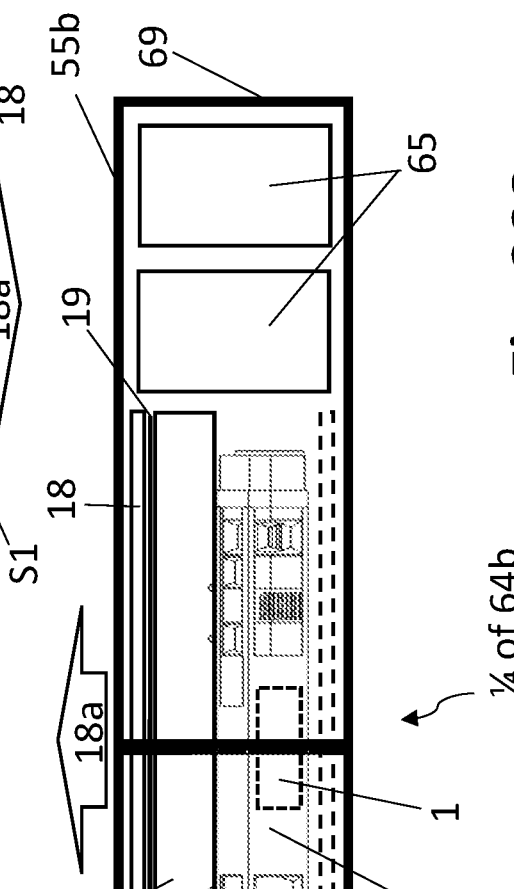

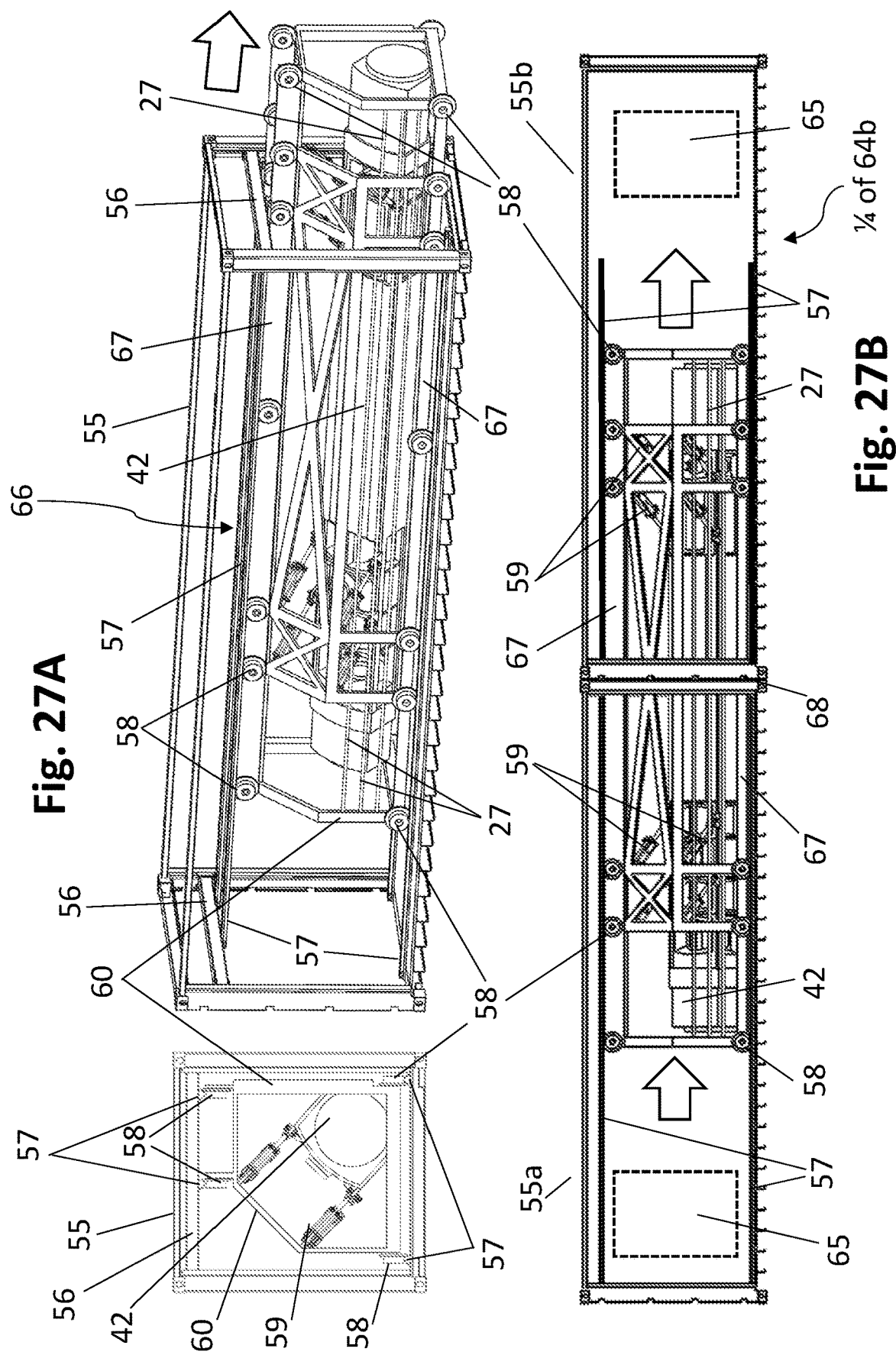

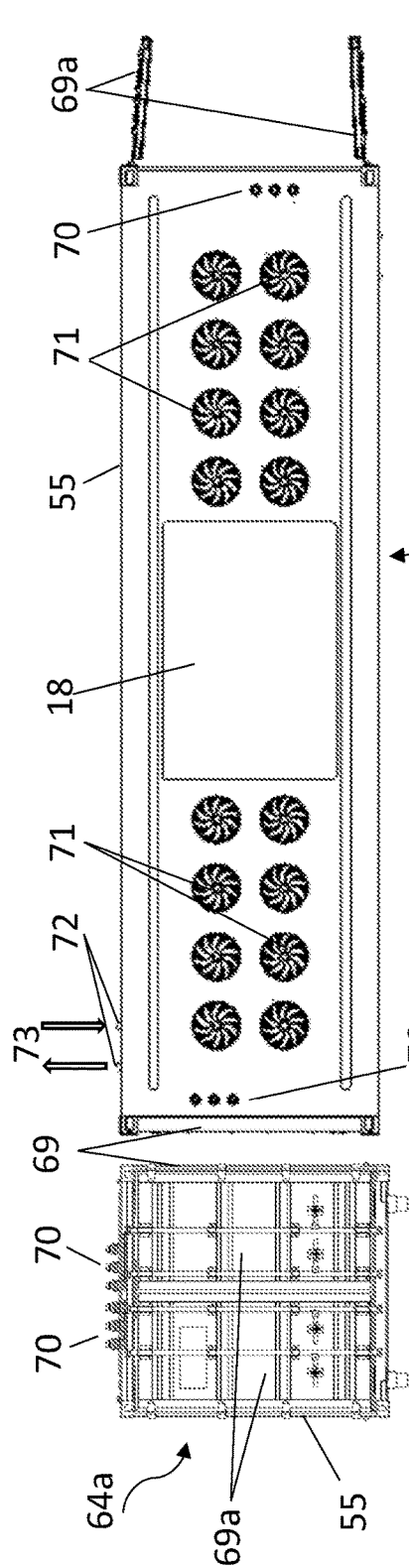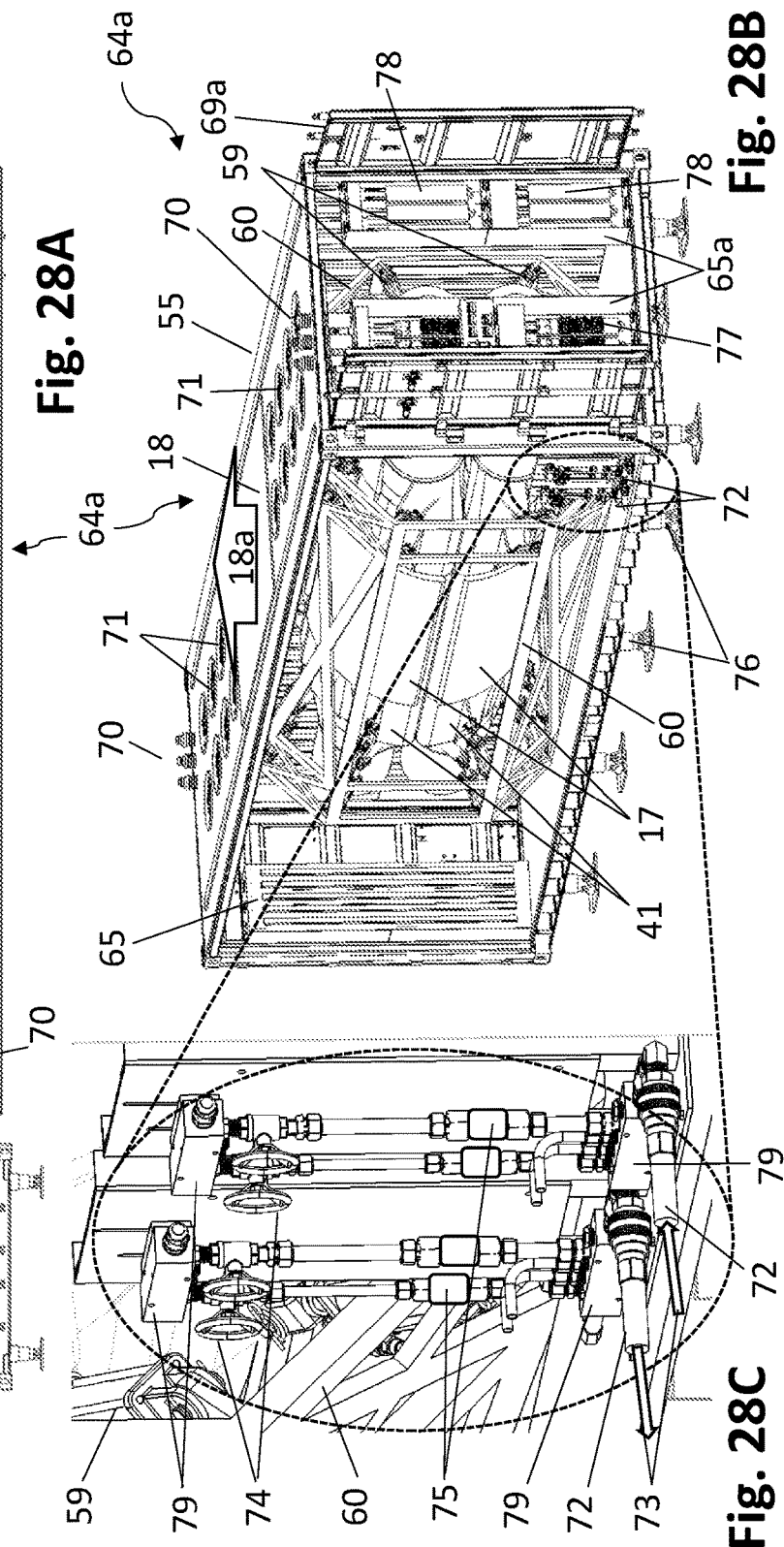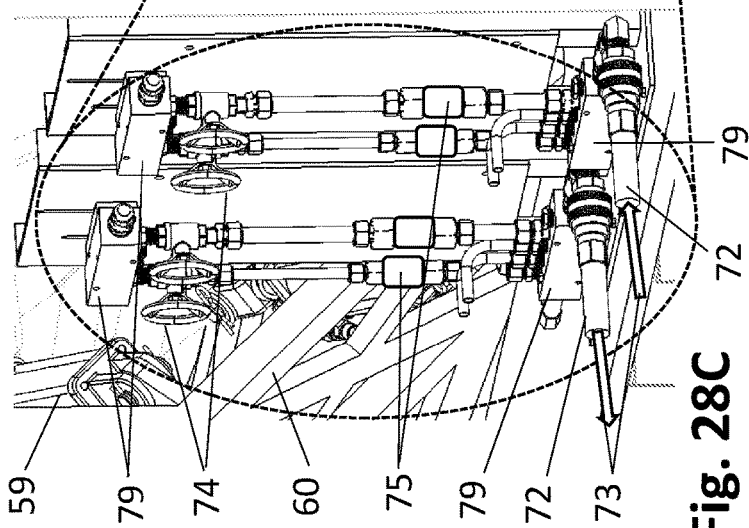
Fig. 28A
Fig. 28B
Fig. 28C

NUCLEAR POWER GENERATOR AND FUEL CARTRIDGES HAVING VARIABLE ELECTRIC LOAD CAPACITY TO POWER A SHIP PROPELLER

CROSS REFERENCE TO RELATED APPLICATIONS

This application is a continuation of U.S. non-provisional application Ser. No. 16/613,792, filed on Nov. 14, 2019, which is a national phase of international application No. PCT/US18/33979, filed on May 22, 2018, which claims priority to U.S. Provisional Application No. 62/509,303, filed May 22, 2017. The contents of all of the above-mentioned applications are incorporated by reference herein in their entirety.

TECHNICAL FIELD

The present disclosure relates generally to nuclear power generators, nuclear fuel cartridges for use in the nuclear power generators, and related methods.

DESCRIPTION OF RELATED ART

Nuclear generators comprise nuclear cores that naturally produce decay thermal energy after shutdown. Among several factors, the amount of energy nuclear fuel produces after shutdown is proportional to its power generation history and power density. To avoid overheating of the nuclear fuel, decay heat energy must be transferred from the nuclear core by redundant heat transfer mechanisms generally supported by heat transfer systems external to the core. These systems require complex networks of piping to thermal-hydraulically couple the pressure vessel containing the core to heat exchangers generally located at a certain distance from the vessel to the environment that serves as the Ultimate Heat Sink (UHS). Coolant flowing through the core and the heat exchangers may be actively circulated by electrically driven re-circulators (e.g., pumps and blowers). Alternatively, the coolant may be passively circulated through the core by gravity-driven natural circulation mechanisms based on coolant density changes. Modern nuclear reactors, independently of their size, rely on redundant core decay heat removal systems that may be operated passively, actively or a combination of both and are configured to operate external to the pressure vessel containing the nuclear fuel.

To remove thermal energy from the core, the designs adopting active safety features extensively rely on electric power for the core to be maintained within safe temperatures under all operating conditions as well as during core shutdown. To ensure safe operation, designs relying on active safety systems require access to electric power via dedicated redundant on-site emergency diesel generators and to off-site multiple power grids at all times.

Designs relying on passive safety features, on the other hand, rely on gravity and large inventories of coolant (e.g., water), generally stored in tanks or water storage structures (e.g., lined concrete pools) positioned at relatively high elevations with respect to the nuclear core. The elevation differential between the core and the coolant storage tank or structure is required to ensure that the coolant undergoes natural circulation siphoning and effectively removes decay thermal energy from the core. For passive safety features based on large coolant inventories, adequately providing long-term decay heat removal is highly dependent on the ability of replenishing coolant inventories over relatively short amounts of time. Core cooling effectiveness based on passive recirculation systems is highly dependent upon the UHS representing the environmental conditions. Generally, as environmental temperature increases, the ability to passively and effectively execute natural convective cooling becomes gradually impaired. As a result, passive decay heat removal based on gravity-driven coolant recirculation is best suited for nuclear generators operating in mild climates.

Passive and active safety systems are formed by components that generally develop externally to the pressure vessel containing the core. The result is a complex system of redundant piping, valves, and heat exchangers for passive systems with the addition of pumps/blowers and motive power managed and monitored by control cabling.

Nuclear cores of commercially operating reactors, as well as those of water moderated Small Modular Reactor (SMR) designs, are generally loaded with nuclear fuels cladded with materials that oxidize in the presence of high temperature water/steam. As the core experience overheating due to, for example, loss of coolant or failure of the active or passive core decay heat removal systems, chemical reactions between cladding materials and water/steam may result in the production of hydrogen. Hydrogen then accumulates and self-ignites, thereby posing severe safety challenges. To address the hydrogen-ignition issue in nuclear accidents, nuclear power plants employ redundant hydrogen management equipment to, for example, execute controlled ignitions and/or prevent accumulation of high hydrogen concentration. These safety systems do require electric power to operate and further add complexity to the overall balance of plant while increasing operating cost. Redundancies are generally the result of probabilistic risk assessments and postulated design basis accidents. Despite redundancies represented by multiple power grid accessibility, multiple emergency diesel generators, and the availability of on-site power grid supplied by batteries with a capacity to provide control and emergency motive power for several hours, core meltdown and hydrogen explosions have occurred throughout the history of nuclear power (e.g., see accident scenarios and consequences represented by the Fukushima Daiichi power station). This demonstrates that catastrophic accidents, as those triggered by beyond design basis accidents and represented by, for example, extreme seismic events (e.g., tsunami), combined with loss of power grid, have an unacceptable safety and economic impact even though their probability of occurrence is very low as predicted by probabilistic risk assessments.

One of the key requirements for transportable Micro Modular Reactor (MMR) or very-mall Modular Reactor (v-SMR) designs is the total weight represented by the power producing system. PCT International Application No. PCT/US2013/059445, filed Sep. 12, 2013, describes a "Modular Transportable Nuclear Generator" formed by a nuclear core integrated with the power conversion unit. In this example, the core is developed as a super-critical system controlled over time by active control mechanisms and burnable neutron absorbers embedded all together with the fuel. For this system to be operational, the total mass of the core, reflectors and shields are still too high for commonly available lifting and transporting equipment. Additionally, the heat rejection represented by this system during normal operations and off-normal conditions still poses serious challenges to ensure that the temperature at the center of a relatively large core remains within safe margins under all credible design basis operating and accident scenarios.

SUMMARY

Accordingly, there is a need for an improved modular nuclear power generator that may overcome one or more of the problems and issues discussed above. In particular, there is a need for an improved fuel cartridge for supporting loading and unloading operations of a distributable nuclear generator, where the nuclear generator utilizes a plurality of modular sub-components that can form a critical and/or super-critical nuclear power system by coupling the neutronics of the modular sub-components.

In addition, the present disclosure provides a sealed and scalable fuel cartridge having passive heat transfer elements to support fueling of transportable, fully-sealed sub-critical power generator modules. The fuel cartridge may provide passive thermal coupling and shielding to gamma radiation during transport and neutron and gamma radiation during normal operation. In some exemplary aspects, the disclosed fuel cartridge may satisfy one or more of the following characteristics: i) it is reinforced to function as structural, ballistic, and/or radiation shielding, with dimensions and geometrical shapes that can satisfy assembly with and removal from the pressure vessel of the power generator modules; ii) it can be configured to be inherently sub-critical and become super-critical only when multiple sub-critical modules containing a minimum number of fuel cartridges are assembled together to execute neutron coupling among multiple fuel cartridges, thus forming a whole nuclear core; iii) it does not require on-site balance of plant connections as it is fully sealed and ready to be loaded within the structures of sub-critical power modules and, therefore, does not require loading or unloading of working fluids and/or neutron moderators; iv) it only relies on environmental air for cooling through thermal coupling of the fuel cartridge internal elements or components with the power module's surfaces exposed to environmental air; v) it provides a universal fuel platform enabling different types of fuels and moderators to be coupled or interfaced without requiring special fuel and moderator manufacturing since the fuel and moderator are all contained and sealed within the fuel cartridge structure, which may ease loading with non-proliferant fuels enriched to less than 20%; vi) it is designed to fit within standardized radioactive waste disposal canisters at the end of the fuel cycle and can also be thermally coupled to Rankine power cycle components to convert thermal energy from decay heat to electricity while sealed within the standard spent fuel canister, which may enable expansion of underground permanent storage volume by relaxing repositories spent fuel thermal loading requirements; vii) it can be swapped, refurbished, and reloaded without exposing operators and equipment to its internals; viii) it provides a differential pressure boundary between the internal components and the external components of the fuel cartridges, which may eliminate the risks associated with mixing of the internal components (e.g., fluids and solids) with external components; ix) it includes hydraulic ports equipped with standard fittings to enable insertion, withdrawal and accurate positioning of sensors, probes and materials to be irradiated, which may enable instrumentation replacement or refurbishment, and production of radioisotopes for, for example, medical applications; x) its architecture provides shielding of sealable hydraulic ports integrated within the fuel cartridge to support safe operations during insertion/withdrawal and positioning of instrumentation (e.g., neutron detectors, thermocouples) and selected isotopes for radioisotope production; xi) it has multiple distinct pressure boundaries characterizing the fuel cartridges, which are hardened to withstand hostile attacks with features that may prevent or mitigate the release of volatiles even under sabotage scenarios resulting in breached fuel cartridge(s); xii) it provides passive heat transfer pathways by thermally coupling the fuel moderator and fuel components with the fuel cartridge's external shields and heat transfer surfaces relying on environmental air for natural convective heat transfer, conductive and radiative heat transfer from the internal components of the fuel cartridges; xiii) it provides multiple distinct pressure boundaries enabling operations with a first working fluid at high pressure, while maintaining the internals of fuel cartridge at a lower pressure; xiv) it includes sealable hydraulic ports that enable thermal coupling fluids and compounds to be loaded, discharged, and/or replaced; xv) it provides features to capture and contain fission products that could be released by damaged fuel elements (e.g., as a result of hostile attack/sabotage and other design basis attack scenarios); xvi) it provides fuel elements in the form of individual particles (e.g., TRISO microspheres) or monolithic fuel components or fuel bricks forming the moderator-fuel matrix, pseudo-homogenous mixtures of fuel and moderator particles, homogenous mixtures of liquid fuel and moderator, or heterogeneous mixtures of solid fuel represented by micro particles and liquid moderator; and xv) after shutdown, it can be passively cooled via thermal coupling to Rankine power cycle components that convert thermal energy from decay heat to electricity while remaining sealed within the modular sub-component forming the subcritical power module.

To attain the advantages and in accordance with the purpose of the invention, as embodied and broadly described herein, one aspect of the invention may provide a sealed, scalable fuel cartridge with passive-cooling features to support loading and unloading of distributable nuclear power generators.

Another exemplary aspect of the present disclosure may provide a nuclear fuel cartridge comprising a fuel matrix, a first header disposed on a first side of the fuel matrix, and a second header disposed on a second side of the fuel matrix opposite to the first side. The fuel matrix may comprise a plurality of fuel channels for receiving a nuclear fuel element and a plurality of cooling channels. The nuclear fuel cartridge may further comprise a plurality of cooling tubes through which a working fluid flows, where each of the plurality of cooling tubes passes through each corresponding cooling channel of the plurality of cooling channels. Each of the plurality of cooling tubes may have a first end connected to the first header and a second end connected to the second header. The nuclear fuel cartridge may include a pressure vessel defining an interior space for sealingly containing the fuel matrix, wherein the interior space for sealingly containing the fuel matrix comprises a pressure boundary independent from an interior of the plurality of cooling tubes, such that the interior space is not in fluid communication with the plurality of cooling tubes.

According to various exemplary aspects, the nuclear fuel cartridge may further comprise a filler medium filling the interior space.

In one exemplary aspect, the fuel matrix may comprise a plurality of fuel matrices disposed side by side in a layer. Alternatively or additionally, the fuel matrix may comprise a plurality of fuel matrices disposed on top of one another.

In another exemplary aspect, the nuclear fuel cartridge may comprise a plurality of caps with a flow opening, each of the plurality of caps being disposed over at least one end of each correspond fuel channel of the plurality of fuel channels to hold the fuel elements inside the fuel channels.

According to still another exemplary aspect, an outer surface of each of the plurality of cooling tubes may be spaced from an internal surface of each of the plurality of cooling channels.

In one exemplary aspect, the fuel matrix may comprise a plurality of fuel matrices stacked on top of one another and being movable relative to the plurality of cooling tubes.

In accordance with some exemplary aspects, a nuclear fuel cartridge may comprise a fuel matrix having a plurality of fuel channels for receiving a nuclear fuel element and a plurality of cooling channels. The fuel cartridge may further comprise a first header disposed on a first side of the fuel matrix; a second header disposed on a second side of the fuel matrix opposite to the first side; and a plurality of cooling tubes through which a working fluid flows. The plurality of cooling tubes may pass through the plurality of corresponding cooling channels, where each of the plurality of cooling tubes has a first end connected to the first header and a second end connected to the second header. The fuel matrix may be slidable along the plurality of cooling tubes.

In one exemplary aspect, the fuel matrix may be sealingly contained in a pressure vessel that defines a pressure boundary separate and independent from an interior of the plurality of cooling tubes. In another exemplary aspect, the fuel matrix may be sealingly contained in a pressure vessel that defines an interior space not in fluid communication with the plurality of cooling tubes.

Yet another exemplary aspect of the present disclosure may provide a nuclear fuel cartridge comprising a fuel matrix, a first header disposed on a first side of the fuel matrix, a second header disposed on a second side of the fuel matrix opposite to the first side. The fuel matrix may comprise a plurality of fuel channels for receiving a nuclear fuel element and a plurality of cooling channels. The fuel cartridge may further comprise a plurality of cooling tubes through which a working fluid flows, where the plurality of cooling tubes pass through the plurality of corresponding cooling channels. Each of the plurality of cooling tubes may have a first end connected to the first header and a second end connected to the second header, wherein an outer surface of each of the plurality of cooling tubes is spaced from an internal surface of each of the plurality of cooling channels.

Another exemplary aspect of the present disclosure may provide a method for retrofitting standard ISO containers to comprise multiple small power modules forming an operational power plant or power generator, and scaled-up individual power modules so as to form an operational power plant or power generator when multiple ISO containers, comprising individual scaled-up power modules, are assembled in the proximity of one another to satisfy the requirement of a variable geometry nuclear core. In this configuration, the variable geometry nuclear core is formed by multiple sub-critical power modules each contained within an individual standard ISO container. The ISO containers can be further retrofitted to comprise cooling surfaces thermally coupled with various components of the power module and the ISO container structures to form a waste heat recovery system and a passive cooling system for the power modules. In these configurations, the fuel cartridges heat exchangers loaded within each power module are thermally coupled to the passively air-cooled surfaces positioned and in some configurations defining the external boundaries of the retrofitted or re-engineered ISO container. The ISO containers further comprises fuel cartridges, radiation and ballistic shields and neutron reflectors to support reflector, radiation and ballistic shields features integral with each power module. The ISO container further comprising power conditioning equipment (e.g., inverters), electric fans, pumps, fittings, valves, power bus and power bus external interfaces, power module internal positioning system and control equipment, air-passages through the internals of the ISO container and the power module(s), remote control and monitoring equipment.

Another exemplary aspect of the present disclosure may also provide the power generators with features enabling seamlessly and non-invasively loading and installation within container ships cargo/container through structures normally utilized for positioning and mechanically securing cargo containers. In this configuration the power generators can be positioned above or below the ship main deck, with thermal transfer from the ISO container surfaces to the UHS, represented by air and/or the water surrounding the container ship. Thermal coupling of the power modules with container ship structures can include coupling with the ship ballast tanks and hull structures. In these configurations, the power generator can provide distributable electric power to the ship electric propulsion system and/or to the ship's auxiliaries.

Additional objects and advantages of the invention will be set forth in part in the description that follows, and in part will be obvious from the description, or may be learned by practice of the invention. It is to be understood that both the foregoing summary description and the following detailed description are exemplary and explanatory only and are not restrictive of the invention.

BRIEF DESCRIPTION OF THE DRAWINGS

The accompanying drawings, which are incorporated in and constitute a part of this specification, illustrate various embodiments consistent with the invention and, together with the description, serve to explain the principles of the disclosed invention.

FIGS. 24A-C are schematic and perspective views of the power modules shown in FIG. 23A, according to various exemplary embodiments consistent with the present disclosure.

FIGS. 25A-C are front and perspective views of the power modules shown in FIGS. 24B and 24C, where FIG. 25A illustrates a fully assembled power station formed by multiple power modules retrofitted to an individual transport ISO container; FIG. 25B illustrates a low-power power module transported within a transport ISO container; FIG. 25C illustrates a fully assembled power station formed by multiple high-power modules formed by multiple retrofitted ISO containers.

FIG. 25D illustrates a high-power power module transported by a transport ISO container.

FIGS. 26A-C are schematic top views of the power modules of FIGS. 24B and 24C disposed inside standard transport ISO containers with auxiliary equipment, according to an exemplary embodiment.

FIGS. 27A and 27B are front, perspective, and side views illustrating the high-power power rating power-module of FIG. 24C loaded within retrofitted ISO containers, according to one exemplary embodiment.

FIGS. 28A-C are front, top and perspective views of a fully operational power generator with detailed illustration of ports and fittings supporting process heat applications, according to various exemplary embodiments of the present disclosure.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
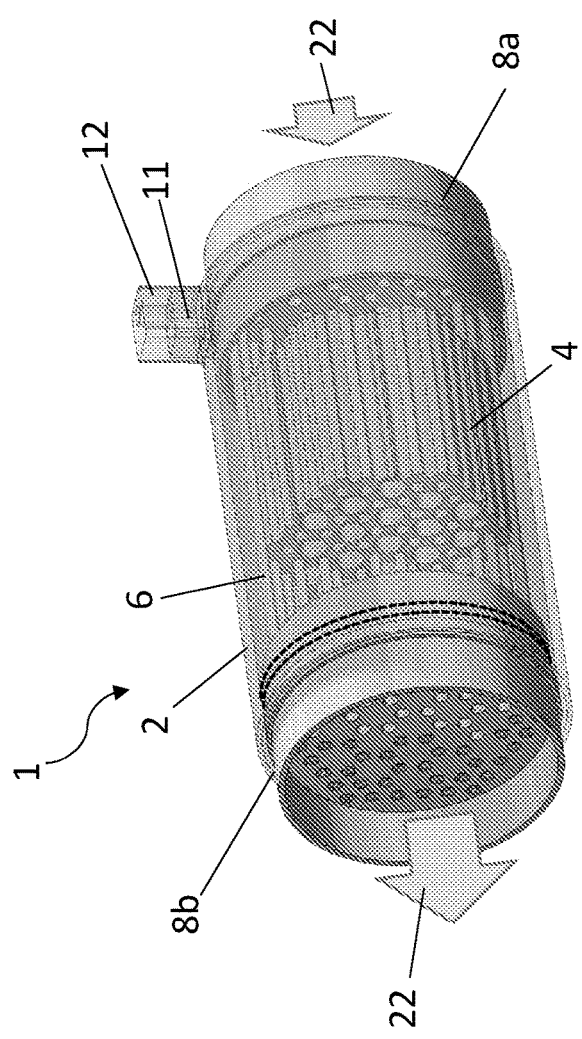
FIG. 1 is a perspective view of a fuel cartridge, according to one exemplary embodiment consistent with the present disclosure.
Figure 2:
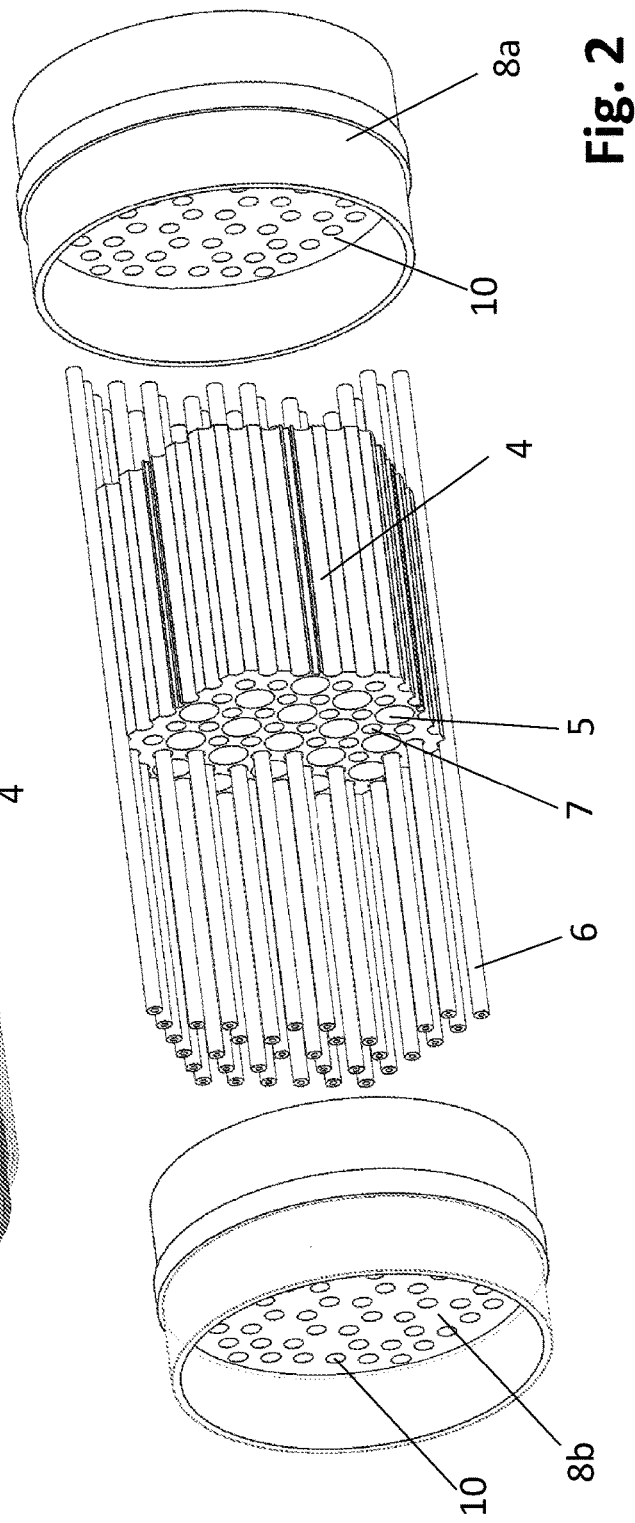
FIG. 2 is an exploded, pre-assembly view of the fuel cartridge shown in FIG. 1.
Figure 3:
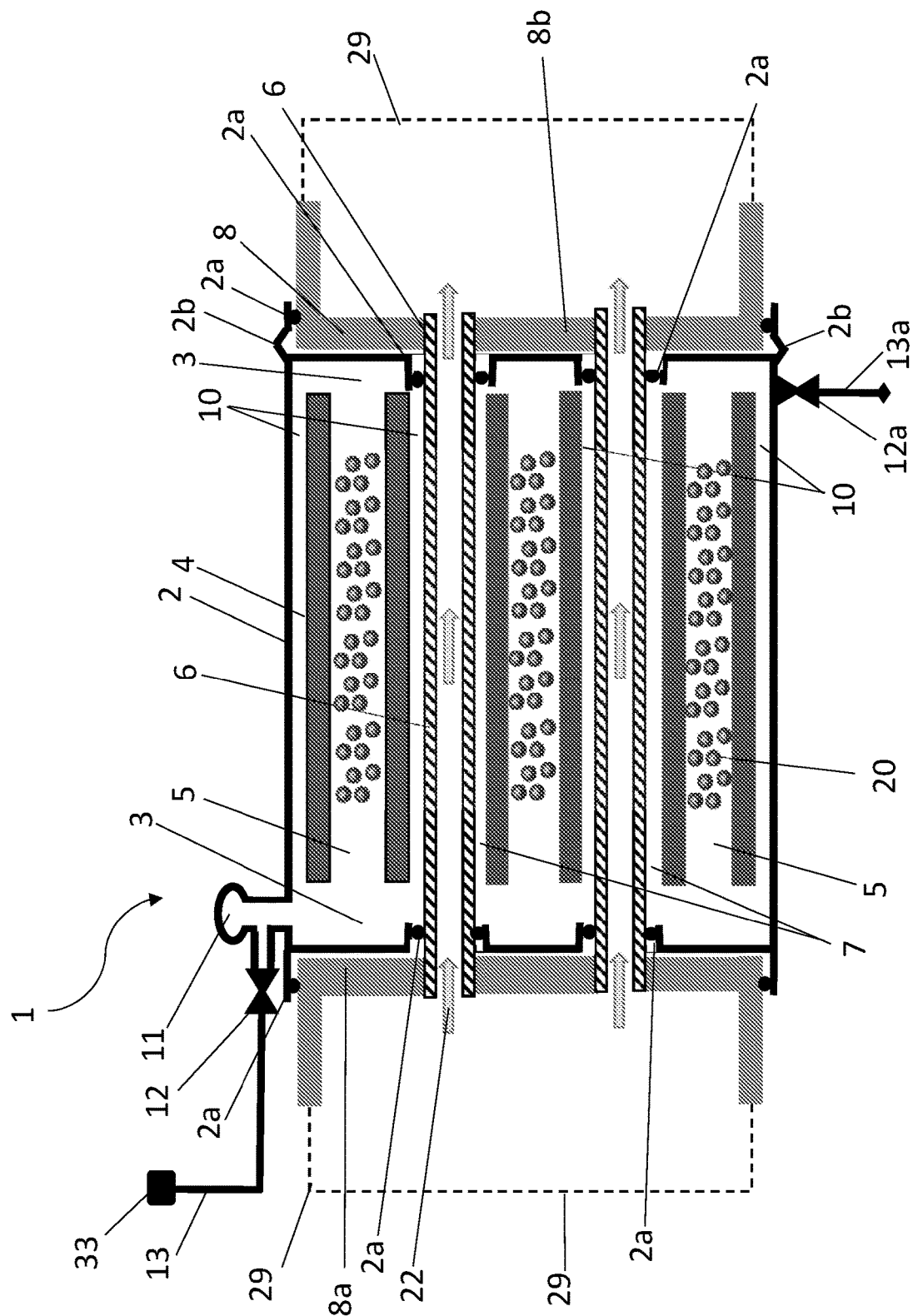
FIG. 3 is a schematic illustration showing a cross-sectional view of a fuel cartridge, according to one exemplary embodiment.

FIG. 1 shows a nuclear fuel cartridge 1 for containing nuclear fuel elements in a nuclear power reactor and/or a nuclear power module, according to one exemplary embodiment of the present disclosure. FIG. 2 shows various components of fuel cartridge 1 before assembly, and FIG. 3 schematically illustrates various components of fuel cartridge 1 in a two-dimensional cross-section. Fuel cartridge 1 may be configured for quick and easy loading and unloading to and from a nuclear reactor (e.g., nuclear power modules 41 and 42 shown in FIGS. 24B and 24C).

As shown in the figures, fuel cartridge 1 may include a fuel matrix 4, a first header 8a disposed on an inlet side of fuel matrix 4, and a second header 8b on an outlet side of fuel matrix 4. Fuel cartridge 1 may also include a pressure vessel 2 sealingly containing fuel matrix 4 and other related internal components between first header 8a and second header 8b. In the exemplary embodiment shown in FIGS. 1 and 2, each of first and second headers 8a and 8b may comprise a header plate with a plurality of tube ports 10 and a skirt extending from the header plate, and pressure vessel 2 may include a tubular body having its ends sealingly engaging the skirt of first and second headers 8a and 8b, respectively.

Figure 4:
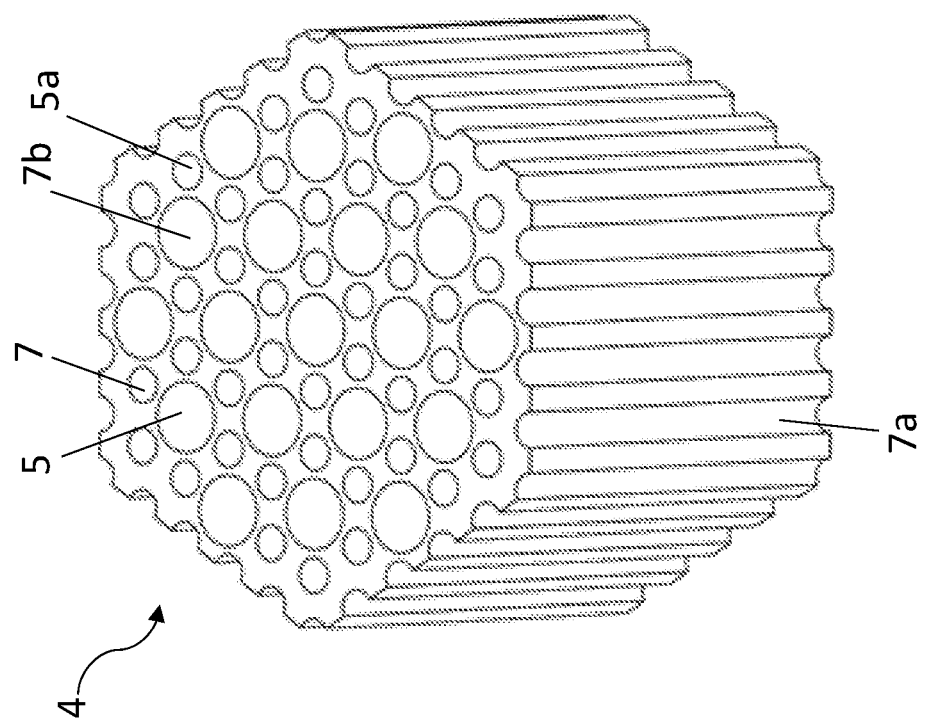

Fuel matrix 4 may define a plurality of fuel channels 5 for receiving fuel elements 20 and a plurality of cooling channels 7 for receiving a plurality of cooling tubes 6. As best shown in FIG. 4, fuel channels 5 and cooling channels 7 may have different diameters and pitch-to-diameter ratios. In some exemplary embodiments, at least some of fuel channels 5 and cooling channels 7 may be reversed, such that certain cooling channels 7 may be configured as fuel channels 5a to receive fuel elements 20 and certain fuel channels 5 may be configured as cooling channels 7b to receive cooling tubes 6. Fuel matrix 4 may also include a partial fuel or cooling channel 7a on the periphery of fuel matrix 4, as shown in, for example, FIG. 19. Partial fuel or cooling channel 7a can form a complete channel when two or more fuel matrices 4 are assembled together side by side.

Headers 8a and 8b may be manufactured with any conventional manufacturing equipment, and cooling tubes 6 can be formed with various materials (e.g., various steel alloys, silicon carbide, or titanium) adequate to sustain highly radiative environments, relatively high temperature, and high pressure. During manufacturing, cooling tubes 6 can be slid into tube ports 10 and sealed to headers 8a and 8b by various methods known in the art, such as, for example, welding and sintering.

Fuel matrix 4 can be formed of a suitable neutron moderating material, such as, for example, graphite, titanium, beryllium, hydrogen bearing material, and various metal alloys in liquid, solid, gaseous and super-critical (thermodynamically) forms.

Figure 5:
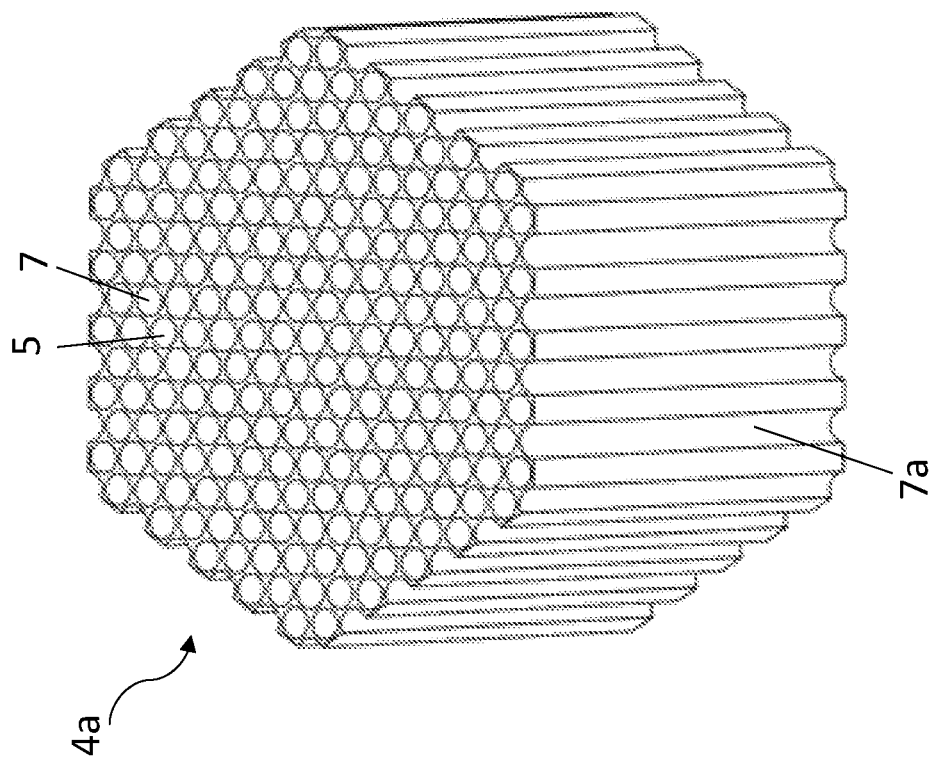
FIGS. 4 and 5 are perspective views of a fuel matrix, according to various exemplary embodiments.

FIG. 5 illustrates a fuel matrix 4a, according to another exemplary embodiment consistent with the present disclosure. In this embodiment, fuel matrix 4a differs from fuel matrix 4 shown in FIG. 4 in that fuel channels 5 and cooling channels 7 have substantially the same diameters and are staggered with a pitch-to-diameter ratio so as to fill the fuel matrix 4a.

Figure 6:
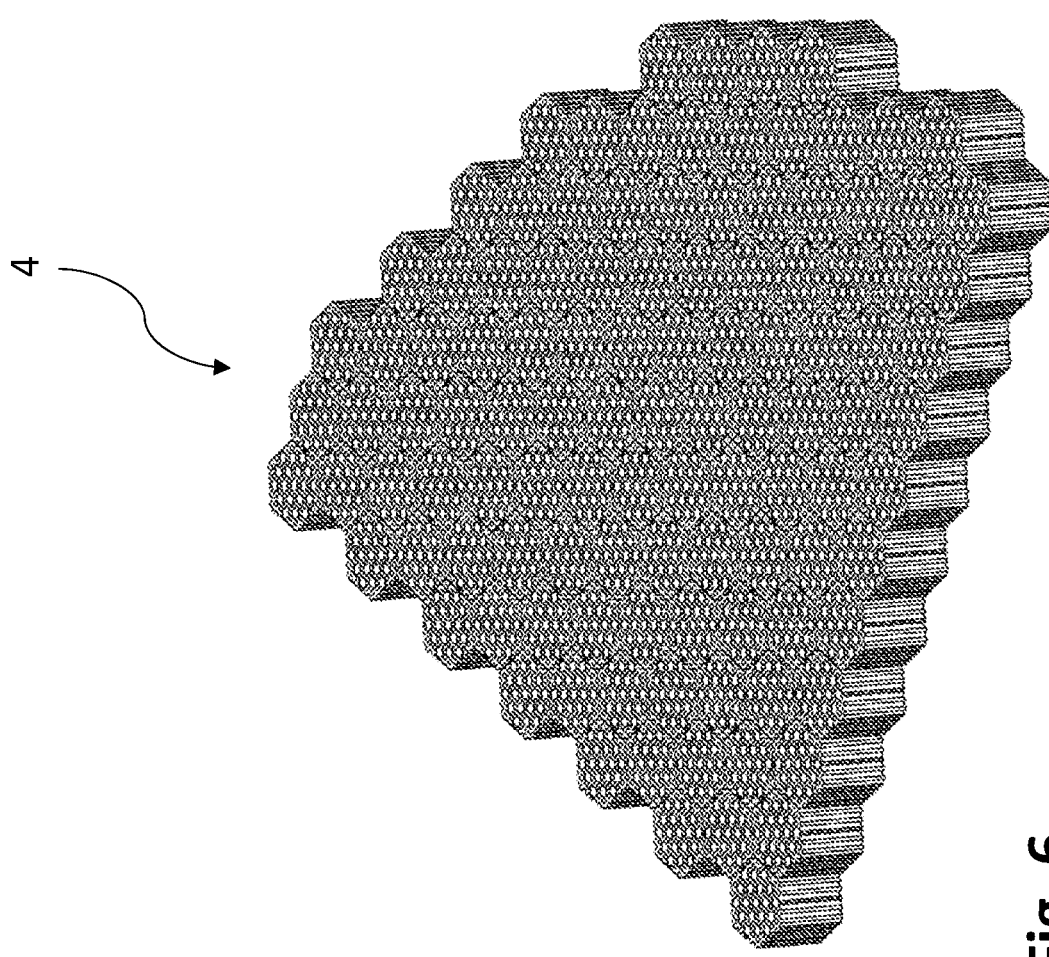
FIG. 6 is a partial, perspective view of a plurality of fuel matrix assembled together to form a layer of fuel matrices.
Figure 21:
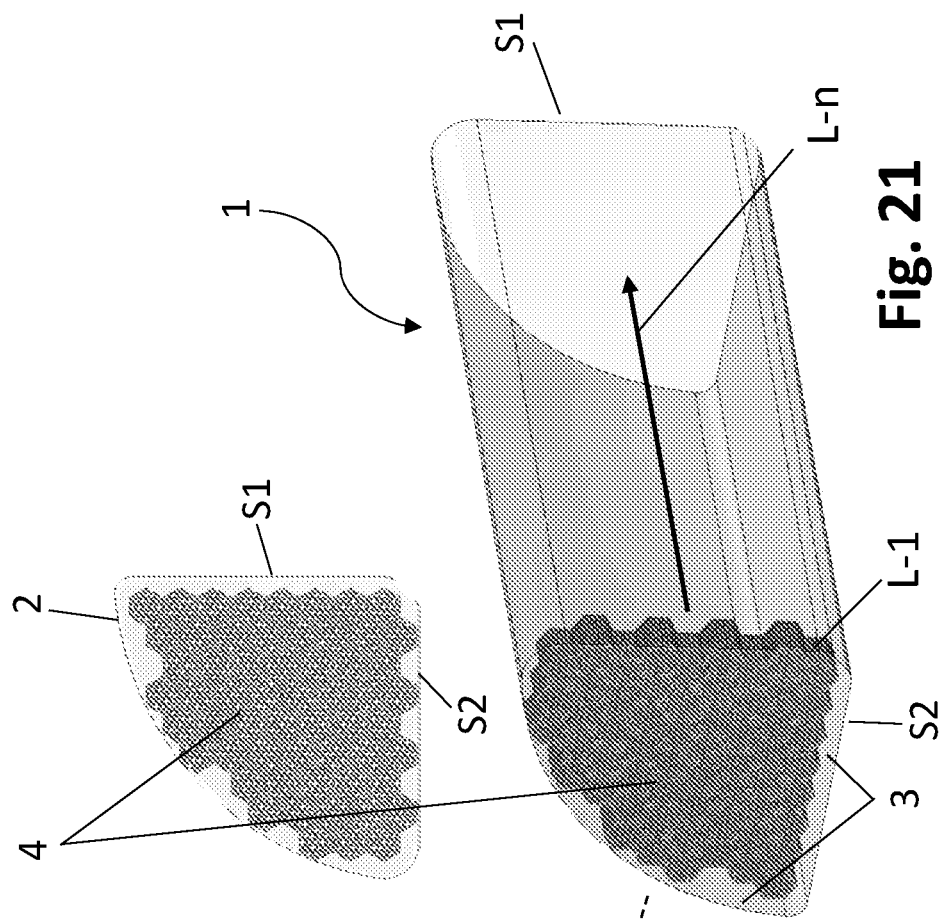
FIG. 21 is a perspective view of a fuel cartridge, according to an exemplary embodiment.
Figure 22:
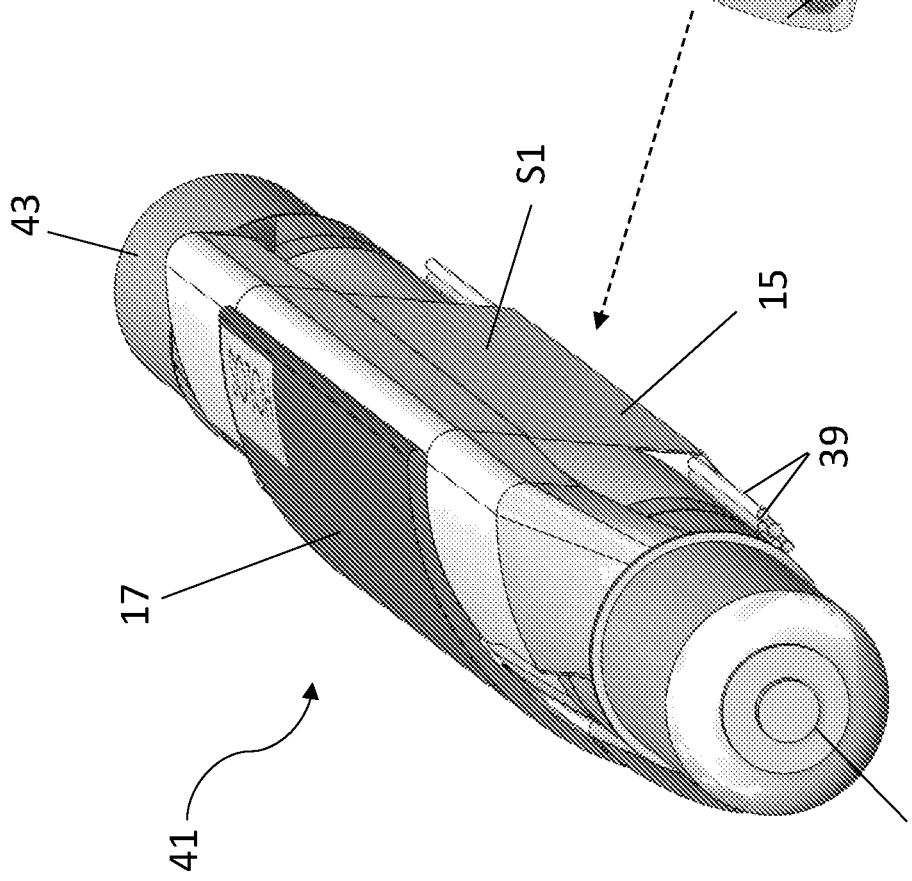
FIG. 22 is a schematic illustration of a sealed power module comprising the fuel cartridge of FIG. 21, according to one exemplary embodiment.

FIG. 6 illustrates a plurality of fuel matrices 4 assembled to form a layer of desired shape, according to one exemplary embodiment. As shown in the figure, a layer of fuel matrix 4 may have a shape that may fit into a quadrant of a circle (e.g., as shown in FIGS. 21 and 22). It should be noted, however, that any other core geometrical shape can be formed by assembling multiple fuel matrices 4 or 4a. The relatively small dimensions of each fuel matrix 4 or 4a when assembled to form the plurality of fuel matrices 6 enable following the contours of a desired shape with high-resolution.

Referring back to FIGS. 1-3, cooling tubes 6 may be inserted through corresponding cooling channels 7 and be secured (e.g., welded) to first and second headers 8a and 8b at their opposing ends to provide mechanical support to fuel matrix 4. In this configuration, fuel matrix 4 can slide, expand, and contract over cooling tubes 6 without concentrating mechanical stresses. Cooling tubes 6 may also be hydraulically connected to and aligned with corresponding tube ports 10 of first and second headers 8a and 8b. In operation, a working fluid 22 (e.g., coolant) enters fuel cartridge 1 via tube ports 10 of first header 8a, passes through cooling tubes 6 disposed inside cooling channels 7, and exits fuel cartridge 1 via tube ports 10 of second header 8b. As will be described in more detail later, working fluid 22 does not mix with a fluid inside pressure vessel 2.

It should be understood that, while the embodiment shown in FIGS. 1 and 2 includes only a single fuel matrix 4, fuel cartridge 1 consistent with the present disclosure may include a plurality of fuel matrices 4. For example, as will be described further herein, fuel cartridge 1 may include multiple fuel matrices 4 clustered side by side in a layer and/or stacked on top of one another to form any desired geometries, as shown in, for example, FIGS. 6 and 21. Further, it should be understood that, although FIGS. 1 and 2 do not show all of cooling tubes 6 inserted into cooling channels 7, fuel cartridge 1 has cooling tubes 6 inserted into all of cooling channels 7 and connected in fluid communication to tube ports 10 of headers 8a and 8b.

Fuel matrix 4 and pressure vessel 2 of fuel cartridge 1 may define an interior space 3 between first and second headers 8a and 8b, which can be filled with a suitable filler medium. As used herein, interior space 3 may refer to a substantially closed volume within pressure vessel 2 that is not occupied by fuel elements 20 (e.g., non-fuel volume) or fuel matrix 4 (e.g., non-moderator volume). The filler medium may be in the form of a liquid (e.g., liquid metal), a liquid-solid mixture, or a solid with adequate expansion, contraction, and thermal conductivity to ensure passive heat transfer from the internal components of fuel cartridge 1 to working fluid 22 passing through cooling tubes 6. The filler medium can also be in the form of a gas or a gas-liquid mixture. In one exemplary embodiment, the filler medium may include a material that may chemically bond with volatile radionuclides that may be released from fuel elements by, for example, precipitating and trapping the volatiles with the filler medium so that they can be safely retrieved and stored when fuel cartridge 1 is reloaded, refurbished or decontaminated.

In some exemplary embodiments, the filler medium may include a neutron moderating material, which may or may not be the same as the material forming fuel matrix 4. The filler medium may also include a neutron burnable poison.

The filler medium may enable heat transfer (e.g., via thermal conduction and convection) while allowing expansion and contraction of various internal components (e.g., fuel matrix 4, cooling tubes 6, fuel elements 20, etc.) of fuel cartridge 1 inside pressure vessel 2, without concentrating mechanical stresses or causing fatigue at the interfaces between cooling tubes 6, headers 8a and 8b, and fuel matrix 4.

Cooling channel 7 may be slightly larger than cooling tube 6, creating a gap 10 between the outer surface of cooling tube 6 and the inner surface of cooling channel 7. Gap 10, being part of interior space 3, may be filled with the filler medium and may have variable clearance. In operation, the outer surface of cooling tubes 6 is exposed to the interior space 3 inside pressure vessel 2 and, as a result of working fluid 22 flowing through cooling tubes 6, its outer diameter may decrease or increase, thus effectively shrinking or expanding the outer diameter and surface of cooling tubes 6. Conversely, and simultaneously, as fuel matrix 4 heats up due to heat generation in fuel elements 20, the inner diameter and inner surface of cooling channels 7 may increase due to thermal expansion.

Heat transfer between fuel matrix 4 and the walls of cooling tubes 6 can be enhanced through filling gaps 10 with the filler medium. For example, when the filler medium is a liquid, interior space 3 including gaps 10 can be flooded with the filler medium so as to ensure that fuel elements 20 are thermally coupled to cooling tubes 6 at all times, directly as, for example, shown in FIG. 16, or indirectly through the solid, liquid, or mixed solid-liquid material forming fuel matrix 4, regardless of change in the clearance of gap 10. In addition, the filler medium ensures passive thermal heat transfer between the internal components of fuel cartridge 1 and the walls of pressure vessel 2 without requiring circulation of working fluid 22 or balance of plant, as will be detailed herein later.

In one exemplary embodiment, the filler medium may be supplied to interior space 3 of pressure vessel 2 via gravity or pressure (e.g., via pump). For example, fuel cartridge 1 may include an inlet 13a with an inlet valve 12a for loading the filler medium into interior space 3 and an outlet 13 with a discharge valve 12 for evacuating, purging, or unloading the filler medium from interior space 3. Fuel cartridge 1 may also include a reservoir 11 for accumulating potential volatile radionuclides released from fuel elements 20. Reservoir 11 may also be configured to compensate the volume variations of the filler medium inside pressure vessel 2 resulting from temperature changes. Further, inlet valve 12a and discharge valve 12 may be configured to discharge any volatile radionuclides accumulated in reservoir 11. In some exemplary embodiments, volatile radionuclide sensor 33 may be positioned on or near outlet 13 to detect the presence of any volatile radionuclide or signals indicative of damage or failure in fuel elements, and/or to trigger shutdown of fuel cartridge 1, as well as operation of discharge valve 12a.

Inlet valve 12a and discharge valve 12 can be configured to regulate the pressure inside pressure vessel 2. This pressure can be maintained at values to counter the maximum internal pressure generated by fuel elements 20 as gases may be produced by, for example, the kernel of fuel elements 20 during fission processes, thus minimizing stresses within the fuel elements 20.

Pressure vessel 2 seals and contains the internal components of fuel cartridge 1 against a turbomachinery pressure boundary 29 represented in FIG. 3 as continuations of headers 8a and 8b that are connected through the internal passageways of cooling tubes 6. Sealing pressure vessel 2 may enable creating and maintaining a separate pressure boundary different and isolated from turbomachinery pressure boundary 29, where working fluid 22 can flow through cooling tubes 6 at a pressure different from that inside pressure vessel 2.

According to various exemplary embodiments of the present disclosure, pressure vessel 2 may have different sealing configurations. For example, in the exemplary embodiment shown in FIG. 3, pressure vessel 2 may include a plurality of sliding seals 2a disposed at locations where pressure vessel 2 sealingly interfaces with headers 8a and 8b and cooling tubes 6. Sliding seals 2a may allow relative movement between pressure vessel 2 and headers 8a and 8b or cooling tubes 6 to sufficiently accommodate expansion or contraction of various components inside pressure vessel 2 and/or cooling tubes 6 caused by, for example, temperature variations. Pressure vessel 2 may also include one or more flexible members 2b configured to allow pressure vessel 2 to expand and contract. Accordingly, the pressure boundary defined by pressure vessel 2 can expand or contract at different rates compared to the expansion and contraction rates of cooling tubes 6, while maintaining sealing of the internal components of fuel cartridge 1.

Figure 7:
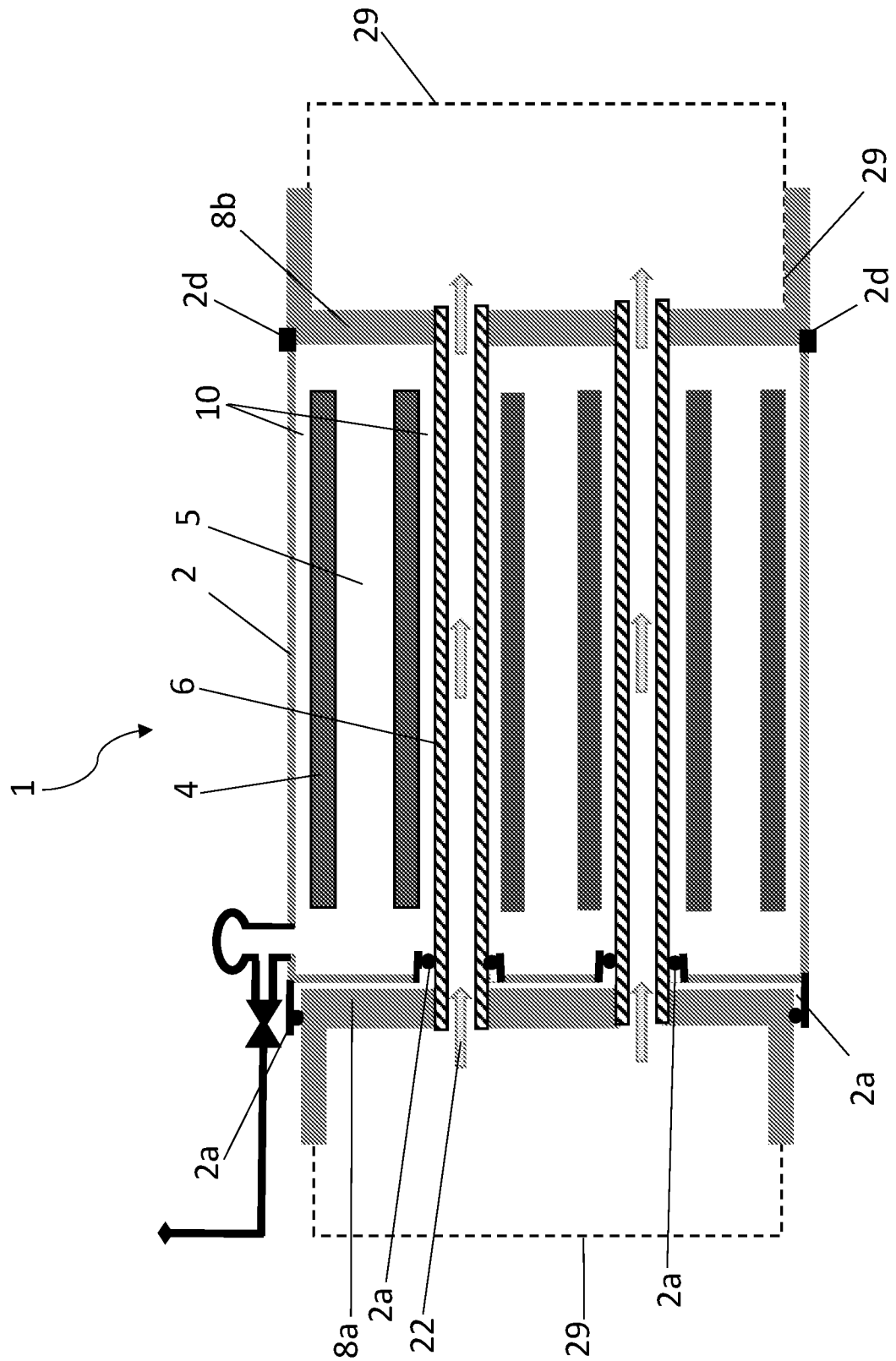
FIG. 7 is a schematic illustration showing a cross-sectional view of a fuel cartridge, according to another exemplary embodiment.

According to another exemplary embodiment, at least some of sliding seals 2a in the embodiment shown in FIG. 3 can be replaced with permanent seals. For example, as shown in FIG. 7, the ends of cooling tubes 6 may be welded to headers 8a and 8b, and pressure vessel 2 may be welded to the skirt of second header 8b with permanent seals 2d while pressure vessel 2 may be allowed to slide with respect to first header 8a and cooling tubes 6 via sliding seals 2a. In this configuration, sliding seals 2a in first header 8a enables fuel cartridge 1 to undergo mechanical contraction or expansion without concentrating mechanical stresses in the pressure boundaries formed by pressure vessel 2 and turbomachinery pressure boundary 29. In an alternative embodiment, pressure vessel 2 may be welded to first header 8a and allowed to slide with respect to second header 8b.

Figure 8:
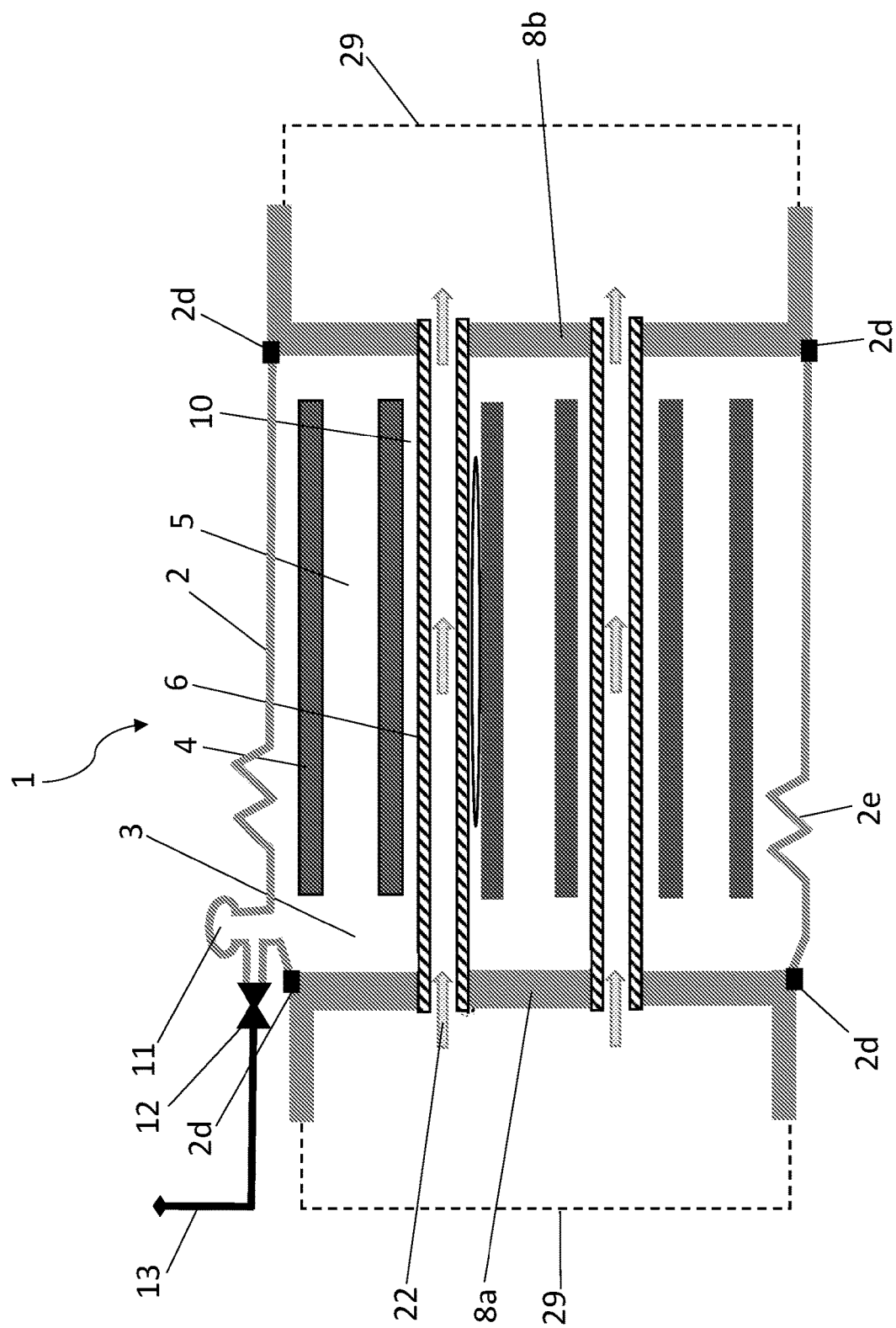
FIG. 8 is a schematic illustration showing a cross-sectional view of a fuel cartridge, according to still another exemplary embodiment.

In still another exemplary embodiment, the walls of pressure vessel 2 and the walls of headers 8a and 8b may be integrally formed by, for example, casting or machining them as a single piece or joining them together by welding, as shown in FIG. 8. As cooling tubes 6 expand or contract as a result of temperature gradients, headers 8a and 8b may conserve a certain degree of freedom and can mechanically move (e.g., expand/contract) to eliminate or mitigate thermally-induced stressors (e.g., expansion and contraction of internal components of fuel cartridge 1). In the exemplary embodiment shown in FIG. 8, the wall of pressure vessel 2 may include one or more flexible supporting members 2e to enhance the flexibility and facilitate the movement.

Cooling tubes 6, with their inlet/outlet sealed to headers 8, may form an independent pressure boundary with turbomachinery pressure boundary 29, which can have a pressure different from the pressure inside fuel cartridge 1 and can ensure no physical contact between working fluid 22 and the interior of pressure vessel 2.

Figure 9:
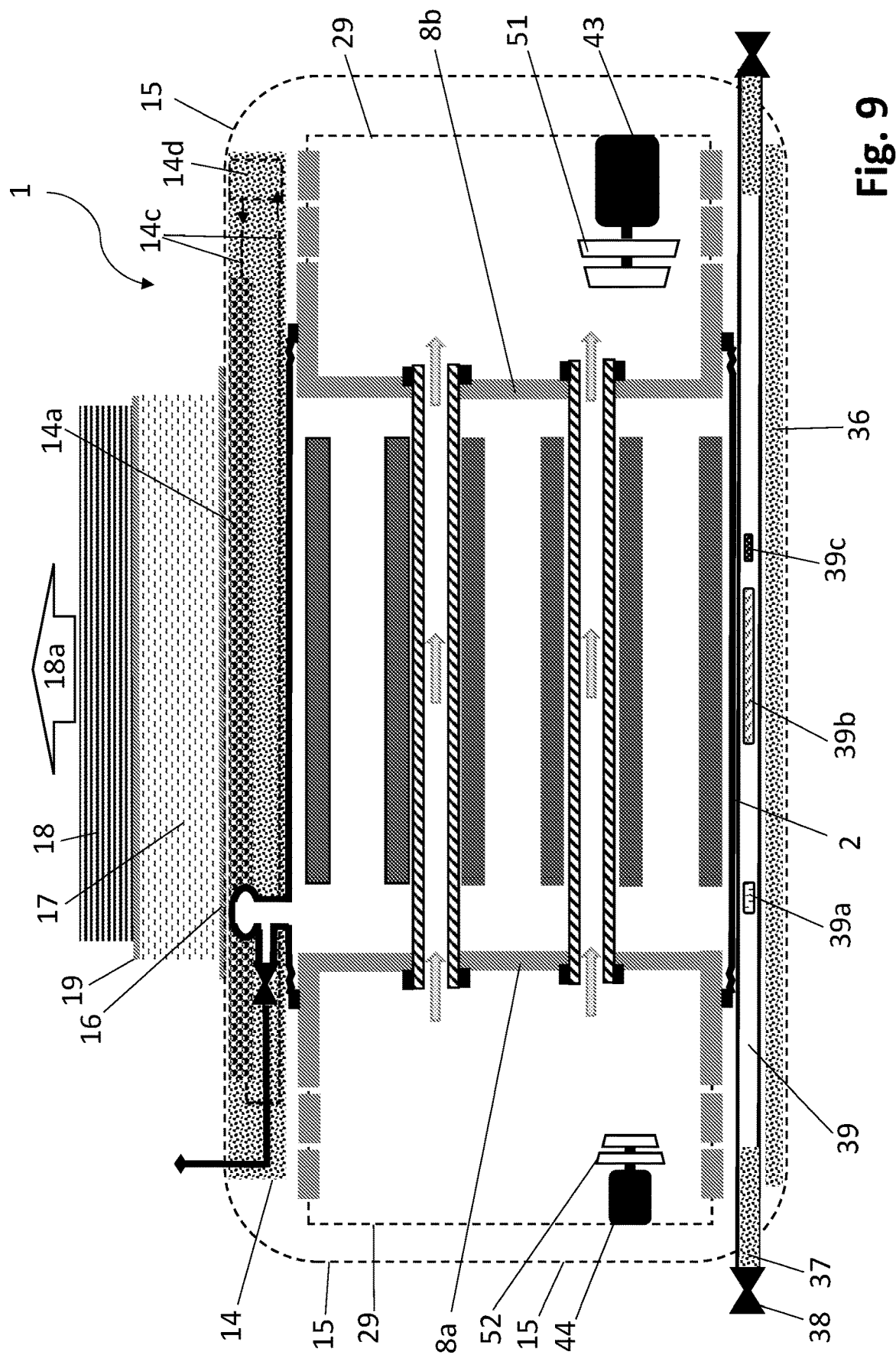
FIG. 9 is a functional schematic and cross-sectional view of the fuel cartridge of FIG. 3.

Referring to FIG. 9, which illustrates an exemplary embodiment of a multi-containment structure of fuel cartridge 1, fuel cartridge 1 can include a multiple number of physically distinct and independent pressure boundaries to provide, among other things, multiple safeguards against any potential radionuclide release to the environment. For example, the pressure boundaries may include a pressure boundary formed by individual fuel elements 20 (i.e., first containment to potential radionuclide leakage), a pressure boundary formed by pressure vessel 2 (i.e., second containment to potential radionuclides from fuel elements 20), turbomachinery pressure boundary 29 encompassing turbomachinery and electric machines that form a power conversion system, and a containment 15 (sometimes also referred to as pressure boundary 15 or third containment pressure boundary 15 herein) substantially enclosing pressure vessel 2 and turbomachinery pressure boundary 29 (third containment to potential radionuclides from fuel elements 20). These pressure boundaries provide multiple, redundant containment structures for preventing potential radionuclide leakage to the environment.

Turbomachinery pressure boundary 29 may enable operation at high-pressure as needed to operate with different working fluids and to obtain high-efficiency of the turbomachinery components (e.g., power turbine 51 and compressor turbine 52). The pressure boundary defined by pressure vessel 2 enables independent pressurization and depressurization of the internal components of fuel cartridge 1, with pressurization/depressurization capability spanning from below atmospheric to medium-high pressures.

As shown in FIG. 9, fuel cartridge 1 may include a peripheral reflector 14 surrounding at least a portion of pressure vessel 2. Peripheral reflector 14 may be integrally formed with the walls of pressure vessel 2. In some exemplary embodiments, peripheral reflector 14 may constitute at least a portion of the walls of pressure vessel 2 or may be disposed inside pressure vessel 2, or may be disposed outside of pressure vessel 2. Peripheral reflector 14 may serve as a neutron reflector to reflect neutrons leaking from fuel matrix 4 back into fuel matrix 4.

Peripheral reflector 14 may be formed of a homogeneous material. In an alternative embodiment, peripheral reflector 14 may be formed of a composite material with varying material characteristics at least in the portion immediately adjacent to fuel matrix 4. For example, the material characteristics in peripheral reflector 14 may vary along the depth direction away from fuel matrix 4. In one exemplary embodiment, the material closer to fuel matrix 4 may have high neutron reflection characteristics, and the material away from fuel matrix 4 may have high neutron attenuation and capture characteristics. In addition to the neutron reflection, peripheral reflector 14 may serve multiple other functions. For example, peripheral reflector 14 may additionally provide radiation shielding, passive heat transfer mechanism, and/or mechanical strength against ballistic threat, as will be described further herein. Peripheral reflector 14 may also provide mechanical support for headers 8a and 8b, while allowing mechanical expansion and contraction of fuel cartridge 1.

In some exemplary embodiments, peripheral reflector 14 may include a variable density shield 14a disposed inside pressure vessel 2. Additionally or alternatively, variable density shield 14a may be part of the pressure boundary formed by pressure vessel 2 or the pressure boundary formed by pressure boundary 15, which is shown in FIG. 9 as a dashed line encompassing fuel cartridge 1 and turbomachinery pressure boundary 29.

Variable density shield 14a can be configured to house flow channels 14c for a neutron control fluid to circulate through neutron scattering/absorption control system 14d, where the neutron control fluid can be a solution with neutron absorbing material, such as, for example, boron. In some exemplary embodiments, the neutron control fluid can support an Organic Rankine Cycle (ORC) operations when fuel cartridge 1 is in operation and in a shutdown condition.

Figures 23A, 23B:
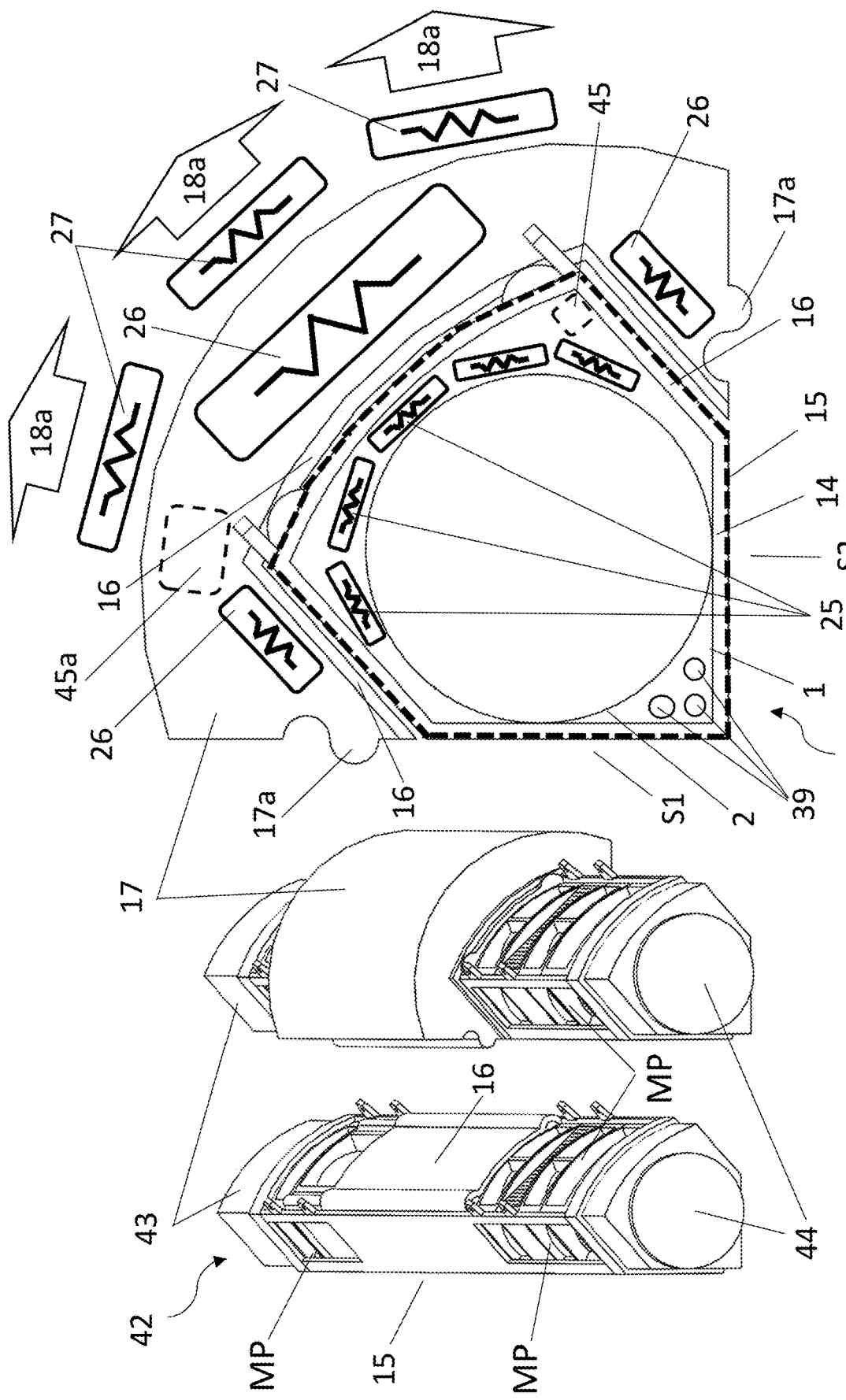
FIG. 23A is a perspective view of a scaled-up high power rating power-module, shown with and without shielding having heat exchangers, according to an exemplary embodiment of the present disclosure.
FIG. 23B is a cross-sectional and schematic view of the high-power rating power-module of FIG. 23A, illustrating heat exchangers coupled to neutron reflectors and shields, according to one exemplary embodiment.

Pressure boundary 15 may include all of the components forming a power module, such as a power module 41 shown in FIG. 22 or a power module 42 shown in FIGS. 23A and 23B, which may include a motor 44 and a driving compressor 52 in the upstream side of fuel matrix 4 and a turbogenerator 43 and a power turbine 51 in the downstream side of fuel matrix 4.

Within pressure boundary 15, one or more sleeves 39 may be disposed along the length of fuel matrix 4, as shown in FIG. 9. Sleeve 39 defines an internal passage through which various instrumentation or sensors 39a, control materials (e.g., neutron absorbing media) 39b, and/or isotope production capsules 39c can be removably inserted (see also FIGS. 22 and 23B). More specifically, sleeve 39 may enable operators to insert, position, withdraw instrumentation 39a (e.g., neutron detectors, thermocouples, etc.) to support, for example, refurbishing of damaged instrumentation. Sleeve 39 may also enable operators to insert and/or withdraw control material 39b. Additionally, sleeves 39 may enable operators to insert, position and withdraw a capsule 39c dedicated to support the production of radioactive isotopes (e.g., medical radioactive isotopes).

Sleeve 39 may represent another distinct and independent pressure boundary with an inlet and/or outlet port 38 located outside pressure boundary 15, such that sleeve 39 may operate at a pressure independent of the pressure inside pressure boundary 15, such as, for example, at atmospheric pressure. Sleeve 39 may include a plug 37 adjacent to port 38, and plug 37 may be formed of a suitable material for radiation shielding and/or neutron reflection. To operate sleeve 39, an operator may open port 38 and remove plug 37 to gain access to the internal passage of sleeve 39.

Sleeve 39 may be embedded in or pass through peripheral reflector 14. In some exemplary embodiments where multiple power modules 41 or 42 (see, e.g., FIGS. 25A and 25E) are utilized for neutron coupling and define a central location between and among multiple power modules 41 or 42, sleeve 39 may be embedded in an internal reflector 36 positioned in a central location with respect to the core formed when coupling multiple power modules, as shown in FIG. 9. While internal reflector 36 may be part of peripheral reflector 14, internal reflector 36 can be configured to only perform neutron reflection and/or scattering. At this central location, the neutron flux is at maximum, and the thickness and materials forming the internal reflector 36 may be selected to enable neutron leakage out of fuel cartridge 1 while maintaining the integrity of all pressure boundaries characterizing fuel cartridge 1.

As shown in FIG. 9, fuel cartridge 1 may be at least partially surrounded by a first shield 17. Disposed on the outside or inside pressure boundary 15 between peripheral reflector 14 and first shield 17 may be a first thermal coupler 16 for passively and thermally coupling the internal components of fuel cartridge 1 to first shield 17. First thermal coupler 16, formed of a material having a high thermal conductivity, may be configured to passively transfer thermal energy from the internal components of fuel cartridge 1 to ultimate heat sink (UHS) 18a through a second shield 18.

UHS 18a can be a cooling fluid, such as, for example, environmental air and/or water. UHS 18a can also be any medium associated with structures, panels, and/or plates forming energy-requiring equipment and thermally coupled to cooling sources (e.g., see FIGS. 33 and 34). UHS 18a can be thermally coupled to first shield 17 through a second thermal coupler 19 and second shield 18, where second thermal coupler 19 may be formed of a high conductivity material. Overall, thermal energy from the internal components of fuel cartridge 1 can passively flow through the various pressure boundaries and their structural components (e.g., peripheral reflector 14, first shield 17, and second shield 18) as they are all thermally coupled starting from the filler medium internal to pressure vessel 2, first thermal coupler 16, and second thermal coupler 19 into UHS 18a.

First shield 17 and second shield 18 may provide radiation and ballistic shielding, where second shield 18 may be equipped with fins to increase its surface area and heat transfer coefficient when UHS 18a constitutes fluids (e.g., air and/or water). In some configurations, second shield 18 may be thermally coupled to additional heat transfer surfaces exchanging thermal energy with UHS 18a, as for example, the external surfaces of ISO container 55 shown in FIG. 25A, 26A-26C, 27A-27B, 28A-28B, and 29, or through the ORC components housed within independent auxiliary equipment containers 80 shown in FIG. 30.

Figure 10:
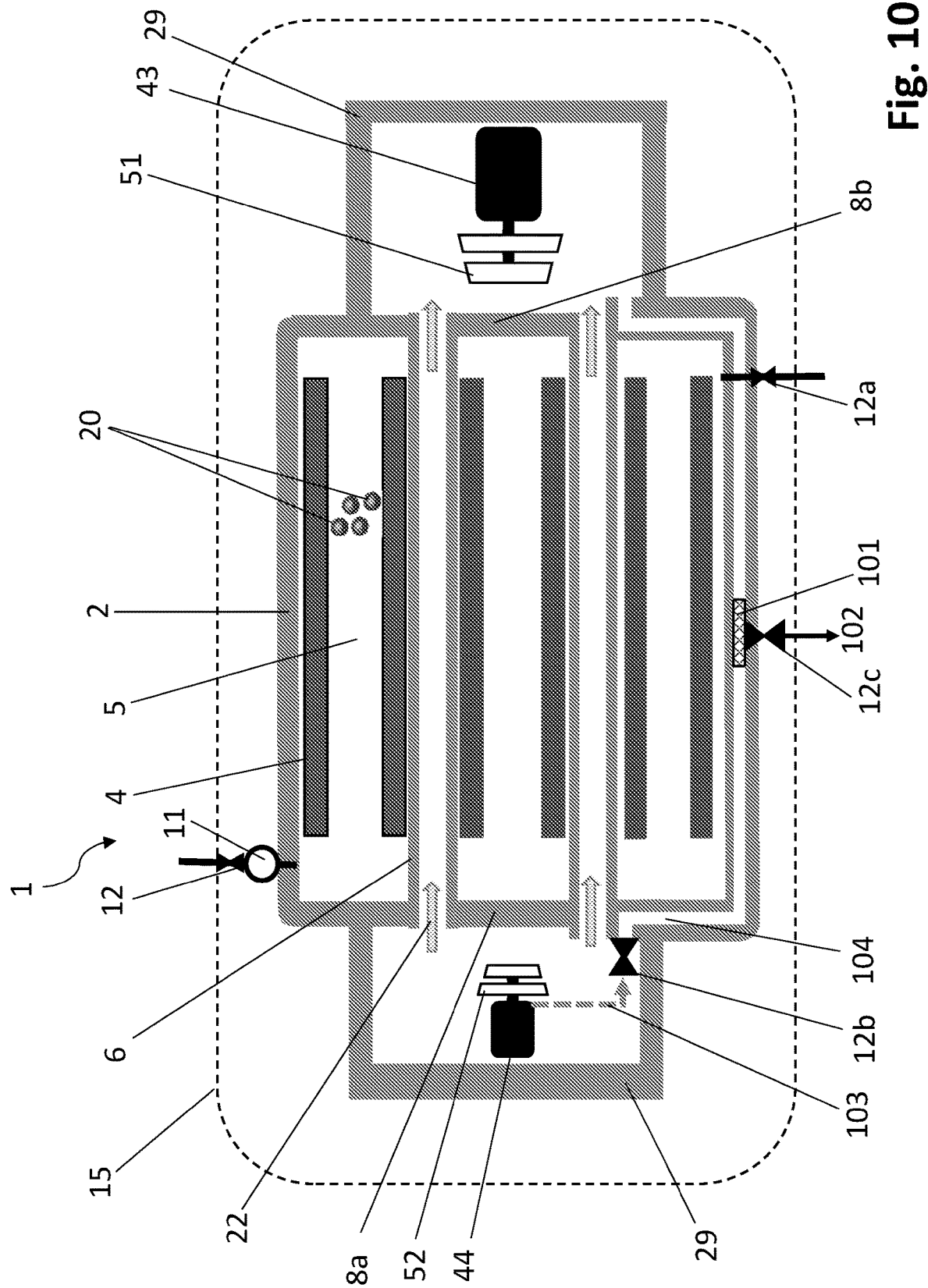
FIG. 10 is a simplified functional schematic of a fuel cartridge, illustrating multiple pressure boundaries and multiple containments, according to some exemplary embodiments.
Figure 11:
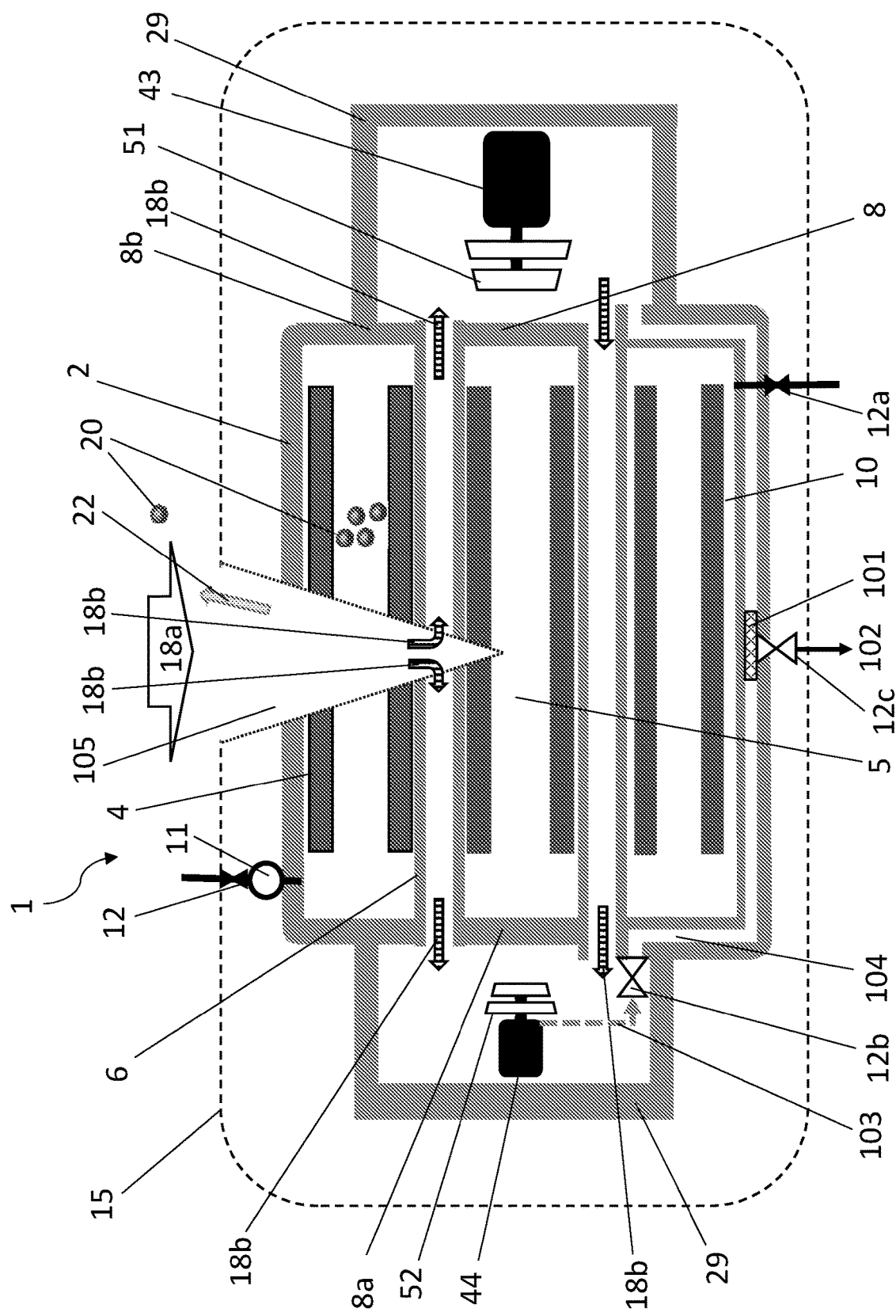
FIG. 11 is a simplified functional schematic of a fuel cartridge, illustrating safety features dedicated to mitigating radionuclide release to environment during an accident condition.

FIG. 10 provides a simplified representation of fuel cartridge 1 illustrating multiple pressure boundaries and containments. As explained above, fuel cartridge 1 consistent with exemplary embodiments of the present disclosure includes multiple pressure boundaries configured to prevent transport of potential radionuclides from fuel elements 20 to the various components forming the power modules (see, e.g., FIGS. 24A, 24B, and 25C) and across pressure boundary 15 into the environment. FIGS. 10 and 11 also illustrate a safety feature configured to mitigate potential radionuclides leakage into the environment in case of a rupture of the multiple pressure boundaries caused by, for example, ballistic events (e.g., missile hit).

Starting with fuel element 20, the first containment for preventing the escape of radionuclides may be the structure of fuel element 20 itself, which is formed by a pressure resistant materials, such as, for example, silicon carbide, zirconium alloy and other suitable cladding materials. Fuel elements 20, according to various exemplary embodiments of the present disclosure, may comprise multi-layered TRIstructural-ISotropic (TRISO) fuel. As shown in, for example, FIG. 12, TRISO fuel may include a fuel kernel 20a formed of fissile and fertile materials (e.g., uranium-, plutonium-, thorium-based materials), preferably enriched below approximately 20% for purposes of nonproliferation, and one or more buffering and protective layers encasing the kernel 20a. Thus, the first containment may be represented by the pressure boundary formed by the coating layers surrounding the kernel 20a of fuel elements 20. In some exemplary embodiments, such as that shown in FIG. 12, fuel elements 20 may be clustered into compacts 21 (e.g., sintered). In these embodiments, compacts 21 may provide an additional containment.

The second containment for preventing the escape of radionuclides may be represented by the pressure boundary defined by pressure vessel 2. This pressure boundary comprises the filler medium filling inside interior space 3 of pressure vessel 2. The pressure inside pressure vessel 2 can be adjusted via regulation of inlet and discharge valves 12 and 12a, so as to maximize heat transfer. In some exemplary embodiments where the filler medium is not a compressible fluid, the internal pressure inside pressure vessel 2 can be regulated by pressurizing an inert gas (e.g., helium).

The third containment for preventing the escape of radionuclides into the environment may be represented by pressure boundary 15. Pressure boundary 15 may be defined by a pressure containment substantially surrounding and sealing an entire power module shown in, for example, FIGS. 22 and 24B-C. In some alternative embodiments, certain power conversion components (e.g., turbomachinery components) may be disposed outside pressure boundary 15, as shown in FIG. 24A.

Turbomachinery pressure boundary 29 may be independent of all other pressure boundaries characterizing the above-discussed first, second, and third containments. However, turbomachinery pressure boundary 29 can be configured to execute the functions of radionuclide containment as well as radionuclide capturing and storing when a severe breach of first, second, and third containments occurs with catastrophic damages to the structures of fuel cartridge 1.

For example, FIG. 11 illustrates an exemplary accident scenario where the structures of the first, second, and third containments and their pressure boundaries 2, 29, and 15 are severely breached as a result of a projectile strike (e.g., missile/explosive/ballistic design-basis threat events). More specifically, FIG. 11 illustrates a safety feature for containing, entrapping, and/or filtering radionuclides during an off-normal operating condition to mitigate the release of radionuclides into the environment. The safety feature may be configured to trigger automatically when the containments of fuel cartridge 1 and their pressure boundaries are breached. The operation of the safety feature is described herein with reference to FIG. 11.

Turbomachinery pressure boundary 29 encompasses a power conversion system comprising motor 44 driving compressor turbines 52 on one side of fuel matrix 4 and power turbine 51 driving turbo-generator 43 on the other side of fuel matrix 4. During a normal operation, turbomachinery pressure boundary 29 can be pressurized to increase the efficiency of the power conversion system. Under an off-normal operation, such as that shown in FIG. 11, the pressure inside turbomachinery pressure boundary 29 may drop as working fluid 22 is discharged through a breach 105. As the pressure of turbomachinery pressure boundary 29 drops, a safety filter valve 12b may open while the control system of motor 44 reverses its rotational direction so as to impose a flow-reversal of working fluid 22 through compressor turbine 52 rotating to create depressurization within cooling channels 7. Similarly, alternatively or jointly, as the pressure of turbomachinery pressure boundary 29 drops, a safety filter valve 12b may open while the control system of generator 43 reverses its rotational direction so as to impose a flow-reversal of working fluid 22 through power turbine 51 rotating to create depressurization within cooling channels 7.

Under this scenario, portions of fuel elements 20 may be ejected into UHS 18a along with portions of working fluid 22 and the filler medium. However, as fuel cartridge 1 undergoes depressurization, motor 44 (and/or generator 43) reverses its rotational direction and compressor turbine 52 (and/or power turbine 51), now rotating to reverse flow of working fluid 22, and begins to suction debris (e.g., fuel elements 20, their potential fragments, and portions of the filler medium), all together with the fluids representing UHS 18a (e.g., air, water, etc.) forming a contaminated mixture 18b. As compressor turbine 52 (and/or power turbine 51) reverses normal flow direction, contaminated mixture 18b flows into a compressor emergency fluid line 103 and filter valve 12b and then into an internal contaminant filtering channels 104 to be filtered by a radionuclide filter 101. In this manner, the filtered fluid of UHS 18a may be discharged back into UHS 18a (e.g., surrounding ISO container 55 in FIGS. 25A-29) via a filter discharge valve 12c and a filtered discharge line 102.

Additional radionuclide traps and suctioning devices (e.g., vacuum pumps or fans) not shown in this figure can be positioned outside of fuel cartridge 1 and hydraulically connected to filtered discharge line 102. Filter 101 can be formed by ion-exchange radionuclide traps and combinations of filters of various types to trap radionuclides in solid and volatile forms. Thus, the safety feature described with FIGS. 10 and 11 can effectively mitigate the release of radionuclides into the environment under various accident conditions that result in the breach of containments and pressure boundaries 2, 29, and 15.

Figure 12:
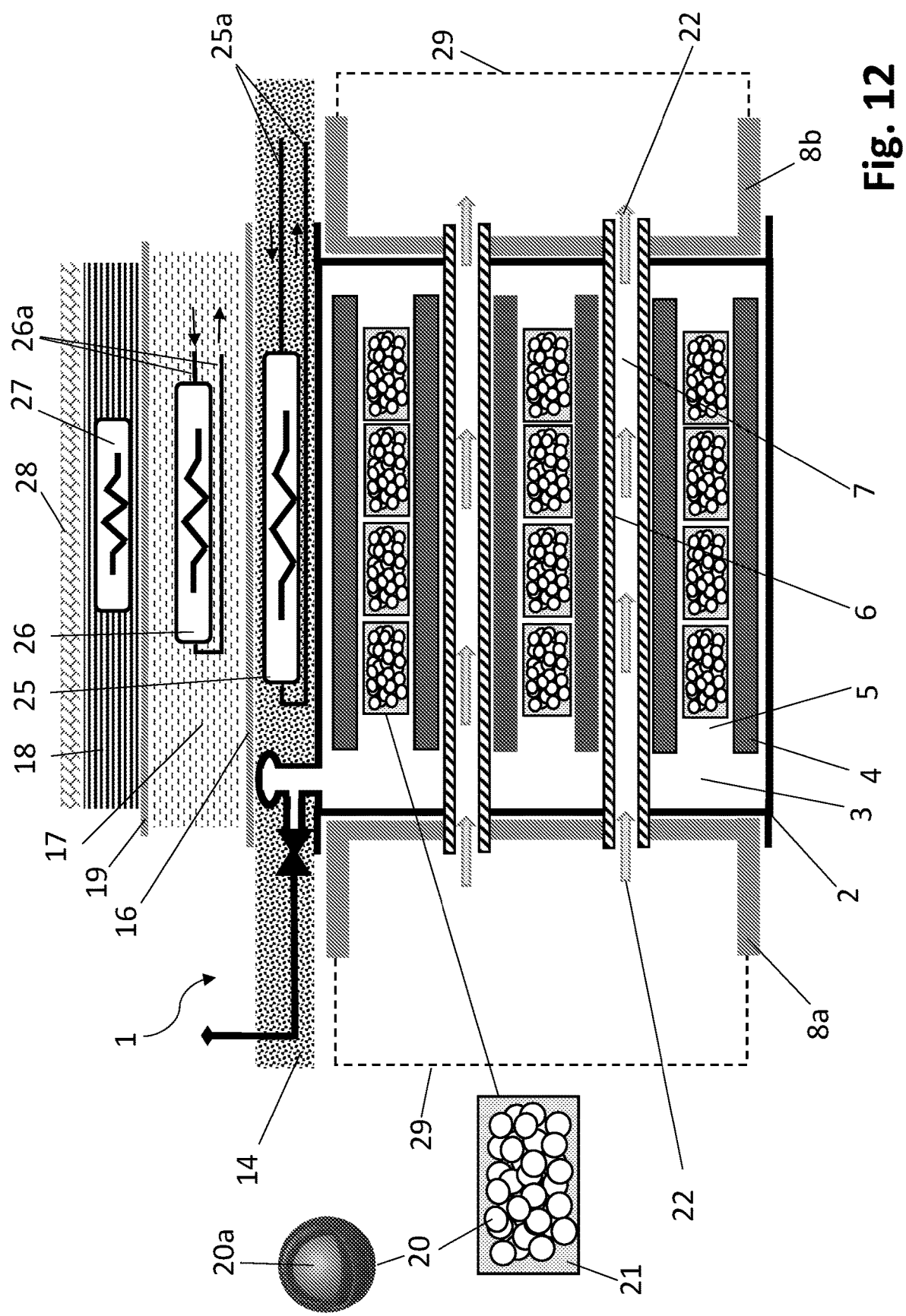
FIG. 12 is a functional schematic and cross-sectional view of an exemplary configuration of a fuel cartridge, according to one exemplary embodiment.

FIG. 12 illustrates fuel cartridge 1 loaded with nuclear fuel 20 in compacts 21. FIG. 12 also illustrates various heat exchangers (e.g., a reflector heat exchanger 25, a first shield heat exchanger 26, and a second shield heat exchanger 27) embedded in or otherwise thermally coupled with peripheral reflector 14 and first and second shields 17 and 18, which can then be integrated with the power conversion components of power modules 41 and 42 shown in FIGS. 24A-24C. In the disclosed embodiment, as briefly mentioned above, fuel elements 20 may include multi-layered TRISO fuels, each formed with a nuclear kernel 20a and one or more buffering and protective layers encasing kernel 20a. Fuel elements 20 can also be molded or sintered into compacts 21, as shown in FIG. 12. Alternatively, fuel elements 20 may not include TRISO fuels and instead can include nuclear pellets formed from nuclear fuel in a different form (e.g., metallic, ceramic, liquid, powder, etc.).

Fuel compacts 21 may be loaded into fuel channels 5 of fuel matrix 4 as distinct pellets or as fuel elements sintered all together with the fuel matrix 4 material. A suitable filler material fills interior space 3, including gaps between fuel compacts 21 and the inner surface of fuel channels 5 and gaps between the outer surface of cooling tubes 6 and the inner surface of cooling channels 7, to ensure adequate heat transfer between fuel compacts 21 and working fluid 22.

If radionuclides are released from fuel compacts 21, sealed pressure vessel 2, being isolated from turbomachinery pressure boundary 29, can retain the released radionuclides and any debris that may form as a result of interactions between compacts 21 and fuel matrix 4 inside interior space 3 and prevent them from mixing with working fluid 22.

As shown in FIG. 12, reflector heat exchanger 25 may be embedded in or otherwise thermally coupled to peripheral reflector 14 and, via hydraulic channels 25a, can be hydraulically connected to pumps and power conversion components (e.g., dedicated ORC components 45 shown in FIG.

13), where all of the components can be integrated within pressure vessel 2 or within containment 15. During a shutdown condition, reflector heat exchanger 25 may provide a passive heat transfer mechanism for the internal components of fuel cartridge 1 to transfer their thermal energy to the independent ORC or cooling loop partially shown by hydraulic channels 25a. Thus, reflector heat exchanger 25 can be part of the ORC thermodynamic loop dedicated to converting decay thermal energy from fuel elements 20 to electricity. During normal and off-normal operations, reflector heat exchanger 25 may provide passive heat transfer mechanisms for thermal energy to be transferred from the internal components of fuel cartridge 1 to the ORC working fluid, thus removing thermal energy from the reflector material. The removed thermal energy may also be used to, for example, pre-heat the working fluid circulating in the ORC thermodynamic loop.

Figure 13:
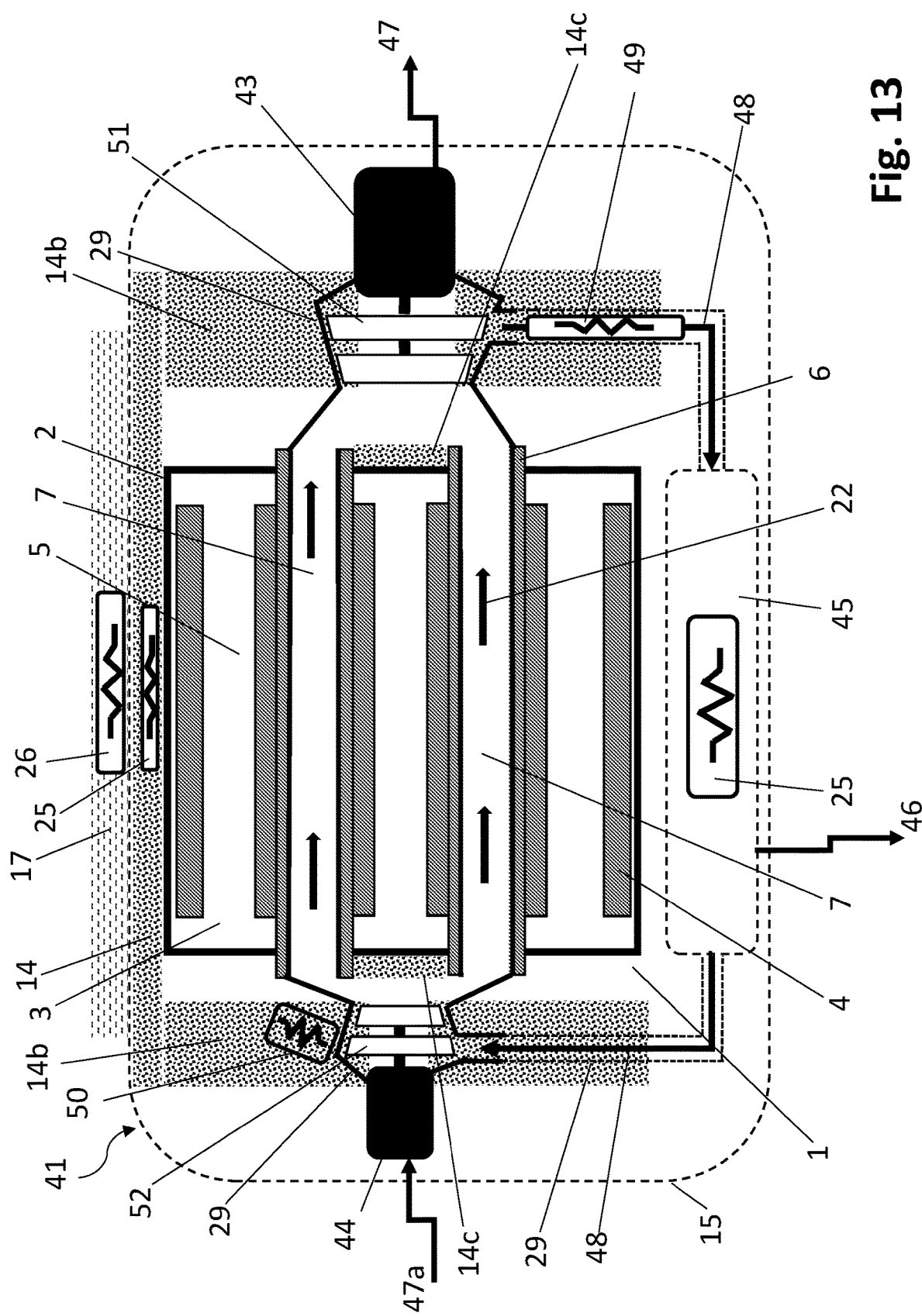
FIG. 13 is a cross-sectional and schematic view of a fuel cartridge, illustrating a power conversion system inside a power module, according to one exemplary embodiment.

Reflector heat exchanger 25 can also be thermal-hydraulically connected to Brayton recovery and intercooler heat exchangers forming a Brayton thermodynamic cycle schematically illustrated in FIG. 13. In this exemplary embodiment, reflector heat exchanger 25 represents one of ORC components 45 forming an ORC thermal energy recovery system.

First shield heat exchanger 26 may be embedded in or otherwise thermally coupled to first shield 17 to passively remove thermal energy from first shield 17 (i.e., heat transferred from fuel cartridge 1). First shield heat exchanger 26 may be a component of an independent thermodynamic loop that can further support the ORC thermodynamic cycle. Alternatively, it can transfer thermal energy from fuel cartridge 1 to a process heat working fluid circulating through hydraulic channel 26a, where the process heat working fluid may be physically separated from the ORC working fluid circulating through the ORC thermodynamic loop (e.g., flowing through hydraulic channel 25a), from the Brayton thermodynamic loop characterized by working fluid 22, and from the internal components of fuel cartridge 1.

Second shield heat exchanger 27 may be embedded in or otherwise thermally coupled to second shield 18 to passively transfer thermal energy from second shield 18 to support the operations of the ORC thermodynamic cycle. During normal and off-normal operations, finned surfaces represent an UHS heat exchanger 28 and may passively transfer the heat rejected by the Brayton and ORC thermodynamic cycles to UHS 18a. UHS heat exchanger 28 can be formed by materials with high neutron capture and radiation attenuation properties as it may also provide further neutron and radiation shielding from neutrons and radiation. It should be noted that as peripheral reflector 14 is thermally coupled to the UHS heat exchanger 28 through thermal conduction across the layered and composite shields (e.g., first shield 17 and second shield 18), passive cooling of the fuel cartridge 1 occurs independently of the operations represented by the ORC components.

Figure 14:
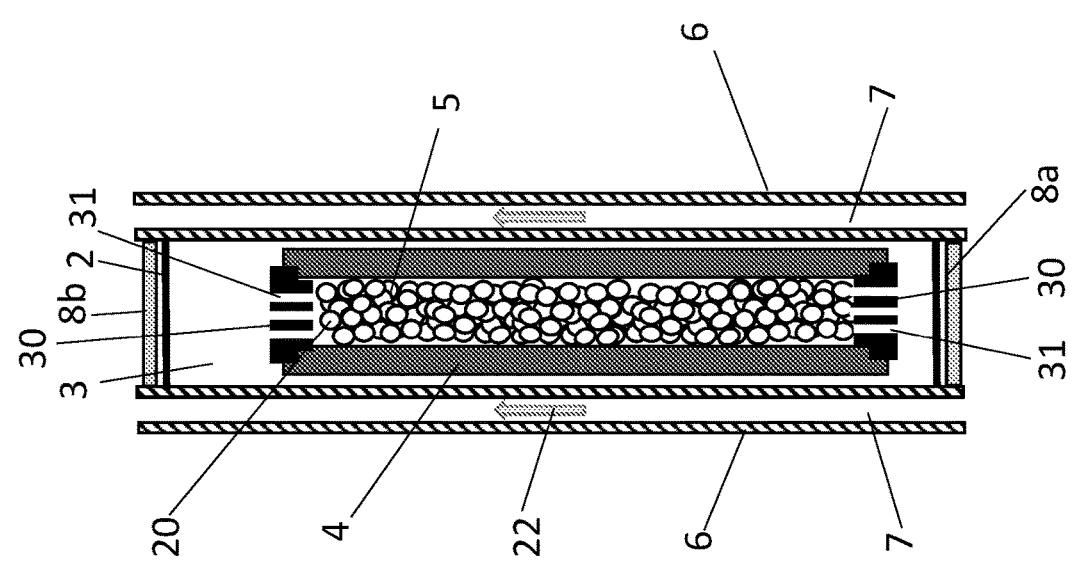

In addition to the embodiment shown in FIG. 12, FIGS. 14-16 illustrate various alternative exemplary fuel configurations for arranging fuel elements 20 in fuel cartridge 1. For example, FIG. 14 illustrates a configuration in which fuel elements 20 in microspheres are loaded in fuel channels 5 of fuel matrix 4. In this configuration, a cap 30 having one or more flow openings 31 may be placed at each end of fuel channel 5. As best shown in FIG. 17, cap 30 according to one exemplary embodiment illustrates a plurality of flow openings 31 that extend axially and radially to allow flow of the filler medium therethrough, as indicated by flow arrows 40. Fuel matrix 4 with caps 30 may enable stacking of multiple fuel matrices 4 on top of one another without obstructing the flow 40 of filler medium. Flow openings 31 may have various geometrical shapes and sizes to allow flow of filler medium while obstructing passage of fuel elements 20 (or fuel elements 20 and moderator elements 32) to ensure fuel elements 20 remain contained within fuel channels 5 of fuel matrix 4. For example, in some exemplary embodiments, the size of flow openings 31 may be smaller than the size of fuel elements 20 so as to prevent fuel elements 20 from flowing out of fuel channel 5 while allowing the filler medium to pass through flow openings 31.

Depending on the materials forming fuel matrix 4, appropriate coupling methods known in the art may be used to secure caps 30 to fuel matrix 4, which depends on the material forming fuel matrix 4 and may include threading, sintering, interference-fitting, welding and pressure fitting. To facilitate the coupling, cap 30 may have a body portion 30a extending from a head portion 30b for engaging fuel channel 5 of fuel matrix 4, where body portion 30a may have a size smaller than that of head portion 30b.

Figure 18:
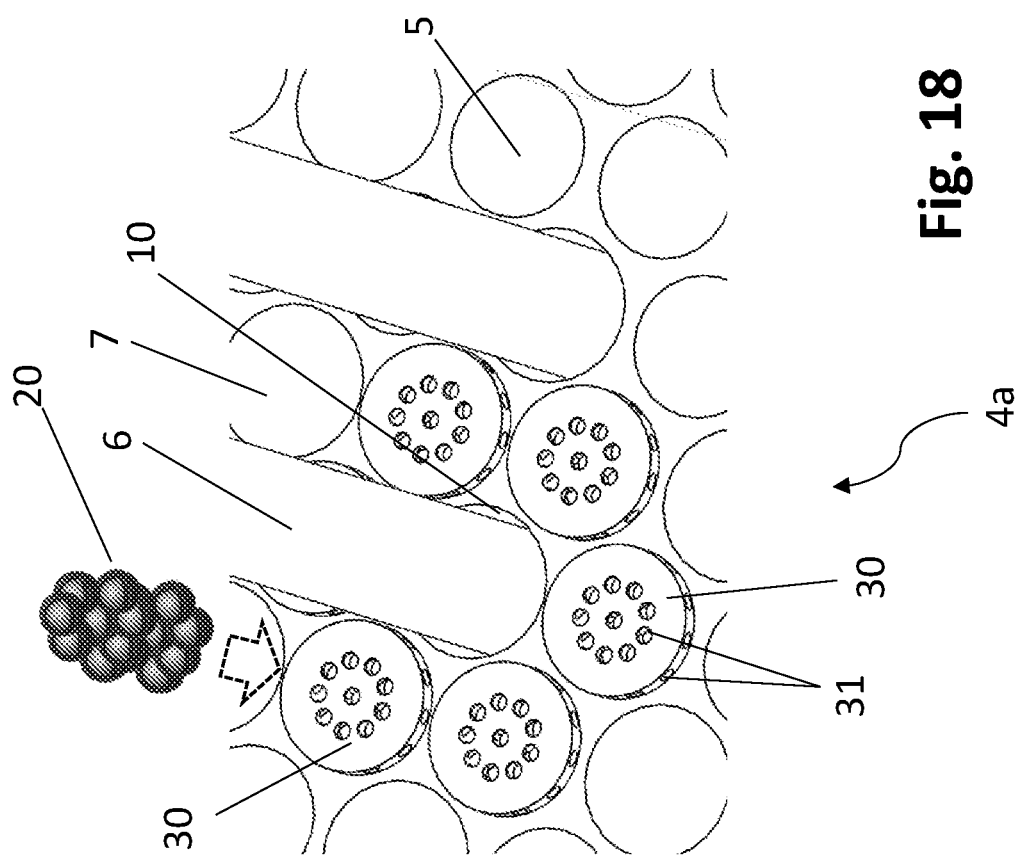
FIG. 18 is a close-up perspective view of the fuel matrix shown in, for example, FIGS. 1 and 2, with the caps of FIG. 17 fitted with fuel channels of the fuel matrix, according to an exemplary embodiment.

FIG. 18 illustrates a perspective enlarged view of fuel matrix 4a (as shown in FIG. 5), where cooling tubes 6 are inserted into corresponding cooling channels 7 and surrounded by fuel channels 5 packed with fuel elements 20.

When multiple fuel matrices 4a are stacked vertically and/or horizontally, vertically-oriented flow openings 31 may become obstructed, while the radially-oriented flow openings 31 may remain unobstructed, thus allowing flow of filler medium 40 in the radial direction.

When packing fuel elements 20 inside fuel channels 5, non-fuel volumes are formed between fuel elements 20. Such non-fuel volumes may be filled with the filler medium that can flow into fuel channels 5 through flow openings 31 of cap 30. It should be understood that the schematic illustration in FIG. 14 is not to scale, and fuel matrix 4 may extend all the way to the boundaries interfacing with headers 8a and 8b of pressure vessel 2, thus reducing the volumes of interior space 3.

Figure 15:
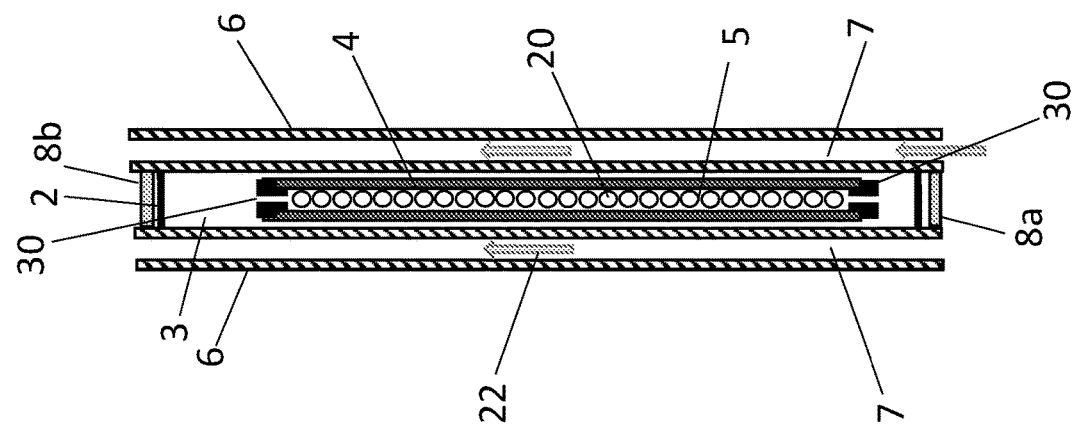

FIG. 15 illustrates another exemplary fuel configuration, where fuel elements 20 may be packed in a columnar manner within fuel channels 5 of fuel matrix 4. Given certain mechanical dimensions of fuel cartridge 1, this configuration may enable increased number of tubes for applications requiring further compacting of the power module shown in FIG. 22, 24A, and 24B. Similar to the fuel configuration shown in FIG. 14, a filler medium may flood and occupy all of the non-fuel volumes inside fuel channels 5 to ensure passive heat transfer from fuel elements 20 to working fluid 22.

Figure 16:
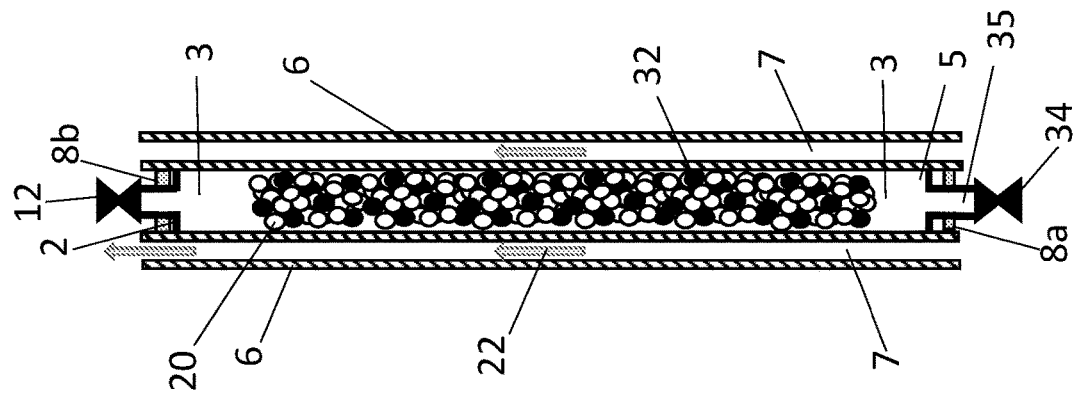
FIGS. 14-16 are partial cross sectional and schematic views showing various configurations of fuel elements and fuel channels inside a fuel cartridge, according to various exemplary embodiments.
Figure 17:
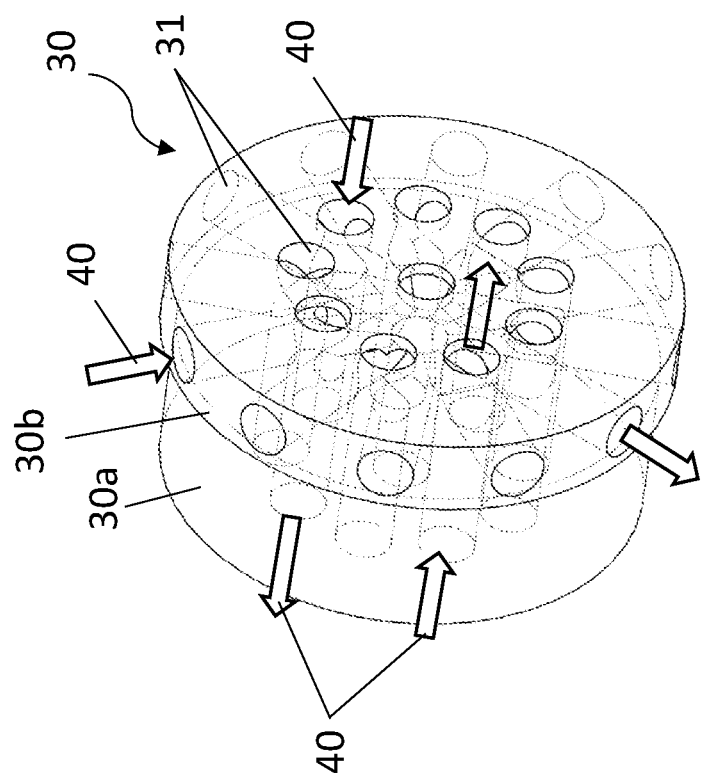
FIG. 17 is a perspective see-through, partial front view of a cap for covering a fuel channel of a fuel matrix, according to one exemplary embodiment, illustrating a plurality of flow openings and/or channels.

FIG. 16 illustrates still another exemplary fuel configuration, where fuel elements 20 are mixed with suitable neutron moderator elements 32 to form a pseudo fuel-moderator homogenous mixture with an enhanced neutronic performance. In this configuration, fuel cartridge 1 may not use a fuel matrix, and the fuel-moderator mixture may flow in and out of fuel channels 5 via a sleeve 35 and a valve 34 during loading and unloading operations. A filler medium can flood all of the non-fuel and non-moderator volumes to effectively support the fuel-moderator mixture while ensuring adequate heat transfer to working fluid 22 and UHS 18a.

The fuel configuration shown in FIG. 16 may also encompass a variety of nuclear fuels-moderator combinations, including solid mixtures (e.g., sintered) forming monolithic fuel-moderator blocks that are configured to slide through cooling tubes 6 prior to sealing headers 8a and 8a. Another fuel-moderator configuration may include liquid fuel-moderator solutions. Still another fuel-moderator configuration may include liquid fuels, where the moderator can be formed by sleeves of moderator materials (e.g., graphite) inserted through cooling tubes 6 and thermally coupled on their inner walls to the walls of cooling tubes 6 and on the wall of the moderator sleeve to the liquid fuel solution. For example, using the embodiment shown in FIG. 16, the walls of cooling tube 6 may be sleeved with or made of a moderator material (e.g., silicon carbide) and fuel elements 20 represent a liquid fuel solution flooding fuel channels 5, where moderator elements 32 are not needed. In another configuration, fuel elements 20 and moderator elements 32 represent a liquid solution and tube walls 6 can be made of steel alloys as moderation is achieved within the fuel-moderator solution. In another configuration, fuel elements 20 and moderator elements 32 are presented as a monolithic solid block inserted, driven, supported by and thermally coupled to cooling tubes 6.

Figure 19:
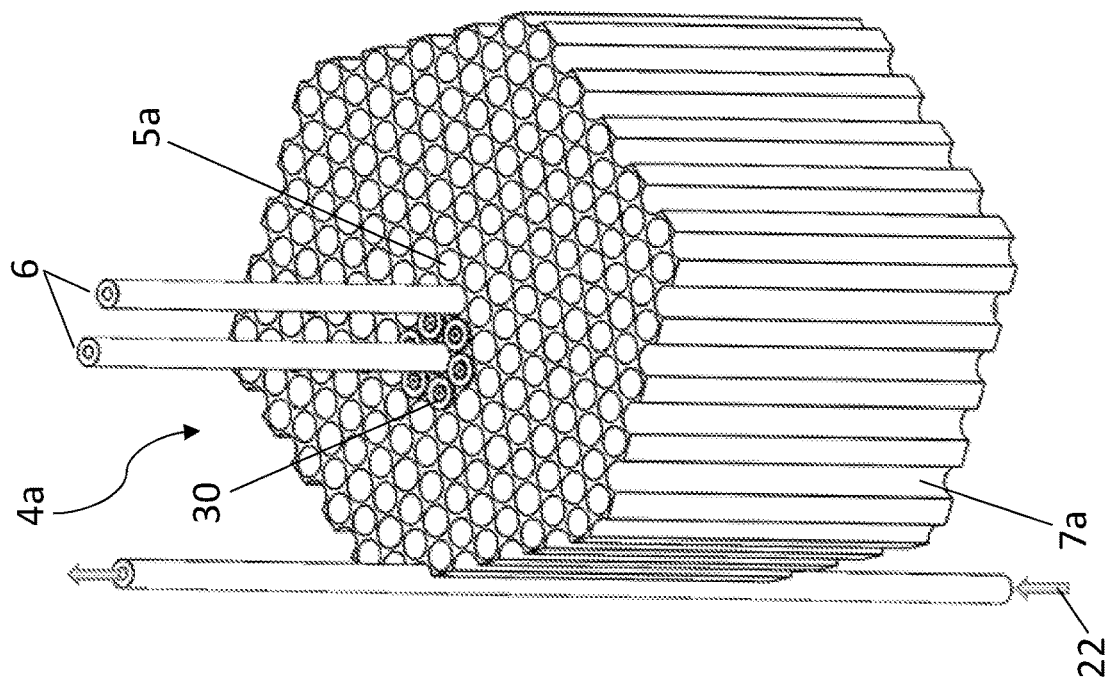

FIG. 19 shows a perspective view of fuel matrix 4a and its main components formed by cooling tubes 6, fuel elements 20, and caps 30. In the periphery of fuel matrix 4a, partial channel 7a forms a complete channel when multiple fuel matrix 4a are positioned next to one another. As a result, cooling tubes 6 can also be positioned at the edge of each fuel matrix 4a as shown in this figure. Each fuel matrix 4a can be configured to slide through a bank of cooling tubes 6 that provide mechanical support and cooling via circulation of working fluid 22 as cooling tubes 6 are thermally coupled via a filler medium.

Figure 20:
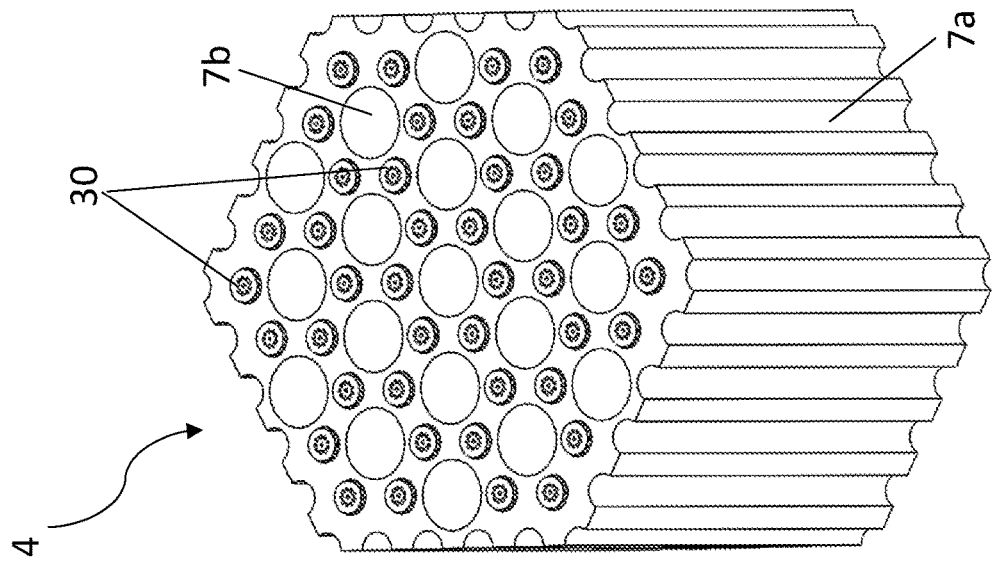
FIGS. 19 and 20 are perspective views of the fuel matrices of FIGS. 5 and 4, illustrating the position of fuel elements, cooling tubes, and caps relative to fuel channels and cooling channels in the fuel matrices, according to various exemplary embodiments of the present disclosure.

FIG. 20 illustrates fuel matrix 4 with its fuel channels packed with fuel elements 20 (not shown) and covered with caps 30. In this embodiment, cooling channels and fuel channels are reversed by packing cooling channels 7 (see FIG. 4) with fuel elements 20 and then covering them with caps 30, thus transforming cooling channels 7 into fuel channels 7b and vice versa.

FIG. 21 illustrates fuel cartridge 1 containing a plurality of fuel matrices 4 (or fuel matrices 4a or 4b) arranged to form one of multiple layers L (L-1 to L-n). As stacking and positioning multiple fuel matrices 4 together to form one or more layers L-1, the resulting composition can form different core geometries, where interior space 3 (i.e., non-fuel and non-moderator volumes) can also form. Interior space 3 can be filled with additional moderator materials (e.g., similar or same moderator materials forming fuel matrix 4) and/or a filler medium to ensure thermal transfer from fuel element 20 to the external wall of pressure vessel 2.

FIG. 22 illustrates a power module 41, according to one exemplary embodiment consistent with the present disclosure. Power module 41 may comprise fuel cartridge 1, where, once assembled with power conversion components including motor 44 and turbo-generator 43, fuel cartridge 1 is sealed within containment 15 substantially surrounding all of the components forming power module 41. In this embodiment, first shield 17 may be thermally coupled to fuel cartridge 1 in a manner that neutron coupling among multiple power modules 41 can occur on sides S1 and S2 while peripheral reflector 14 with variable density shield 14a and first shield 17 can be positioned at locations corresponding to the peripheral curved portions of fuel cartridge 1.

Referring to FIG. 13, which schematically illustrates fuel cartridge 1 being part of multiple thermodynamic loops supporting multiple thermodynamic cycles (e.g., Brayton and Rankine power cycles) configured to increase efficiency and minimize thermal rejection from the Brayton cycle to UHS. For example, working fluid 22 circulates within cooling tubes 6 internally to fuel cartridge 1 at elevated pressure to support high-efficiency Brayton thermodynamic cycle. Active circulation of working fluid 22 may be induced by compressor turbines 52 driven by motor 44.

As working fluid 22 flows through cooling channels 7 of fuel matrix 4, thermal energy from fuel elements 20 (not shown) inside fuel channels 5 may be transferred to cooling tubes 6 and working fluid 22 flowing through cooling tubes 6. Working fluid 22 with high energy content then may expand through one or more power turbines 51 driving turbo-generator 43, thus generating electricity 47. A portion of the generated electricity 47 may be distributed to motor 44 via electrical connection 47a, and the remaining electrical energy 47 can be distributed as conditioned electricity produced individually by each power module (e.g., multiple power modules configured as shown in FIGS. 24A-24C once assembled as a complete power station as shown in FIGS. 26A and 28B). As working fluid 22 is discharged by one or more power turbines 51, working fluid 22 may circulate within a coolant closed loop 48 inside turbomachinery pressure boundary 29.

Recuperator heat exchanger 49 may be configured to recover a portion of the thermal energy discharged by the power turbines 51 and is a component of the Brayton thermodynamic cycle. The normal Brayton cycle heat rejection to the environment may be intercepted by the closed-loop ORC components 45 which utilize the heat normally rejected by an intercooler heat exchanger 50 (also a component of the Brayton cycle) and convert the thermal energy normally rejected by the Brayton cycle into electricity 46. As peripheral reflector 14 and first and second shields 17 and 18 (shown in FIG. 12) are thermally coupled to the internal components of fuel cartridge 1, they also transfer thermal energy normally rejected to the environment to ORC components 45 via, for example, reflector heat exchanger 25 configured to operate in an independent closed-loop at a pressure distinct and independent from the pressures of turbomachinery pressure boundary 29.

Figure 25E:
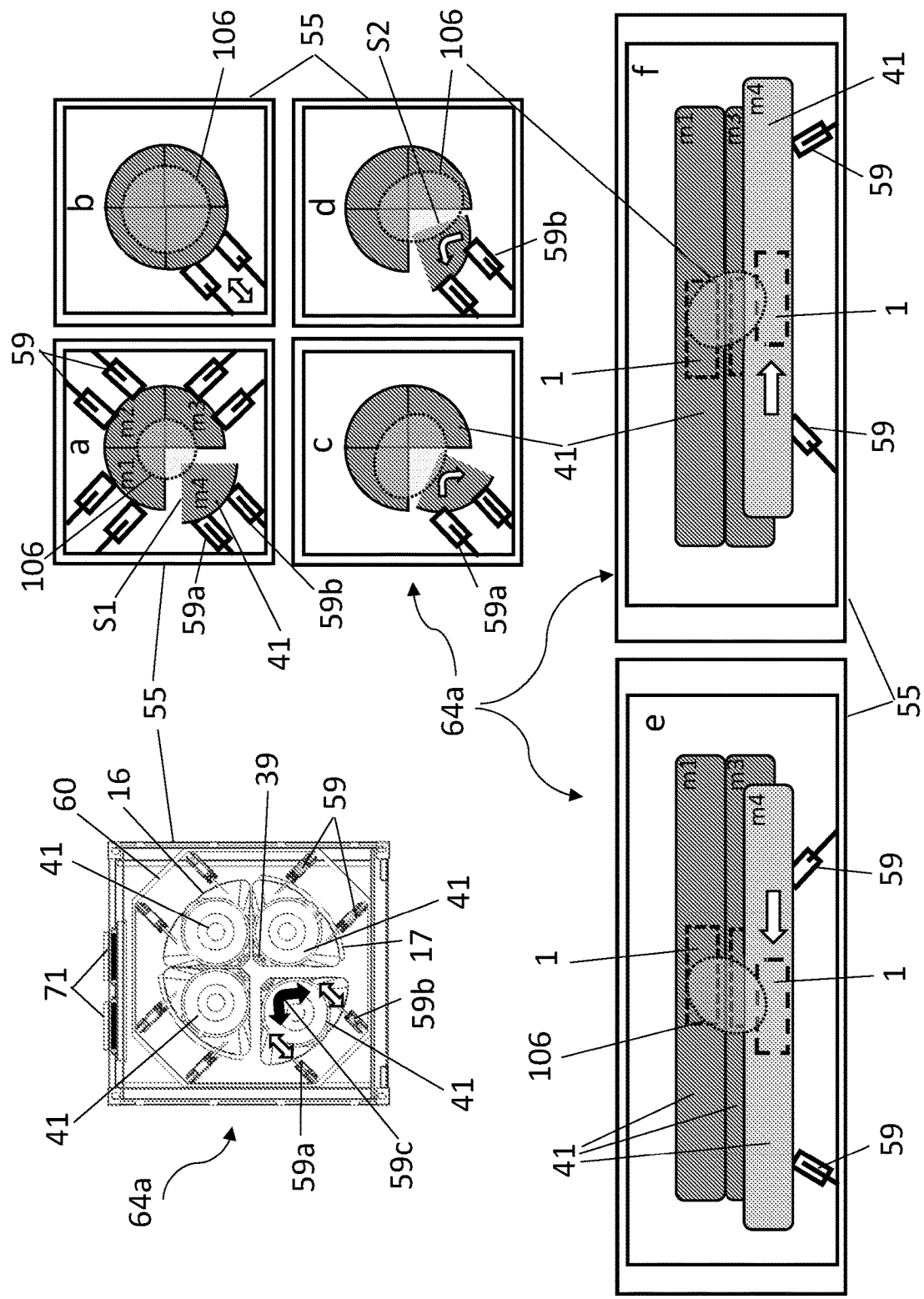
FIG. 25E represents schematic illustrations of various positions of the power modules shown in FIGS. 25A-D with various exemplary cases to illustrate a module positioning system and corresponding neutron coupling controls, according to one exemplary embodiment.

When fuel cartridge 1 is not positioned in the proximity of multiple fuel cartridges 1 as shown, for example, in FIGS. 25E, fuel elements 20 loaded in fuel channels 5 can no longer sustain fission chain reactions (e.g., shutdown condition). Under this configuration, fuel elements 20 packed in fuel channels 5 may generate decay thermal energy proportionally to the power history prior to the shutdown and the time elapsed from the shutdown configuration. Under these conditions, the Brayton cycle stops operating. However, decay thermal energy from fuel cartridge 1 may be passively transferred via thermal coupling with peripheral heat exchanger 25 which may enable low-power operation of ORC components 45, which continue to generate electricity 46 at a power rating proportional to the power history and time elapsed from the shutdown event.

ORC components 45 may be thermal-hydraulically connected by an independent closed-loop comprised by third containment pressure boundary 15. Peripheral reflector 14 and shields 14b and 14c may be positioned on the axial direction of power module 41 to scatter neutrons emitted by fuel cartridge 1 in the axial direction toward compressor turbine 51 and power turbine 51 so as to shield these components from direct exposure to the neutron flux in the axial directions. Peripheral shields 14b and 14c can be configured to integrate heat exchangers (e.g., parts of or entire intercooler heat exchanger 50, parts of or entire recuperator heat exchanger 49).

FIG. 23A illustrates a high-power rate power module 42 without and with first shield 17. Power module 42 can be configured to be a scaled-up version of power module 41 (see FIGS. 25B and 25A). Power module 42 can be dimensionally larger to accommodate a scaled-up fuel cartridge 1, containing an increased number of layers (L1-Ln shown in FIG. 21) in the axial direction, and a larger number of fuel matrix 4 and 4a in the radial direction so as to support a higher thermal power rate resulting in a higher electric power rating at the turbo-generator 43.

Accordingly, FIG. 23A (left) shows third containment pressure boundary 15 surrounding and sealing fuel cartridge 1 (not shown in this figure). On the curved peripheral portions of power module 42, first thermal coupler 16 (see also FIGS. 9 and 12) passively thermally couples first shield 17 to fuel cartridge 1. As for all power module configurations (e.g., FIGS. 24A, 24B, and 24C), third containment pressure boundary 15 may comprise all of the components forming the power modules, including the casing surrounding motor 43 and turbo-generator 44 (shown with open maintenance ports MP in FIG. 23A). In particular, motor 43 and turbo-generator 44 may also be inside turbomachinery pressure boundary 29. All of the components forming the operational power modules in all of their configurations are included and sealed in third containment pressure boundary 15 (see schematic representations of first, second and third containments and pressure boundaries shown in, e.g., FIGS. 9 and 10).

FIG. 23B illustrates a simplified cross sectional view of the high-power rating power module 42 showing the positioning of first shield 17 with respect to third containment pressure boundary 15. Accordingly, first shield 17 substantially surrounds the peripheral portions of power module 42 to form a compact shield attenuating radiation generated from the fuel cartridge radially and in the outward direction, while protecting fuel cartridge 1 from ballistic events approaching multiple fuel cartridges 1 comprised by multiple power modules 42 in all radial directions. In other words, when multiple power modules 42 are placed together to form a critical core, multiple first shield 17 may be puzzled together, thus forming a compact shield surrounding fuel cartridges 1 of all power modules forming an operational electric generator as shown in FIGS. 25C and 28B.

When multiple first shields 17 surrounding power modules 42 are assembled together, first shield geometries on the periphery of the shield (shown with reference number 17a), ensure that there are no straight-line of flight for neutrons potentially leaking out of power modules sides S1 and S2. As shown and described in FIG. 21, power modules sides S1 and S2 are utilized to execute neutron coupling among multiple fuel cartridges 1. The dashed line surrounding the walls forming third containment pressure boundary 15 indicates the physical boundaries of the power module when stripped of the first shield and second shield (not shown in this figure). As described in FIGS. 12 and 13, reflector ORC heat exchanger 25 can be configured to be embedded with first shield 17 to support power modules configurations where ORC components 45 can be configured to be integrated with the power module and included in third containment pressure boundary 15.

Other configurations can include an independent ORC system 45a (all components) embedded with first shield 17 and utilizing first shield heat exchangers 26 to support i) ORC thermodynamic processes, ii) ORC heat exchangers coupled to process heat equipment (e.g., tubing, pumps and separation heat exchangers), and/or iii) utilize first shield heat exchangers 26 to support process heat applications by transferring thermal energy rejected by the Brayton cycle operating within third containment pressure boundary 15 to first shield heat exchanger 26, where a process heat working fluid is circulated in/out of independent ORC/process heat loops 26a (as shown in FIG. 12).

Second shield heat exchangers 27 can also be configured to transfer thermal energy from the internal components of fuel cartridge 1 to independent ORC components or independent process heat components prior to discharging thermal energy rejected by the Brayton and Rankine cycles to UHS 18a. In this figure, second shield heat exchangers 27 are shown without the second shield. These heat exchangers can be thermally coupled to fuel cartridge 1 via second thermal coupler 19 shown in FIGS. 9 and 12.

First thermal coupler 16 and second thermal coupler 19 may include layers of highly conductive materials including metals (e.g., copper, cadmium, etc.) or gels. In this cross-sectional representation of high-power rating power module 42, sleeves 39 for instrumentation, control and/or isotope production are positioned in the highest neutron flux areas of fuel cartridge 1 as multiple fuel cartridges 1 are neutronically coupled when multiple power modules are positioned near one another as shown, for example, in FIGS. 25C, 25E and 28B.

FIG. 24A illustrates a cross-sectional schematic view of a generic (e.g., low-power rating) power module 41 with the working fluid flow paths in/out of fuel cartridge 1. Accordingly, fuel cartridge 1 is contained within pressure vessel 2, thermally coupled to reflector heat exchanger 25, thermally coupled via first thermal coupler 16 to first shield heat exchanger 26, thermally coupled via second thermal coupler 19 to second shield heat exchanger 27 discharging thermal energy from the Brayton and Rankine cycles thermal rejections to UHS 18a after recovering portions of the rejected thermal energy via the referenced heat exchangers 25, 26 and 27. ORC components 45 can be configured to utilize intercooler heat exchanger 50 as waste thermal energy source for ORC conversion into electrical energy distributed by the electrical distribution or ORC bus 46. Working fluid 22 circulates within turbomachinery pressure boundary 29 as compressor turbines 52 directly driven by motor 44 through compressor drive shaft 53, compresses working fluid 22 into fuel cartridge 1. When power module 41 is positioned near other power modules 41, fuel cartridge 1 comprised in each module generates thermal power as a result of sustained chain reactions and subsequent fission reactions of fuel elements 20.

As working fluid 22 flows through cooling tubes 6 of fuel cartridge 1, it becomes thermally coupled to the internal components of fuel cartridge 1 and increases its energy content as a result. High energy content working fluid 22 expands through power turbines 51 driving turbo-generator 43 via turbo-generator shaft 54 for turbo-generator 43 to generate electric power at the Brayton electric bus 47. As working fluid 22 is discharged by power turbines 51, recuperator heat exchangers 49 recover a portion of the energy contained by the working fluid discharging from power turbines 51 as part of the Brayton power cycle. Working fluid 22 further transfers thermal energy to ORC components 45 for further cooling of working fluid 22 prior to restarting the Brayton cycle at compressor turbines 52.

As shown in this representation, the Brayton cycle is executed through closed loop 48. When power module 41 is producing electricity at the Brayton electric bus 47 (e.g., multiple power modules 41 configured near one another to cause neutron coupling among multiple fuel cartridges 1), ORC components 45 produce electricity at ORC electric bus 46 and a portion of the electricity produced by turbo-generator 43 is utilized to drive motor 44 via electrical connection 47a.

During electric power production, the normal Brayton and Rankine (from the organic cycle) heat rejections to UHS 18a occur through passive thermal coupling between the internal components of fuel cartridge 1 and UHS 18a through the second containment and pressure vessel 2 (first containment is represented by fuel element 20 as described in, for example, FIGS. 9 and 12), and third containment pressure boundary 15 without balance of plant through these pressure boundaries. When power module 41 is configured to be shutdown (e.g., multiple power modules positioned apart from one another, thus interrupting the neutron coupling formed by multiple fuel cartridges 1), the Brayton electric bus stops producing electricity and motor 44 driving compressor turbines 52 also stops operating. The decay thermal energy produced by fuel cartridge 1 during power module 41 shutdown conditions, is passively transferred from the internal components of fuel cartridge 1 to ORC components 45, thus a certain amount of electricity at ORC electric bus 46 is generated when power module 41 is not operational. The power module representation in FIG. 24A also illustrates an exemplary position of the sleeve for instrumentation, control and isotope production 39 in a manner that remains within third containment pressure boundary 15, but outside of the pressure boundary represented by pressure vessel 2 comprising fuel cartridge 1. Other configurations of sleeve 39 can include positioning of sleeve 39 outside of sides S1 and S2, and inside or outside of pressure vessel 2 as shown in FIGS. 10, 21 and 23B.

FIGS. 24B and 24C illustrate the scaling of a relatively low-power rating power module 41 and a high-power rating power module 42 to support the descriptions of these different power modules in FIGS. 25A, 25B and 25C.

FIG. 25A illustrates the frontal view of a transport ISO container 55 retrofitted with low-power rating power module 41 forming a distributable power station 64a producing load-following electricity when all of power modules 41 are positioned by module positioning system 59. Module positioning system 59 enables movement of power modules 41 and/or 42 by regulating position actuators to execute power module radial, axial and rotational movements. Accordingly, the power module can be configured to approach other power modules in a manner that the fuel cartridges contained in each power module have sides S1 and S2 (see FIGS. 21 and 23B) substantially parallel with respect to the fuel cartridges contained in near power modules by symmetrically actuating actuators 59a and 59b of the power modules positioning system 59.

In other configurations, by controlling the positions of the dynamic module positioning system 59 and in particular its actuators to asymmetrically execute, for example, positions 59a and 59b, the module can be made to partially rotate as indicated by arrows 59c. In this manner, sides S1 and S2 of fuel cartridge 1 of the power module being positioned are not parallel to fuel cartridges 1 contained in the power modules to be coupled. Accordingly, as shown in an operational power station 64a in FIG. 25A, one of the multiple power modules 41 is positioned by module positioning system 59 so as to reduce the neutron coupling 106 (FIG. 25E) formed when all power modules 41 are positioned near one another. FIG. 25A also indicates the relative position of sleeves 39 with respect to the areas of maximum neutron flux generated when multiple power modules 41 are positioned near one another. FIG. 25E describes in greater detail how the dynamic module positioning system 59 impacts neutron coupling among multiple fuel cartridges 1.

FIG. 25B illustrates the frontal view of a transport ISO container 55 retrofitted for the transport of individual scaled-down low-power power modules 41 and scaled-up high-power power modules 42 (shown in FIG. 25D), equipped with a power module static positioning system. When the power modules are transported individually, they need to be statically positioned within the structure and dimensional constraints represented by the retrofitted ISO container 55. Accordingly, an adjustable supporting beam system 56 in conjunction with a rail track system 57, all integrated with the internal structures of container 55, provides a method for the stationary positioning of power modules 41 or 42. Stationary positioning of power modules may be desirable to align multiple power modules prior to activating dynamic module positioning system 59 and enable electric power generation. In FIGS. 25B and 25D, the power module is secured by the supporting structure 60, represented by a reinforced cage/structure configured to support the power module weight and equipped with rollers 58 enabling linear or axial movement of the power modules through the length of the container 55. FIGS. 27A-27B describe the static module positioning system in greater detail.

FIG. 25D illustrates the frontal view of a scaled-up power module 42 with higher thermal power ratings compared to low-power rating power module 41 shown in FIG. 25B. Accordingly, one transport ISO container 55 can house an operational generator forming a power station 64a equipped with multiple power modules 41, for example 4× power modules, as shown in FIG. 25A. Alternatively, one ISO container 55 can house a single low-power rating power module 41 for transport and assembly with other power modules once deployed at the destination site. For scaled-up configurations of the power modules (e.g., power module 42), 4× transport ISO containers stacked and clustered as shown in FIG. 25C, result in an operational high-power generator 64b.

When the power modules are transported individually, they are aligned with other power modules once at the deployment site, as shown in FIG. 25C, where power modules 41 positioned in the lower portions of multiple high-power modules 42 clustered as shown in FIG. 25C can be configured with gravity driven module positioning system 63 operating in conjunction with the dynamic module positioning 59. The gravity driven module positioning system passively lowers the power modules positioned at the bottom, thus interrupting the neutronics coupling formed when all the power modules are positioned near one another. This is a safety features as the "bottom" power modules are passively lowered should the power modules positioning system 59 malfunction. The transport ISO container 55 retrofitted for transport and operation of high-power power modules 42 are configured with removable structures 61 to enable coupling of the modules positioned on the top portion of the operational power station 64b with those positioned at the bottom.

Figure 29:
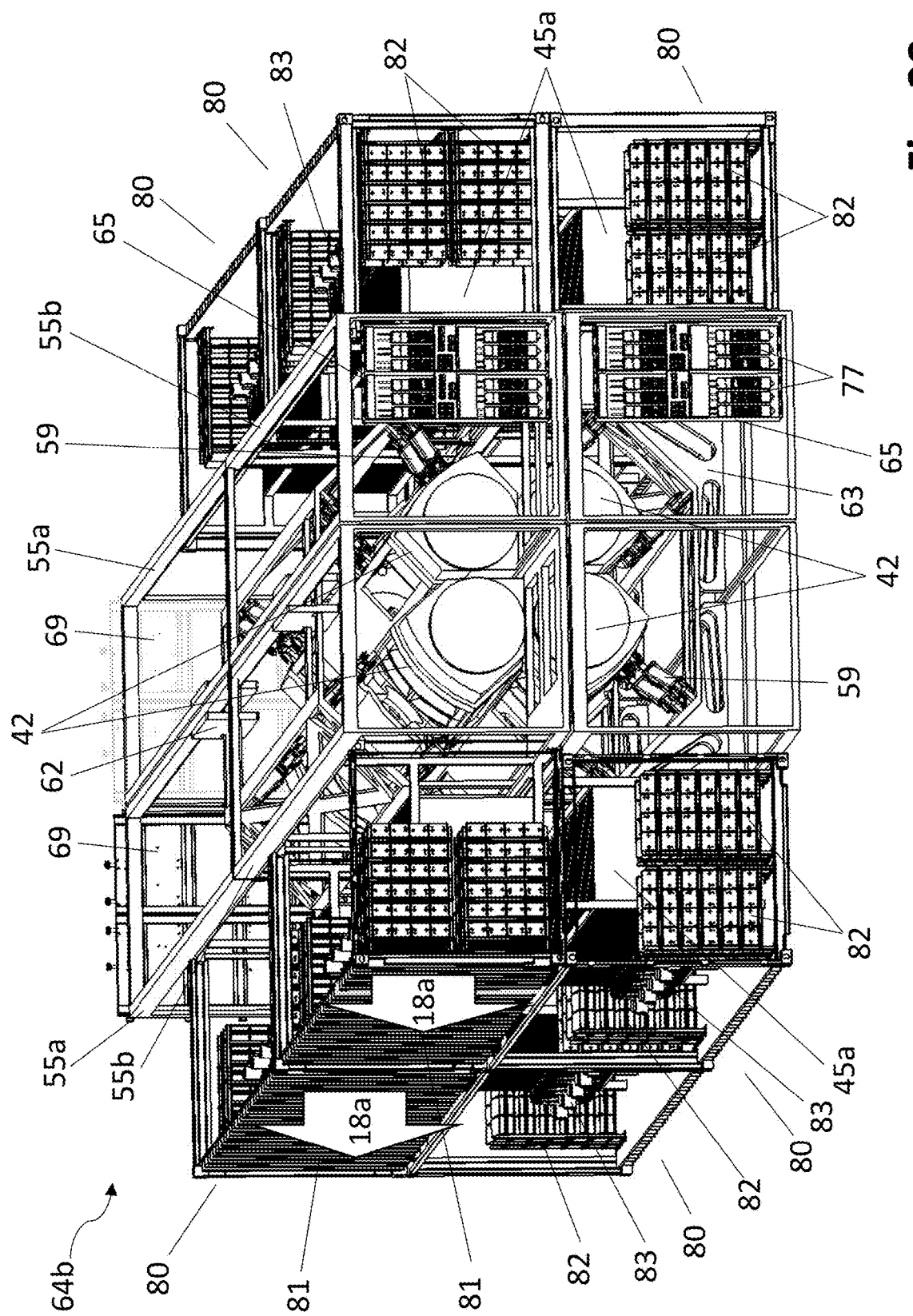
FIG. 29 is a perspective view of an operational power plant based on the high-power power-modules configuration shown in FIG. 25C, according to one exemplary embodiment.

FIG. 25E further describes the dynamic module positioning system 59 and its feature of controlling neutron coupling 106 and the overall reactivity and electric power generation of power station 64a. Accordingly, in this figure, one of multiple power modules forming an operational power station 64a (or 64b as shown in FIG. 29) is positioned in various configurations (a-f) to illustrate the variations on the resulting neutronics coupling 106 due to the ability of the dynamic positioning system 59 to roll, pitch and yaw each individual power module with respect to one another and with respect to a reference system as, for example, the module supporting structure 60.

Case a) in FIG. 25E represents the configuration shown in FIG. 25A. All of power modules 41 or 42 can be independently positioned and, therefore, the configurations shown for exemplary Cases a) to f) represent only a small set of a number of configurations and combinations resulting from positioning each power module with respect to one another through module positioning system 59.

For example, in Case a) of FIG. 25E, when power module m4 is moved away from power modules m1, m2, and m3 the neutron coupling 106 is reduced as neutron leakage out of the core formed by clustering the power modules is increased, and this configuration can induce the reactivity of the power generator 64a to a shutdown condition.

In Case b) power module m4 is positioned to form the most compact core with respect to the remaining power modules. Accordingly, neutron coupling 106 increases, thus leading the reactivity of the power generator 64a to produce the highest power rating.

In Cases c) and d), power module m4 is configured to be lowered and rotated with respect to the other modules (and their corresponding fuel cartridge 1), as a result, the neutronics coupling 106 is deformed so as to favor selected areas in each fuel cartridge 1.

Similarly, Cases e) and f) shows that module positioning system 59a and 59b can lower, lift, rotate and translate to the left for Case e) and to the right for Case f) each power module independently and in real time. The net result of the real-time positioning features enabled by module positioning system 59 and its various methods of actuation (e.g., hydraulic actuators shown in the various figures) is to misalign or align multiple fuel cartridges 1 with respect to one another. In this manner, the power generated by each power module can be finely regulated in real-time to support load-following operations, where load-following is intended as the ability of the electric generator to rapidly adapt and adjust the power ratings to match changes in the electric demand. Another advantage enabled by these features is represented by the ability to select zones of the fuel cartridges for increased/decreased neutron fluxes to increase/decrease fuel burnup, to thermalize or enable fast neutron spectrums or to control fuel cartridges 1 loaded with fuels with increased enrichment in one portion of the fuel cartridge with respect to other portions of the same fuel cartridge.

FIG. 26A illustrates a top cross-sectional view of an operational power generator 64a formed by multiple power modules 41 aligned and configured by the modules positioning system 59 to generate electricity. The operational power generator 64a shown in this figure comprises the auxiliary equipment 65, first shield 17 and second shield 19 substantially surrounding the operational generator 64a on all sides of a fully retrofitted container 55. The peripheral structures 69, forming the container 55, including the doors, are reinforced to support transport and alignment of individual or multiple power modules during transport and operations.

The auxiliary equipment 65 shown in this figure represents the general location of electronic inverters, power conditioning systems, automatic module positioning control systems, reactivity control systems, electric power transmission systems for remote control of the power generator, and systems to support connection to the power grid or switchyard (e.g., 3-phase or DC electric bus 70 shown in FIG. 28B).

Additionally, independent ORC system 45a (FIG. 23B), and process heat components and interfaces can be supported by equipment confined in dedicated enclosures represented by auxiliary equipment 65. The container reinforced peripheral structures 69 can be configured to execute the functions of neutron absorption and radiation attenuation executed by the UHS heat transfer surfaces 28 shown in FIG. 12. For all of the power stations configurations, the power modules and more precisely fuel cartridges 1 are thermally coupled to UHS 18a (e.g., via first shield 17, thermal coupling 19 and second shield 18 to the surfaces constituting the outer surfaces of container 55, normally surrounded and naturally coupled to UHS 18a).

FIG. 26B illustrates the top cross-sectional view of a scaled-up individual high-power power module 42 transported by a transport container 55. Accordingly, and comparatively to the operational generator 64a formed by, for example, 4× power modules 41 in operational configuration as shown in FIGS. 26A and 28B, the individual larger power module 42 occupies the majority of the available internal volume of standard transport container 55. Therefore, for a power generator comprising, for example, 4× high-power rating power modules 42, an individual container 55 can only transport ¼ of the total number of power modules 42 required to enable electricity production for an operational power station 64b as shown in FIG. 25C. As a result, an individual container 55 can be dedicated to the transport of a scaled-up power module 42 surrounded by first shield 17 and second shield 18 thermally coupled by thermal coupler 19 to UHS 18a.

In this configuration, power module 42 is thermally coupled to UHS 18a and is enabled to produce ORC electricity during transport should power module 42 be transported after a period of operation (e.g., transport after shutdown). As shown in FIG. 26B, once container 55 is dedicated to transport power module 42, there is generally insufficient volume, within the dimensional constraints of container 55, to accommodate auxiliary equipment 65. Accordingly, transport of scaled-up power modules 42 and connection to auxiliary equipment 65 to support an operational power station 64b as shown in FIG. 29, can be executed by configuring multiple containers 55 as shown in FIG. 26C.

FIG. 26C illustrates a cross-sectional top view of coupled container 55a, dedicated to the transport of power module 42, to container 55b, dedicated to the transport of auxiliary equipment 65, where the containers 55a and 55b are equipped with the static power module aligning mechanisms partially described in FIGS. 25C, and described in greater detail in FIGS. 27A and 27B. During transport of power module 42 an additional second shield 18, thermally coupling power module sides S1 and S2 (S1 shown in FIG. 26B) is positioned substantially parallel to the container reinforced peripheral structures 69 to enable cooling of fuel cartridge 1 via thermal transfer with UHS 18a, while providing additional ballistic shielding. Accordingly, container 55 shown in FIG. 26B can be configured to accommodate the auxiliary equipment 65 as shown in FIG. 26C, when power module 42 with its first shield 17 and second shield 18 are linearly translated while maintaining their relative position substantially aligned with power module 42.

As power module 42 is moved from its "transport" configuration (e.g., FIG. 26B) to the operational configuration shown in FIG. 26C, and the auxiliary equipment 65 is thermal-hydraulically and electrically coupled, the additional second shield 18 (shown with dashed lines in FIG. 26C) is removed so as to enable coupling of fuel cartridge 1 (sides S1 and S2 of multiple fuel cartridges facing one another), comprised by multiple high-power power modules 42 to form an operational power station 64b with high power rating as shown in FIG. 25C.

FIG. 27A illustrates a perspective view of a power module 42 retrofitted within a transport container 55 to transport power module 42. This figure also illustrates a method of aligning power module 42 with other power modules to enable coupling of the power module with auxiliary equipment 65 and coupling with multiple modules 42 to enable neutron coupling 106 (see FIG. 25E). Accordingly, and as shown in part in FIGS. 25B and 25C, the adjustable supporting beam 56 can be regulated to mechanically support different power modules with lower/higher power ratings and different dimensional and weight constraints.

The adjustable supporting beam 56 is mechanically coupled to a rail track system 57, which, in conjunction with rollers 58, can be configured to mechanically support power module 42, while enabling longitudinal movement/positioning of power module 42. The rail track system 57 is coupled to rollers 58 which enable longitudinal movement of power module 42 with respect to the length of container 55. The rail track system 57 is configured to support and constraint power module 42 so as that the power module can be rotated in a manner that each side S1 and S2 (FIG. 23B) are aligned (e.g., parallel) to form the operational power station 64b shown in FIG. 29. Rollers 58 are coupled to the exoskeletal module supporting structure 60. The module supporting structure 60 can be configured to house the second shield heat exchanger 27 (see FIGS. 12, 23B and 24A), thermally coupled to fuel cartridge 1 as described in FIGS. 12 and 14-16, and to the UHS heat transfer surface, radiation attenuation and neutron shield 28, and finally to UHS 18a.

The power module supporting structure 60 can also be configured to mechanically couple the second shield 18 (not shown in this figure). As shown in FIG. 27A, static module aligning system 66 enables power module 42 all together with second shield 18 (not shown) to move longitudinally and overhang while entering another transport container 55 equipped with the rail track system 57. In this manner, power module 42 can be positioned at a desired location within two transport containers 55 aligned with multiple power modules 42 also housed within containers 55 configured with rail track system 57 as shown in FIG. 27B. Additionally, in this configuration, the auxiliary equipment 65 can be housed in the same containers 55 housing power module 42, thus enabling thermal-hydraulic and electrical coupling with the power module.

FIG. 27B illustrates a power module 42 aligned in a substantially central position obtained when two transport containers 55 are coupled as shown. In this configuration, one container, for example, 55a, can be dedicated to the transport of the power module, while another container, for example, 55b, can be dedicated to the transport of the auxiliary equipment 65. Once containers 55a and 55b reach the deployment site, they can be coupled as shown in FIG. 27B so as to enable positioning of power module 42 via static module aligning system 66, and coupling of the auxiliary equipment 65 forming, in this example, ¼ of the operational power station 64b shown in FIGS. 25C and 29. Accordingly, 4× containers 55a and 55b as shown in FIG. 27B can be clustered, stacked, aligned and positioned to form an operational power station 64b as shown in FIGS. 25C and 29.

FIG. 28A illustrates front and top views of an operational power station 64a with multiple power modules 41 fully housed all together with the auxiliary equipment 65 within transport container 55. In this illustration, the container's reinforced peripheral structures 69 are shown from frontal to top views and comprise the frontal and back doors 69a to access the power generator forming the internals of power station 64a shown in FIG. 28B. The 3-phase bus and/or DC power bus 70 are configured to be telescopically extruding out of the top portions of power station 64a while they are integrated and protected during transport and operation by the auxiliary equipment enclosures 65a (shown in FIG. 28B) containing power electronics components to control and condition the electric power produced by power modules 41. Power station 64a (or 64b) is configured to provide process heat external fittings 72 for thermal-hydraulic coupling with the third fluid 73 supporting process heat applications.

As shown in FIG. 28A, the top portions of power station 64a house the ORC radiator fans 71 for cooling of the ORC working fluid, for example, circulating through the independent ORC components 45a (FIG. 23B). Radiator fans 71 execute the function of active cooling during normal operations of the power station 64a. Under low probability attack scenarios resulting in the breach of fuel cartridge 1, as described for FIG. 11, fans 71 are reconfigured to intake air and potential debris so as to filter potentially contaminated UHS 18a fluid and debris by forcing the contaminated fluid to go through filters (not shown) in a manner as described in FIG. 11. The top portions as well as the sides of reinforced container 55 are surrounded by the second shield 18. This shield thermally couples fuel cartridges 1 of multiple power modules 41 to UHS 18a and protects them from ballistic events (e.g., missile hit).

FIG. 28B is a perspective view of an operational power station 64a formed by multiple power modules 41 coupled as shown in FIG. 25A and aligned as shown in FIG. 25E and all comprised within container 55. In this exemplary configuration, the module supporting structure 60 comprises 4× power modules 41. As power modules 41 generate a lower power rating than power modules 42, they represent a scaled-down version of power station 64b, with dimensional features that enable positioning and thermal-hydraulic and electrical coupling of auxiliary equipment 65 and 65a at the factory. In other words, power station 64a can be deployed fully operational. In this configuration, the leveling pods 76 are configured to elevate the power station 64a to enable UHS 18a fluid to flow through the auxiliary equipment enclosures 65a, mainly comprising power controllers 77, telecommunication/wireless systems to support remote control of power modules 41, and power controller cooling plates and heat exchangers 78. The leveling pods 76 also elevate the power station 64a to accommodate for the decontaminating system (not shown) activated should the fuel cartridges comprised by each power module 1 be breached (e.g., missile hit) and to thermally insulate the ground from radiative heat transfer during operation.

FIG. 28C illustrates a perspective view of the process heat ports and external fittings 72. The independently circulating third fluid 73 supporting process heat applications circulates through the process heat exchangers 26 embedded with first shield 17 (FIG. 23B), or through the independent process heat loop 26a (e.g., coupled to the independent ORC loop) shown in FIG. 12. Third fluid 73 flows through hydraulic isolators 79 activated to isolate the third fluid from circulating through the power station 64a should it undergo off-normal events. Although the third fluid dedicated to process heat applications does not mix with any fluids supporting the Brayton and Organic loops operating within pressure vessel 2, radiation sensors 75 monitor and control activation of hydraulic isolators 79 should off-normal radiation levels be detected in the process heat loop. Process heat valves 74 can be manually or remotely actuated to regulate the mass flow rate of third process heat fluid.

FIG. 29 illustrates a perspective view of an operational high-power rating power station 64b formed by multiple power modules 42 transported, aligned and assembled by coupling them together to enable neutron coupling according to the methodologies and features described above with reference to, for example, FIGS. 25E, 26C, 27A, and 27B. Specifically, the internal components associated with scaled-up power modules 42 coupled enabling neutron coupling are described in FIG. 25C. In the operational power station 64b in FIG. 29, additional auxiliary equipment inside multiple auxiliary equipment containers 80 are positioned so as to substantially surround power station 64b.

The auxiliary equipment containers 80 comprise battery banks 82 to support load following and reactor start-up operations, auxiliary cooling fan banks 83 providing active cooling and supporting the Brayton and Rankine cycles heat rejections to the environment via UHS 18a, and the independent ORC modules 45a, passively thermally coupled to fuel cartridges 1, comprised by first shield 17 surrounding each of the power modules 42. As shown in this figure, the independent ORC modules 45a and the battery banks 82 can be configured to provide further radiation shielding to the power modules 42, as they effectively represent additional thickness of dense materials (e.g., electric battery metals), while adding neutron shielding as they can represent materials containing hydrogen (e.g., batteries electrolyte). Additional shields 81 (removed in some of the auxiliary equipment containments 80 shown in FIG. 29, to illustrate their internal components) provide a passive pathway to transfer thermal energy from fuel cartridges 1 to the heat transfer surfaces of shields 81 and to UHS 18a. In this configuration of the operational power station 64b, the electrical power controllers 77 are enclosed by the auxiliary equipment enclosures 65 housed within the containers 55a or 55b (as described in FIG. 26C).

To summarize, in order to assemble the operational power station 64b, 4× containers 55a and 55b containing individual power modules 42 are stacked and coupled as shown in FIG. 29. The power modules 42 are then moved and aligned in a substantially central position of coupled containers 55a and 55b. Once the assembly formed by each power module 42 all together with their containers (e.g., 55a and 55b) are rotated to align each fuel cartridge 1 comprised in each power module to enable neutron coupling 106 (see FIGS. 25E, 26E, 27A-B), power module static positioning system 66 is locked by the rail brake system 62 and the power modules 42 can be actively positioned by the dynamic module positioning system 59. By regulating distance, roll, pitch, and yaw the dynamic power module positioning system 59 adjusts each power module position relative to one another so as to control neutronic coupling across the power modules, thus regulate thermal power and electrical power generated by the turbo-generators 43.

Figure 30:
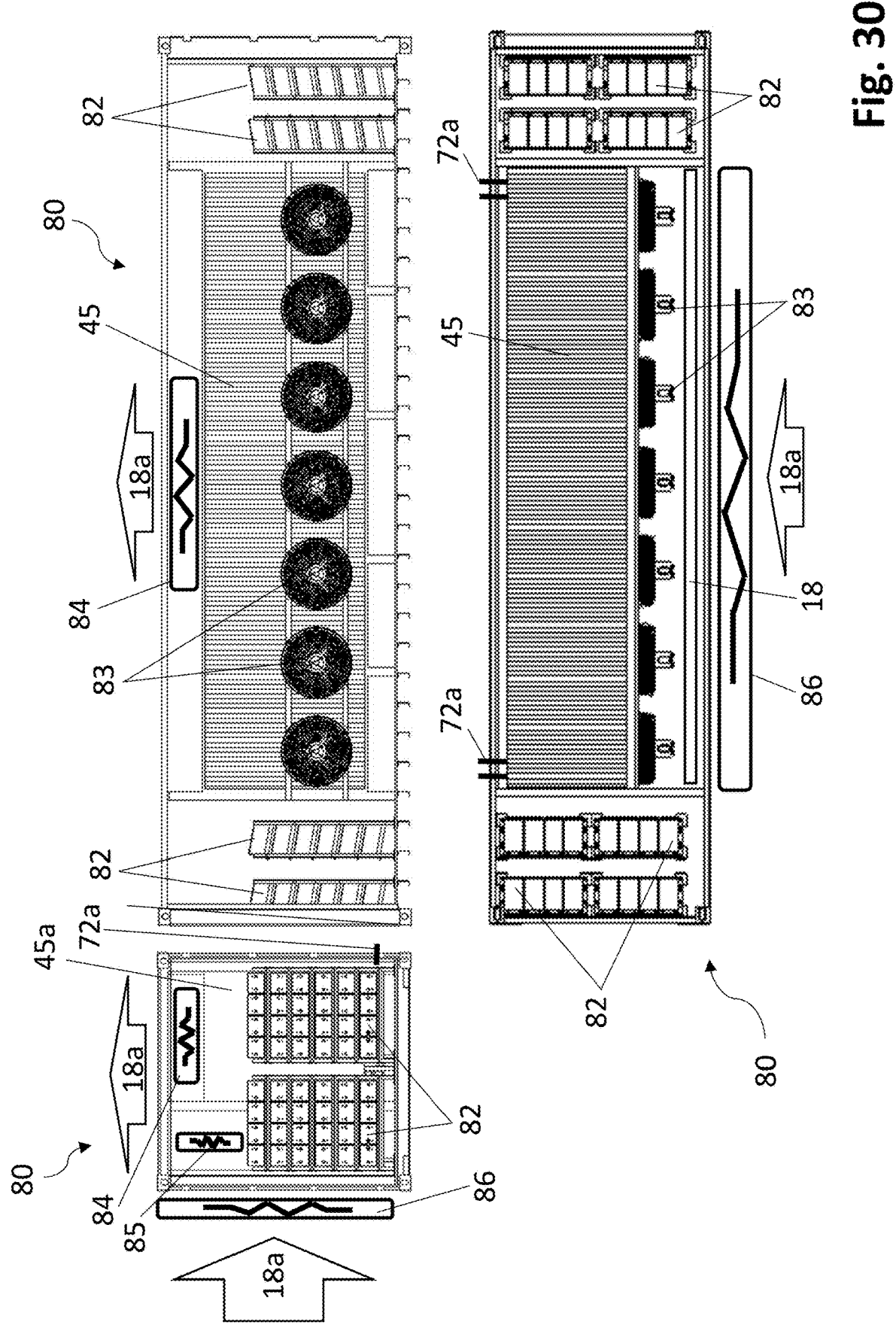
FIG. 30 are front, side, and top views of the retrofitted ISO container housing the auxiliary equipment shown in FIG. 29, according to an exemplary embodiment.

FIG. 30 illustrates the front, side and top views of an auxiliary equipment container 80 and describes its internal components in greater detail. Accordingly, battery banks 82 can be positioned so as to form additional radiation and neutron shields. The position of battery banks in the auxiliary equipment container 80 shown in this figure is solely for illustration purposes. The actual position of these components is dictated by the position of fuel cartridge 1 relative to each power module 42. Therefore, battery banks 82 can be configured to provide electric storage to support high electric loads excursions as the power modules 42 are adjusted to execute load following power generation through the dynamic module positioning system 59. Additionally, battery banks 82 can be configured to intercept any straight line of flight with respect to neutrons potentially leaking out of second shield 18 surrounding each power module 42. In this manner, battery banks 82 can attenuate radiation and absorb neutrons potentially leaking from the operations of power modules 42.

The independent ORC system 45a is housed by the auxiliary equipment container 80 and is thermally coupled to the power modules 42 to further recover the normally rejected thermal energy from the Brayton cycle and converts this form a waste thermal energy into electricity. For applications of the operational power station 64b where process heat demand is not present, the process heat ports 72 (see FIG. 28C) can be configured to transfer thermal energy from the power modules 42 to the independent ORC system 45a via ORC ports 72a, for further conversion of this thermal energy into electricity, thus increasing the power station thermal-to-electricity efficiency. The surfaces forming the auxiliary equipment container 80 are configured to support heat transfer from heat exchangers 84, 85 and 86 to UHS 18a. The condenser heat exchanger 84 is one of the components forming the independent ORC system 45a, while reactor passive heat exchangers 85 and 86 are heat exchangers thermally coupled to the power modules 42 to execute passive thermal energy transfer from fuel cartridges 1 in each power module, to UHS 18a when the power modules 42 are shutdown. The auxiliary cooling fan banks 83 are configured to provide active cooling proportionally to the power generated by the power modules 42. During accident scenarios involving breaching of fuel cartridges 1, cooling fan banks 83 are reconfigured to support filtering of potential UHS 18a contamination and operate on battery stored electric power. Under these accident scenarios cooling fan banks can operate so as to generate flows of potentially contaminated UHS 18a through filters and radiation traps as described in FIG. 11, not shown in FIG. 30.

Figure 32:
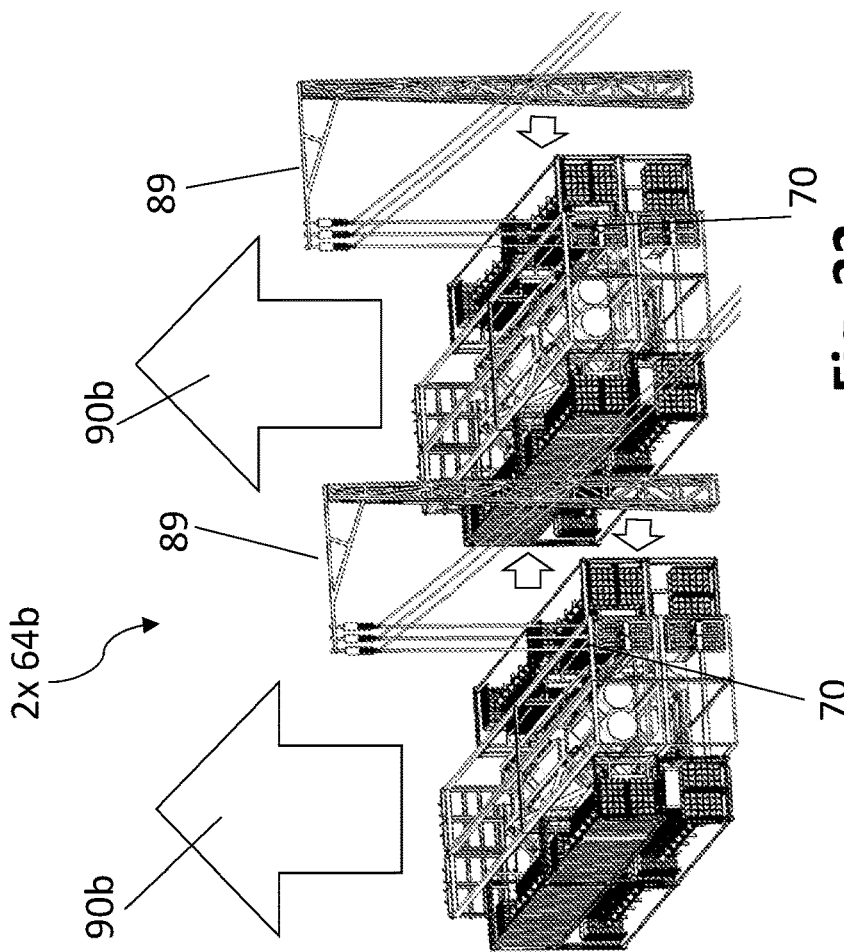
FIG. 32 is a perspective view of a farm of the complete high power rating power generators shown in FIG. 30, illustrating a possible clustering configuration ensuring cooling air circulation, according to another exemplary embodiment.
Figure 31:
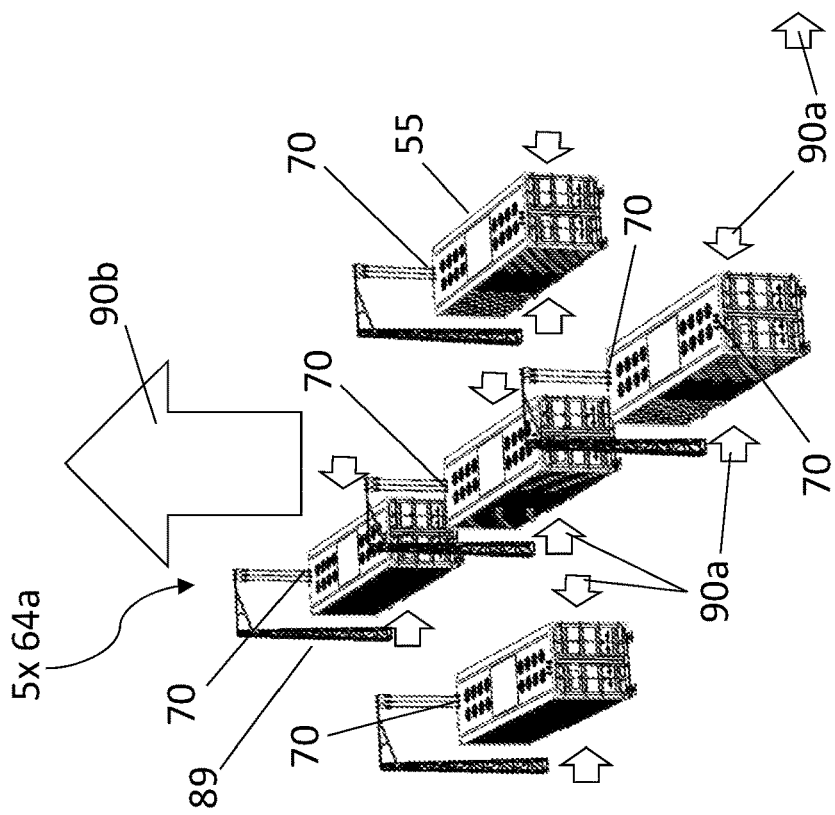
FIG. 31 is a perspective view of a farm of the operational power generators shown in FIG. 28A-C, and high-power power generators shown in FIG. 30, illustrating an exemplary clustering configuration ensuring cooling air circulation, according to an exemplary embodiment.

FIGS. 31 and 32 illustrate perspective views of clustered operational power stations 64a and 64b connected to power grid or switchyard equipment 89 for the distribution of electric power generated by clusters of independent operational power stations 64a and 64b. FIG. 31 shows 5× relatively low-power rating power stations 64a in a formation that enables UHS free/passive flow to cool down the surfaces of the containers 55 housing the power modules. Accordingly, assuming power stations 64a are configured to be coupled with the UHS represented by air, cold air flow 90a surrounds the sides of each independently operating power station 64a so as to generate a column of hot air flow 90b and enhance passive cooling of the surfaces thermally coupled to the power modules fully housed in containers 55. Each operational power station 64a can be connected to the switchyard or power grid equipment 89 by electrical connection with the 3-phase bus.

In FIG. 32, 2× high-power rating power independently operational power stations 64b are clustered to double their electric energy supply distributed to the power grid or switchyard equipment 89. Assuming the UHS is represented by air (e.g., in FIGS. 33 and 34, the UHS can be represented by water or a combination of air and water), cold air 90a passively cools down the surfaces of the auxiliaries equipment containers 80 for cooling of the power modules (42) during shutdown operations, while cooling is active (electrically driven as executed by fan banks 83 in FIG. 30) during normal operation. As hot air has a lower density, hot air flows 90b enhances cooling via cold air 90a as a natural draft is caused by the heating of the UHS by configuring the power stations 64b as shown in this figure.

Figure 33:
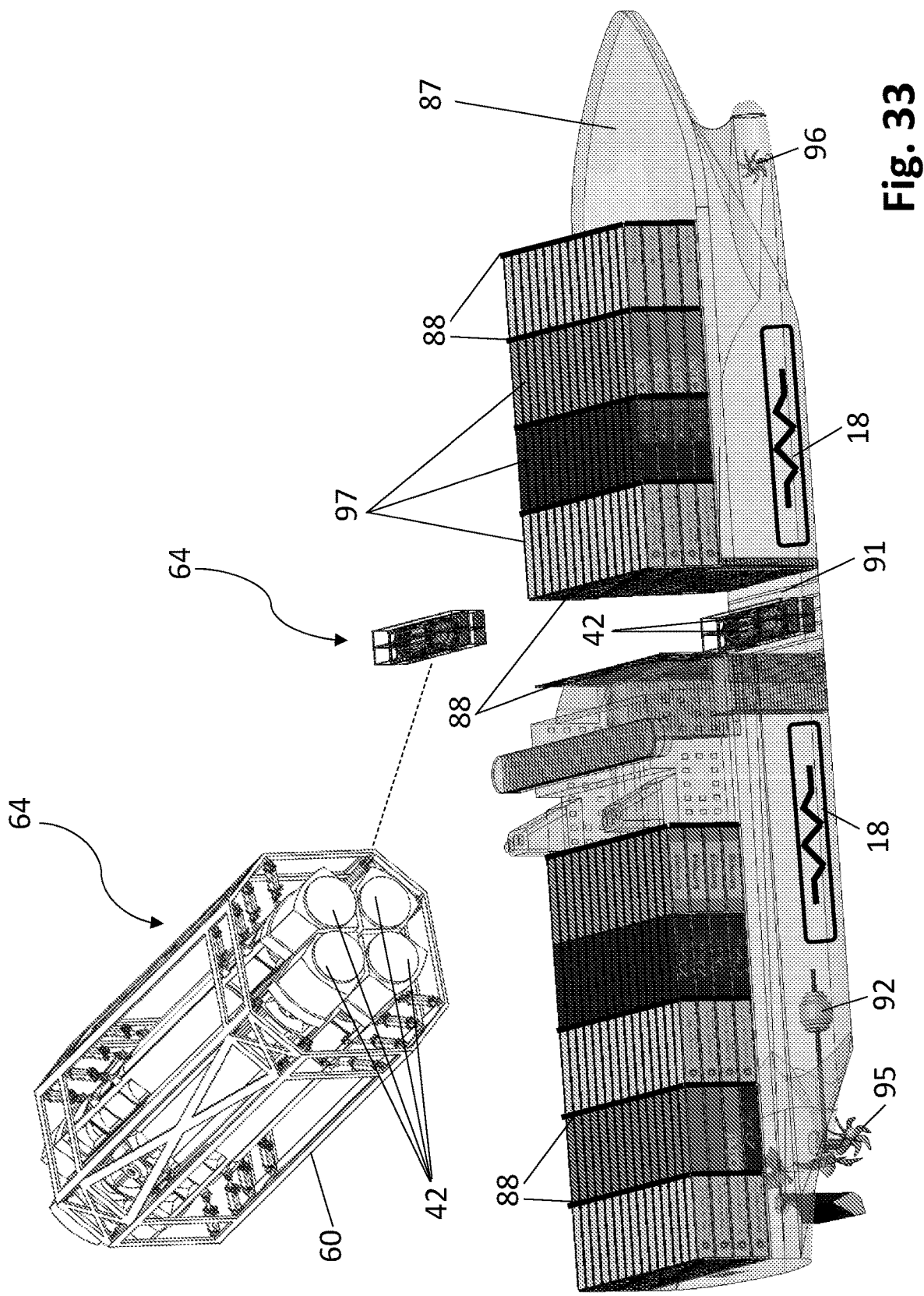
FIG. 33 is a perspective view of the power generator of FIG. 25C, where the high-power power generator auxiliary equipment shown in FIG. 30 can be thermally coupled to heat transfer structures represented by a container transport ship, to produce electricity to support electric propulsion, according to an exemplary embodiment of the present invention.

FIG. 33 illustrates an application of the operational electric generator formed by coupling multiple power modules 42 or 41 as described herein to a provide propulsion power to a container ship 87. Propulsion systems using AC or DC electric motors coupled to propellers have come to play a dominant role for marine applications worldwide. Ships can be equipped with multiple electrically-driven propellers 95 and 96 to reduce operating cost and increase maneuverability. Naval ship propulsion systems based on integrated electric propulsion (IEP) generally utilize diesel engines or turbines to produce electricity. These propulsion systems can be retrofitted with the generators forming power stations 64a and/or 64b and replace their fossil-fueled energy source by interfacing the IEP main electric power buses to the AC or DC generator power bus 70 (shown, for example, in FIGS. 28B, 31 and 32). Accordingly, container ship 87 is equipped with containers loading-drive, support and securing systems 88. The containers loading-drive systems 88 enable stacking and mechanically coupling various containers above and below the main deck. Installation of generator 64 formed by multiple power modules 42 (or 41), to supply electric power to the container ship 87 can be mechanically executed by loading containers 55 (e.g., 55a and 55b), stack them, rotate and align the power modules as shown in FIGS. 25E, 26C, 27A and 27B, and thermally couple the power modules to the UHS accessible from the internals of container ship 87 when the generator 64 is positioned below the main deck.

In these configurations, the UHS can be represented by air, water, or air and water. Additionally, thermal coupling of the power modules 42 (or 41) can be executed by coupling the power modules first shield 17 and/or second shield 18, and/or the UHS heat transfer surface 28 (see FIG. 12) to the cargo ship 87 metal structures coupled to the hull plates surrounded by water. As radiation shielding is enhanced by positioning the generator 64 below the main deck, the second shielding 18 and heat exchangers 27 (see FIG. 23B), can be configured to be coupled to the ballast tanks equipping container ship 87. Overall, generator 64 can be positioned and secured to a selected support deck 91, as it is normally executed when loading cargo containers 97, as the power modules are aligned and thermally coupled to the various UHS represented by the metal structures of container ship 87 thermally coupled with water, the generator becomes operational. In some configurations, the cargo ship 87 may be retrofitted with a main electric drive 92 coupled to a main propeller 95. In this case, the electricity produced by generator 64 is distributed by the ship propulsion control system.

Figure 34:
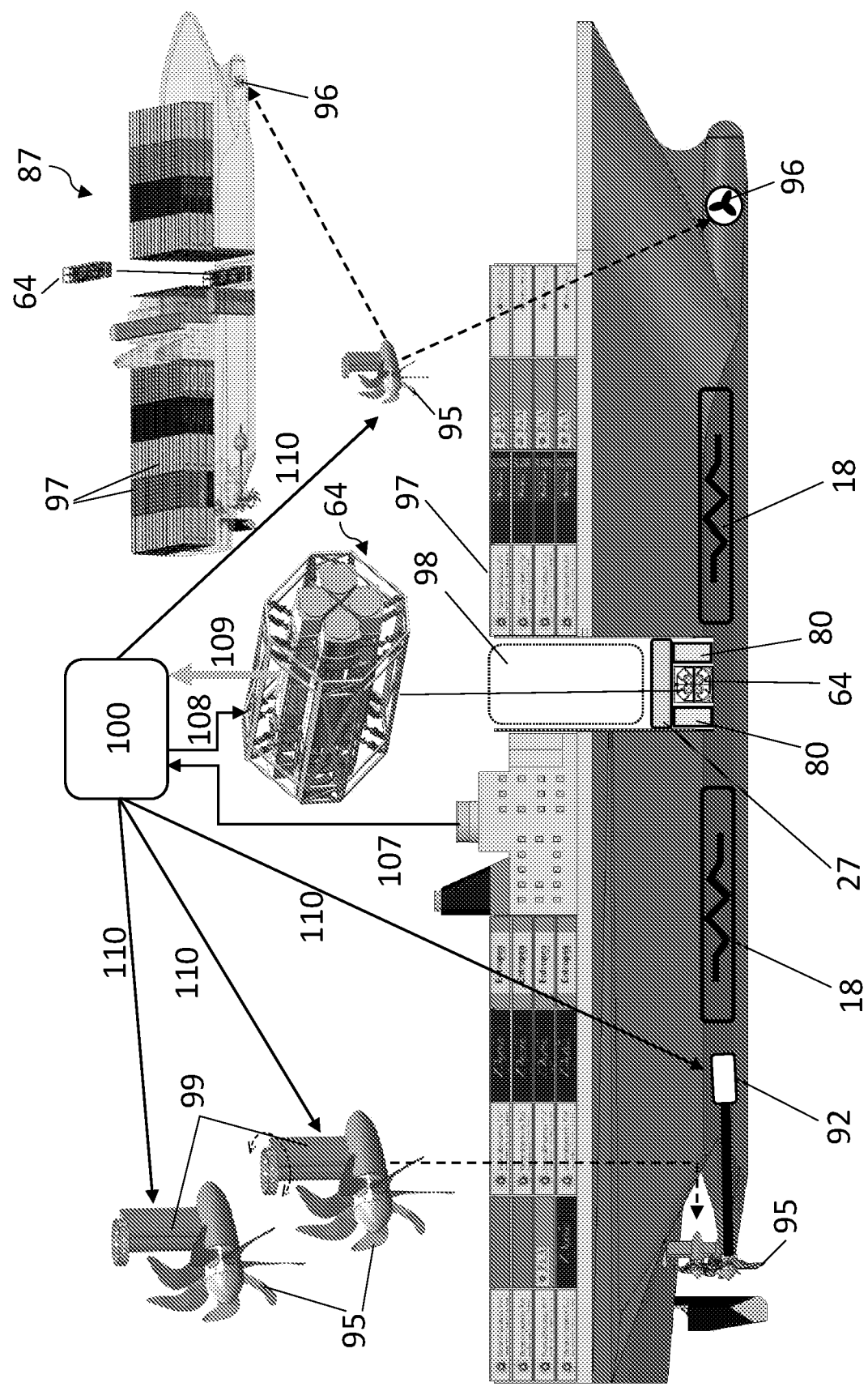
FIG. 34 is an illustration showing the electric power produced by the power generator of FIG. 25C or 28B distributed by an integrated power management system to provide propulsion and auxiliaries' power as a replacement to propulsion and electric power produced by diesel-engines or diesel-electric generators.

FIG. 34 illustrates a schematic of the electrical coupling and general positioning of generator 64 utilized as the electric power plant of container ship 87, where the generator 64 is installed below the main deck and substantially surrounded by auxiliary equipment containers 80 loaded and secured below deck as if they were conventional cargo containers 97. Under this configuration, the reusable container loading decks 98 remain accessible for further loading of cargo containers 97. Accordingly, the distribution of electric power is regulated by an integrated power management system 100 which modulates power to increase operating efficiency through at least one electric propulsor 95. Combining the electric capabilities of generator 64 with naval electric-drive propulsion systems can modernize or renew obsolete fleets.

The propulsor 95 can be formed by a variable speed electric motor inside a submerged pod 99. The electric motor can drive fixed or variable pitch propellers, and, in some configurations, the pod can rotate 360 degrees around its vertical axis, thus enhancing maneuverability. Retrofitting the generator 64 by loading and securing it as cargo containers 97, induces reduced cost installation and enables the supply of electric power as replacement or in tandem with the current electric power plant equipping modern ships with IEP systems. For these configurations, retrofitting installation of the generator 64 (configured as operational power stations 64a and 64b) includes coupling the integrated ship power management system with the 3-phase or DC power bus 70 (shown, for example, in FIGS. 31 and 32), and thermally couple the passive power modules heat transfer surfaces to the ship structure (e.g., surrounded by water). Electric power generated by generator 64 is then controlled and managed by the integrated power management system 100. Accordingly, ship control and command information 107 sets up the generator control system via signal 108. Electric power 109, generated by generator 64, is then distributed to various electric loads 110. Electric loads can be represented by the main electric drive 92, electric propulsors 95 and 96 setting the propulsion rates.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations. It is intended that the specification and examples be considered as exemplary only, with a true scope being indicated by the following claims and their equivalents.

What is claimed is:

1. A system, comprising:
   a load-following nuclear power generator including a nuclear reactor configured to generate variable amounts of electricity;
   an electric drive;
   a propeller controlled by the electric drive;
   a thermal energy recovery system thermally coupled to the load-following nuclear power generator and configured to recover heat rejected by the load-following nuclear power generator, and to generate electricity based on the heat rejection from the load-following nuclear power generator via a thermodynamic Brayton cycle during operation;
   wherein the thermal energy recovery system is also configured to recover decay heat from the load-following nuclear power generator, and generate electricity based on the decay heat when the load-following nuclear power generator is shut down;
   a battery configured to provide electric energy storage; and
   a shield thermally coupled to the thermal energy recovery system, the shield being configured to be capable of thermally coupling to water utilized within a ballast tank of a ship, a hull of the ship, and water surrounding the ship.

2. The system of claim 1, further comprising a power management system configured to control the load-following nuclear power generator to generate the electricity, and to control electricity distribution to the electric drive.

3. The system of claim 2, wherein the propeller is driven by a variable speed electric motor electrically coupled to the electric drive, and the electric drive is managed by the power management system.

4. The system of claim 1, wherein the load-following nuclear power generator includes one or more nuclear power modules.

5. The system of claim 1, wherein the load-following nuclear power generator is configured to be capable of thermally coupling to the hull of the ship.

6. The system of claim 1, further comprising a loading system configured to load the load-following nuclear power generator into and out of a transport container or the hull of the ship.

7. The system of claim 6, further comprising a static positioning system for fixed positioning of the load-following nuclear power generator into the hull of the ship.

8. The system of claim 6, further comprising a dynamic positioning system for variable positioning of the load-following nuclear power generator into the hull of the ship.

9. The system of claim 6, further comprising a static positioning system for fixedly positioning of the load-following nuclear power generator onto a supporting deck of the ship.

10. The system of claim 6, further comprising a dynamic positioning system for variable positioning of the load-following nuclear power generator onto a supporting deck of the ship.

11. A system, comprising:
- a load-following nuclear power generator including a nuclear reactor configured to generate variable amounts of electricity;
- an electric drive;
- a propeller controlled by the electric drive;
- a thermal energy recovery system thermally coupled to the load-following nuclear power generator and configured to recover heat rejected by the load-following nuclear power generator, and to generate electricity based on the heat rejection from the load-following nuclear power generator via a thermodynamic Brayton cycle during operation;
- wherein the thermal energy recovery system is also configured to recover decay heat from the load-following nuclear power generator, and generate electricity based on the decay heat when the load-following nuclear power generator is shut down;
- a battery configured to provide electric energy storage; and
- a shield thermally coupled to the thermal energy recovery system, the shield being configured to be capable of thermally coupling to water utilized within a ballast tank of a ship, a hull of the ship, and water surrounding the ship,
- wherein the load-following nuclear power generator comprises:
  - a nuclear fuel cartridge comprising:
    - a fuel matrix comprising:
      - a plurality of fuel channels for receiving a nuclear fuel element; and
      - a plurality of cooling channels;
    - a first header disposed on a first side of the fuel matrix;
    - a second header disposed on a second side of the fuel matrix opposite to the first side;
    - a plurality of cooling tubes through which a working fluid flows, each of the plurality of cooling tubes passing through each corresponding cooling channel of the plurality of cooling channels, each of the plurality of cooling tubes having a first end connected to the first header and a second end connected to the second header; and
    - a pressure vessel defining an interior space for sealingly containing the fuel matrix,
  - wherein the interior space for sealingly containing the fuel matrix comprises a pressure boundary independent from an interior of the plurality of cooling tubes, such that the interior space is not in fluid communication with the plurality of cooling tubes.

* * * * *